(12) United States Patent  (10) Patent No.: US 6,705,184 B2
Cardemon et al.  (45) Date of Patent: Mar. 16, 2004

(54) ADJUSTMENT METHOD AND APPARATUS FOR A BORING TOOL

(75) Inventors: Richard A. Cardemon, Muncie, IN (US); Joseph Baker, Farmland, IN (US)

(73) Assignee: Cardemon Inc., Muncie, IN (US)

( * ) Notice: Subject to any disclaimer, the term of this patent is extended or adjusted under 35 U.S.C. 154(b) by 0 days.

(21) Appl. No.: 10/023,243

(22) Filed: Dec. 18, 2001

(65) Prior Publication Data

US 2002/0078802 A1 Jun. 27, 2002

Related U.S. Application Data

(60) Provisional application No. 60/256,371, filed on Dec. 18, 2000, and provisional application No. 60/270,723, filed on Feb. 22, 2001.

(51) Int. Cl.[7] .............................. B23B 1/00; B23B 7/00
(52) U.S. Cl. .......................................... 82/1.11; 82/118
(58) Field of Search ........................... 82/1.11, 1.2, 1.4, 82/123, 131, 118; 408/1 R, 13, 147

(56) References Cited

U.S. PATENT DOCUMENTS

| | | | |
|---|---|---|---|
| 1,684,772 A | | 9/1928 | Manning |
| 2,178,384 A | * | 10/1939 | Young ........................ 408/169 |
| 2,441,158 A | | 5/1948 | Krasnow |
| 3,159,060 A | * | 12/1964 | Miles ........................ 408/158 |
| 3,364,799 A | * | 1/1968 | Benjamin et al. ........... 408/170 |
| 3,542,528 A | * | 11/1970 | Bech ........................ 407/37 |
| 3,700,346 A | | 10/1972 | Eckle |
| 3,749,508 A | | 7/1973 | Schukrafft |
| 3,753,625 A | | 8/1973 | Fabrizio et al. |
| 3,795,160 A | | 3/1974 | Janiszewski |

(List continued on next page.)

FOREIGN PATENT DOCUMENTS

| | | |
|---|---|---|
| CH | 24289 | 6/1946 |
| DE | 1 028 853 | 4/1958 |
| DE | 2 025 006 | 4/1971 |
| DE | 2 012 643 | 10/1971 |
| DE | 31 28 047 A1 | 1/1983 |
| DE | 32 45 195 A1 | 6/1984 |
| DE | 32 46 994 A1 | 6/1984 |
| DE | 4022579 A1 | 1/1991 |
| DE | 198 27 778 A1 | 12/1999 |
| EP | 0 070 488 A1 | 1/1983 |

(List continued on next page.)

OTHER PUBLICATIONS http://www.itstooling.com/howtheydo.asp, 1 page, dated Sep. 17, 2002.

(List continued on next page.)

Primary Examiner—A. L. Wellington
Assistant Examiner—Brian D. Walsh
(74) Attorney, Agent, or Firm—Woodard, Emhardt, Moriarty, McNett & Henry LLP

(57) ABSTRACT

Method and apparatus for adjusting the position of a cutting tool. In one embodiment, a boring tool includes a coupling member which is driven by a CNC boring machine, and a sliding tool holder which is slidably coupled to the coupling member. A frictional force resists sliding movement of the cutting tool holder. The frictional force is sufficient to retain the position of the cutting tool during machining operations. However, the frictional force is insufficient to resist a lateral force applied parallel to the direction of sliding, as used during adjustment of the tool position. In another embodiment, either a surface of the sliding tool holder or a surface of a frictional member are contoured with a shape that corresponds to a desired contour of a sidewall of a hole. During machining, a follower in contact with the contoured surface causes the cutting tool holder to slide laterally during machining, thus contouring the sidewall of the hole.

57 Claims, 34 Drawing Sheets

U.S. PATENT DOCUMENTS

| | | | |
|---|---|---|---|
| 3,814,535 A | 6/1974 | Steiner | |
| 3,854,839 A | 12/1974 | Gottelt | |
| 3,963,366 A | 6/1976 | Eckle et al. | |
| 4,010,677 A | 3/1977 | Hirakawa et al. | |
| 4,022,539 A | 5/1977 | Peuterbaugh | |
| 4,161,127 A | 7/1979 | Tiffin | |
| 4,162,643 A | 7/1979 | Coburn | |
| 4,163,624 A | 8/1979 | Eckle | |
| 4,170,159 A | 10/1979 | McNally | |
| 4,184,391 A | 1/1980 | Eckle | |
| 4,188,846 A | 2/1980 | Jones et al. | |
| 4,230,429 A | 10/1980 | Eckle | |
| 4,237,761 A | 12/1980 | Coburn | |
| 4,269,097 A | 5/1981 | Linn | |
| 4,306,473 A | 12/1981 | Eckle et al. | |
| 4,334,807 A | 6/1982 | Nessel | |
| 4,396,320 A | 8/1983 | Bellmann et al. | |
| 4,432,258 A | 2/1984 | Currer | |
| 4,443,136 A | 4/1984 | Kemmer | |
| 4,467,679 A | 8/1984 | Johne et al. | |
| 4,489,629 A | 12/1984 | D'Andrea et al. | |
| 4,508,475 A | 4/1985 | Peuterbaugh | |
| 4,552,493 A | 11/1985 | Schultshick | |
| 4,553,884 A | 11/1985 | Fitzgerald et al. | |
| 4,576,068 A | 3/1986 | Glatthorn | |
| 4,577,535 A | 3/1986 | Klabunde et al. | |
| 4,581,811 A | 4/1986 | Eckle | |
| RE32,211 E | 7/1986 | Jerue et al. | |
| 4,611,958 A | 9/1986 | Vasilchenko | |
| 4,612,831 A | 9/1986 | Lehmkuhl | |
| 4,615,652 A | 10/1986 | Van Sickle et al. | |
| 4,617,846 A | 10/1986 | Horsch | |
| 4,628,779 A | 12/1986 | Louis | |
| 4,634,324 A | 1/1987 | Eckle et al. | |
| 4,646,603 A | 3/1987 | Held | |
| 4,653,360 A | 3/1987 | Compton | |
| 4,684,301 A | 8/1987 | Eckle | |
| 4,690,592 A | 9/1987 | Odor | |
| 4,698,898 A | 10/1987 | Horsch | |
| 4,708,543 A | 11/1987 | Plutschuck et al. | |
| 4,714,389 A | 12/1987 | Johne | |
| 4,714,390 A | 12/1987 | Eckle et al. | |
| 4,719,690 A | 1/1988 | Eckle | |
| 4,726,111 A | 2/1988 | Schweizer | |
| 4,726,577 A | 2/1988 | Pontis | |
| 4,742,738 A * | 5/1988 | Strand | 82/1 |
| 4,755,077 A | 7/1988 | Eckle | |
| 4,772,163 A | 9/1988 | Scheer et al. | |
| 4,773,290 A | 9/1988 | Iwata et al. | |
| 4,778,313 A | 10/1988 | Lehmkuhl | |
| 4,780,029 A | 10/1988 | Beck | |
| 4,786,218 A | 11/1988 | Feuser | |
| 4,790,221 A | 12/1988 | Iwata et al. | |
| 4,793,750 A | 12/1988 | Eckle | |
| 4,863,324 A | 9/1989 | Blessing | |
| 4,886,402 A | 12/1989 | Pfalzgraf | |
| 4,933,868 A | 6/1990 | McMurtry | |
| 4,944,643 A | 7/1990 | Lehmkuhl | |
| 4,954,022 A * | 9/1990 | Underwood et al. | 408/1 R |
| 4,976,574 A | 12/1990 | Muendlein et al. | |
| 4,979,845 A | 12/1990 | Scheer et al. | |
| 4,979,852 A | 12/1990 | Noggle | |
| 5,025,693 A | 6/1991 | Tidland et al. | |
| 5,066,178 A | 11/1991 | Peuterbaugh | |
| RE33,910 E | 5/1992 | Compton | |
| 5,120,167 A | 6/1992 | Simpson | |
| 5,137,401 A | 8/1992 | Muendlein et al. | |
| 5,174,695 A | 12/1992 | Bathen et al. | |
| 5,211,088 A | 5/1993 | Gifford | |
| 5,228,813 A | 7/1993 | Scheer et al. | |
| 5,238,341 A | 8/1993 | Horsch | |
| 5,246,414 A | 9/1993 | Hallbach | |
| 5,297,055 A | 3/1994 | Johnstone | |
| 5,297,464 A | 3/1994 | Mayer | |
| 5,307,714 A | 5/1994 | Muendlein et al. | |
| 5,316,417 A * | 5/1994 | Romi | 408/153 |
| 5,325,751 A | 7/1994 | Green et al. | |
| 5,327,350 A | 7/1994 | Endo | |
| 5,341,710 A | 8/1994 | Peuterbaugh | |
| 5,346,335 A | 9/1994 | Harpaz et al. | |
| 5,354,157 A | 10/1994 | Wells et al. | |
| 5,394,335 A | 2/1995 | Rush | |
| 5,415,066 A | 5/1995 | Erickson et al. | |
| 5,421,681 A | 6/1995 | Stephens | |
| 5,427,480 A | 6/1995 | Stephens | |
| 5,482,417 A | 1/1996 | Erickson | |
| 5,507,606 A | 4/1996 | Steiner | |
| 5,538,367 A | 7/1996 | Ashley et al. | |
| 5,544,985 A | 8/1996 | Lane | |
| 5,573,335 A | 11/1996 | Schinazi | |
| 5,580,194 A | 12/1996 | Satran et al. | |
| 5,639,194 A | 6/1997 | Harroun | |
| 5,692,421 A | 12/1997 | Rohrberg | |
| 5,697,271 A | 12/1997 | Friedman et al. | |
| 5,704,250 A | 1/1998 | Black | |
| 5,713,253 A | 2/1998 | Date et al. | |
| 5,775,857 A | 7/1998 | Johne | |
| 5,788,428 A | 8/1998 | Ward et al. | |
| 5,791,841 A | 8/1998 | Zones | |
| 5,833,403 A | 11/1998 | Barazani | |
| 5,836,727 A | 11/1998 | Scheer | |
| 5,839,860 A | 11/1998 | Steiner | |
| 5,848,860 A | 12/1998 | Steiner | |
| 5,863,156 A | 1/1999 | Satran et al. | |
| 5,927,911 A | 7/1999 | Steiner | |
| 5,960,687 A | 10/1999 | Rohrberg | |
| 5,971,675 A * | 10/1999 | Romi | 408/171 |
| 5,975,816 A | 11/1999 | Cook | |
| 5,992,199 A | 11/1999 | Giannetti | |
| 6,013,016 A | 1/2000 | Irvine et al. | |
| 6,033,157 A | 3/2000 | Satran et al. | |
| 6,035,512 A | 3/2000 | Cook | |
| 6,062,778 A | 5/2000 | Szuba et al. | |
| 6,074,137 A | 6/2000 | Betman et al. | |
| 6,077,003 A | 6/2000 | Laube | |
| 6,109,841 A | 8/2000 | Johne | |
| 6,109,842 A | 8/2000 | Cook | |
| 6,128,985 A | 10/2000 | Muster et al. | |
| 6,132,146 A | 10/2000 | Satran et al. | |
| 6,134,996 A | 10/2000 | Scheer et al. | |
| 6,158,311 A | 12/2000 | Watkins et al. | |
| 6,163,950 A * | 12/2000 | Bodiker et al. | 29/559 |
| 6,196,769 B1 | 3/2001 | Satran et al. | |
| 6,196,773 B1 | 3/2001 | Hyatt et al. | |
| 6,224,306 B1 | 5/2001 | Hiroumi et al. | |
| 6,231,276 B1 | 5/2001 | Muller et al. | |
| 6,231,282 B1 | 5/2001 | Yoneyama et al. | |
| 6,315,503 B1 | 11/2001 | Oswald et al. | |
| 6,354,772 B1 | 3/2002 | Mueller | |
| 6,367,359 B1 | 4/2002 | Ropos | |
| 2001/0028832 A1 | 10/2001 | Soma | |

FOREIGN PATENT DOCUMENTS

| | | |
|---|---|---|
| EP | 0 070 488 B1 | 5/1987 |
| EP | 0 382 474 A2 B1 A3 | 8/1990 |
| EP | 0 235 719 B1 | 1/1992 |
| EP | 0 363 456 B1 | 10/1993 |
| EP | 0 968 783 A1 | 1/2000 |
| EP | 0 988 910 A2 | 3/2000 |
| EP | 1 123 766 A1 | 8/2001 |
| FR | 967.093 | 10/1950 |

| | | |
|---|---|---|
| FR | 1.038.110 | 9/1953 |
| GB | 391980 | 6/1933 |
| GB | 1573194 | 8/1980 |
| GB | 2131332 A | 6/1984 |
| GB | 2 141 054 A | 12/1984 |
| GB | 2204513 A | 11/1988 |
| JP | 58-102610 | 6/1983 |
| JP | 3196905 | 8/1991 |
| JP | 6-39602 | 2/1994 |
| JP | 8-71817 | 3/1996 |
| JP | 9-309002 | 12/1997 |
| JP | 10-244401 | 9/1998 |
| SU | 310737 | 10/1971 |
| SU | 510321 | 6/1976 |
| SU | 804220 | 2/1981 |
| WO | WO 86/04842 | 8/1986 |
| WO | WO 87/01319 | 3/1987 |
| WO | WO 89/08519 | 9/1989 |
| WO | WO 95/17275 | 6/1995 |
| WO | WO 95/29783 | 11/1995 |
| WO | WO 97/17153 | 5/1997 |
| WO | WO 98/48964 | 11/1998 |
| WO | WO 00/02692 | 1/2000 |
| WO | WO 00/04243 | 1/2000 |
| WO | WO 00/07762 | 2/2000 |
| WO | WO 00/09282 | 2/2000 |
| WO | WO 00/25968 | 5/2000 |
| WO | WO 00/37203 | 6/2000 |
| WO | WO 00/66305 | 11/2000 |
| WO | WO 01/10585 | 2/2001 |
| WO | WO 01/15841 | 3/2001 |
| WO | WO 01/54849 | 8/2001 |

OTHER PUBLICATIONS http://www.itstooling.com/whattheydo.asp, 1 page, dated Sep. 17, 2002.
http://www.itstooling.com/main.asp?lang=eng, 1 page, dated Sep. 17, 2002.
http://www.itstooling.com/products/index.asp, 1 page, dated Sep. 17, 2002.
http://www.itstooling.com/products/prod_cbs_tseries.asp?id=11, 2 pages, dated Sep. 17, 2002.
http://www.itstooling.com/products/prod_cbs_sseries.asp?id=12, 2 pages, dated Sep. 17, 2002.
http://www.itstooling.com/products/prod_cbs_esseris.asp?id=13, 2 pages, dated Sep. 17, 2002.
http://www.itstooling.com/products/prod_cbs_micro.asp?id=14, 2 pages, dated Sep. 17, 2002.
http://www.itstooling.com/images/tools/ch8_popupdia.gif, 1 page, dated Sep. 17, 2002.
http://www.itstooling.com/images/tools/ch16_popupdia.gif, 1 page, dated Sep. 17, 2002.
http://www.itstooling.com/images/tools/ch26_popupdia.gif, 1 page, dated Sep. 17, 2002.
http://www.itstooling.com/products/prod_bch.asp?id=16, 1 page, dated Sep. 17, 2002.
http://www.itstooling.com/images/tools/dia_cts_old.jpg, 1 page, dated Sep. 17, 2002.
http://www.itstooling.com/images/tools/dia_cts_old.jpg, 1 page, dated Sep. 17, 2002.
http://www.itstooling.com/products/prod_cts.asp?id=17, 1 page, dated Sep. 17, 2002.
http://www.itstooling.com/company/index.asp, 1 page, dated Sep. 17, 2002.
http://www.itstooling.com/products/prod_ch.asp?id=15, 1 page, dated Sep. 17, 2002.
Cloud, Randy, "A Short Treatise on Adjusting Boring Heads," www.criterionmachineworks.com, 1 page.
"A Word About Boring Heasds", www.criterionmachineworks.com, 3 pages.
Criterion Boring Heads—Information sheet, CMW—105a, 1 page.
Brochure, H.B. Rouse & Co. featuring "Starflex" Boring Tool Program, 2 pages.

* cited by examiner

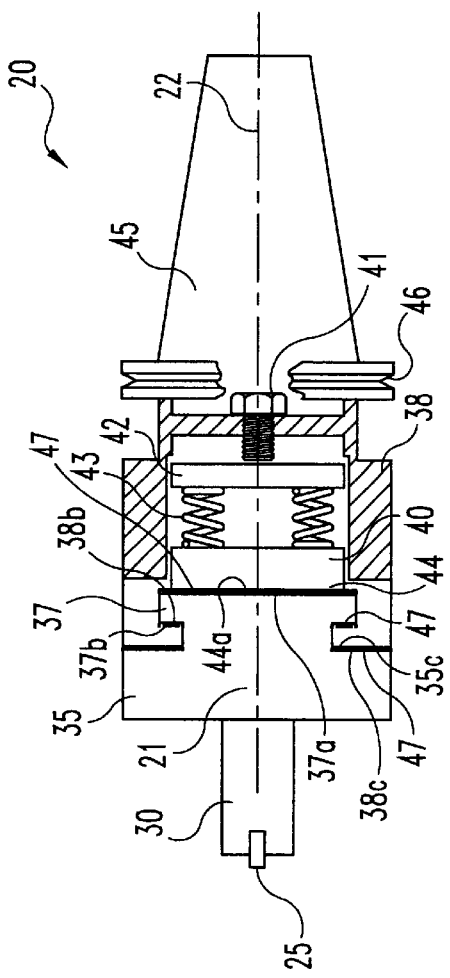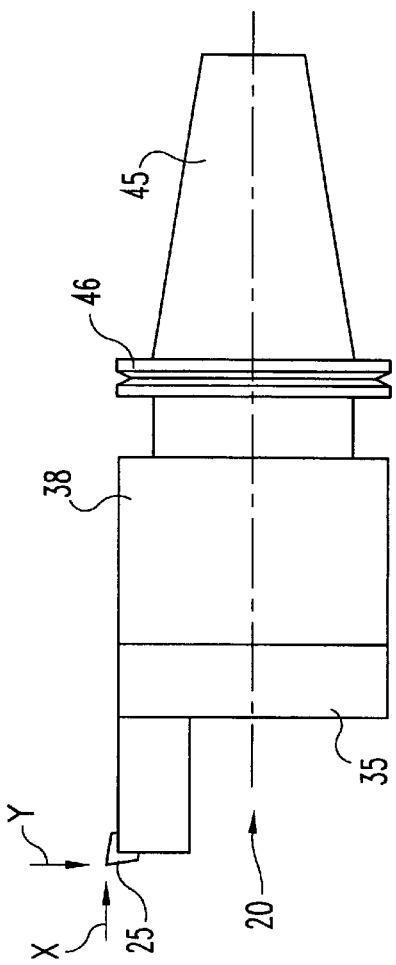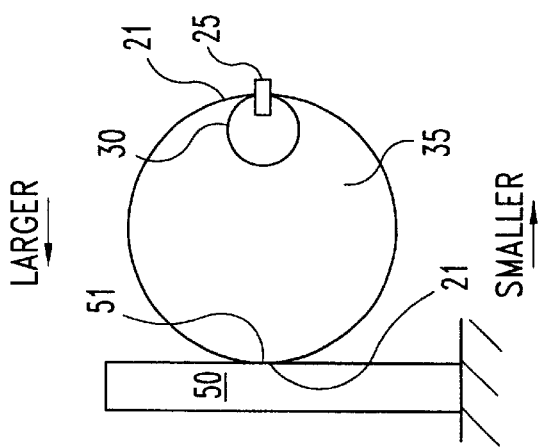
Fig. 1B
Fig. 1C
Fig. 1A

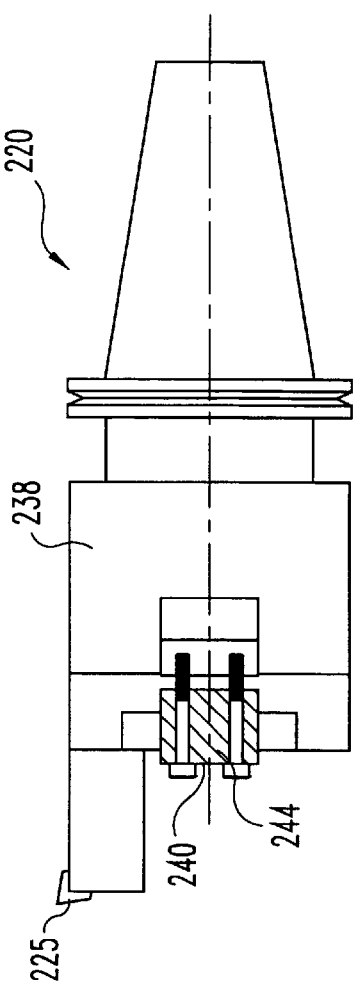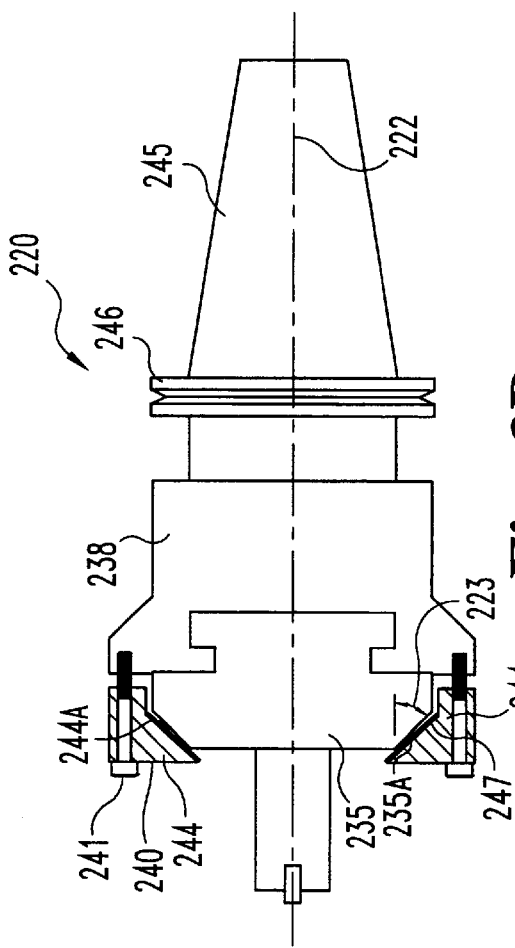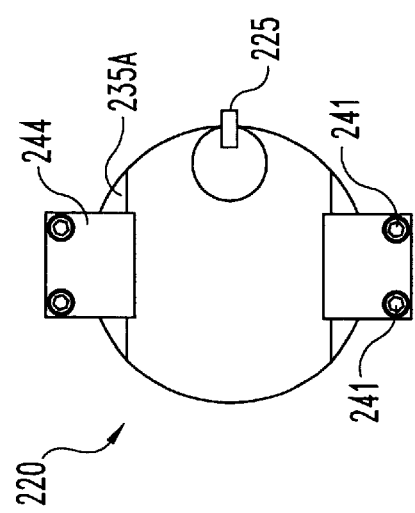

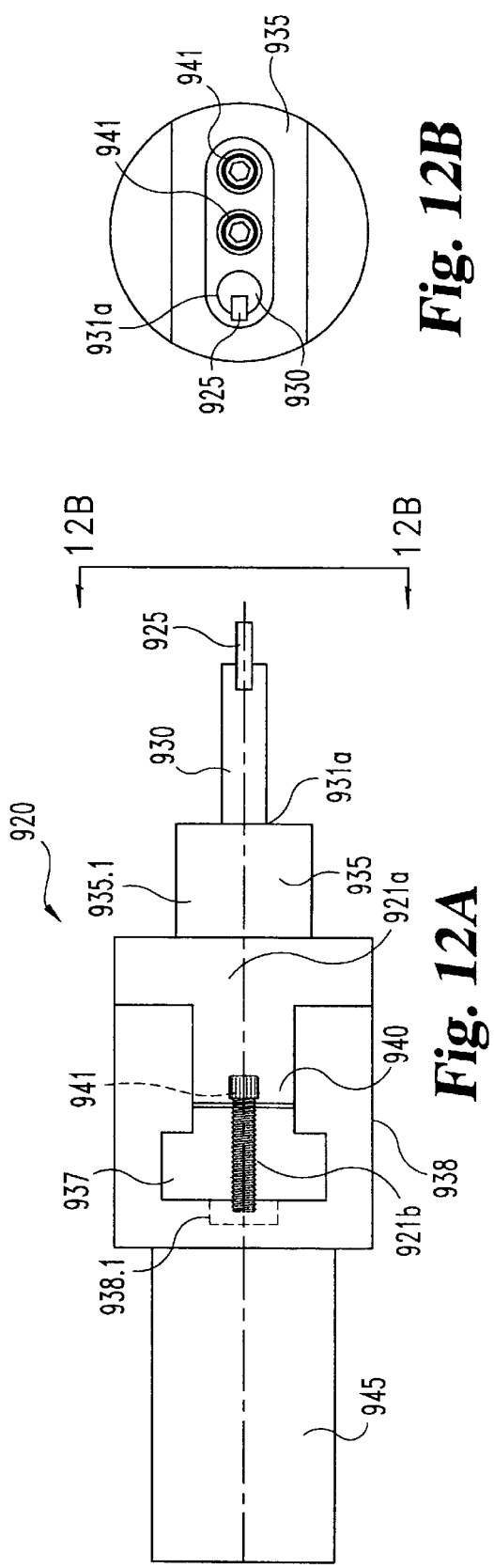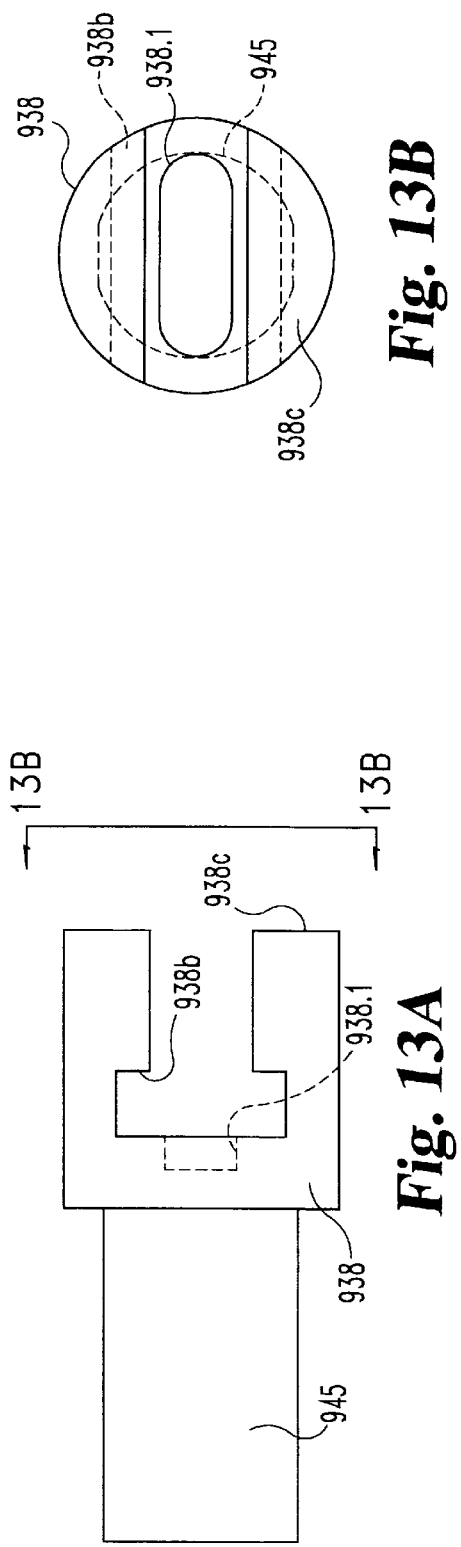

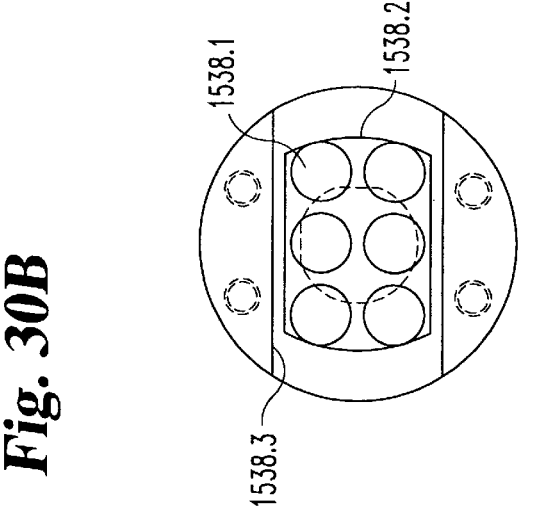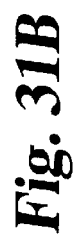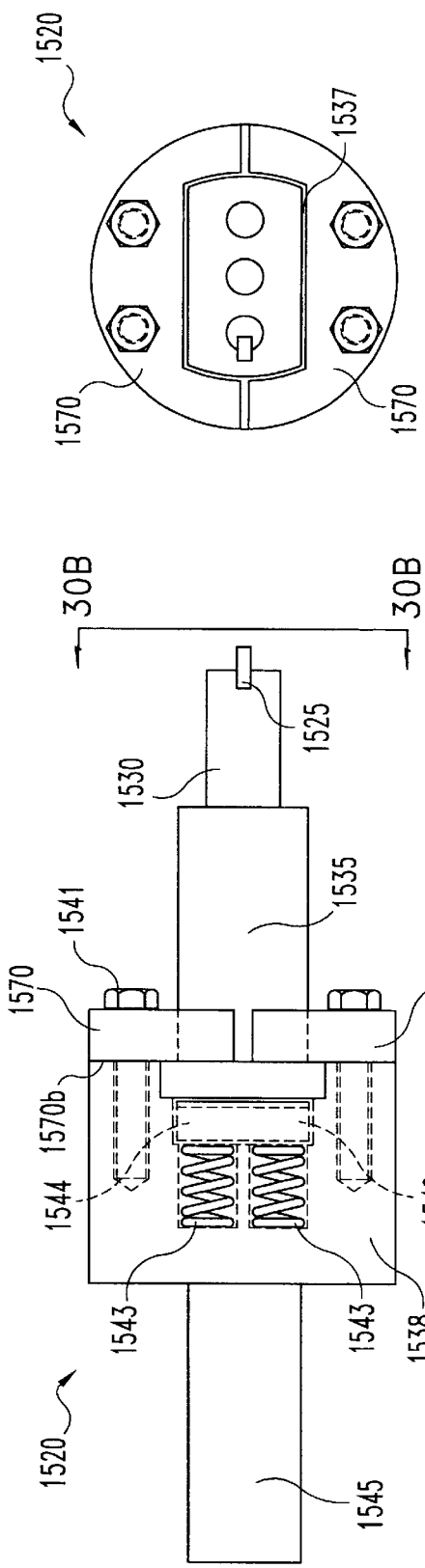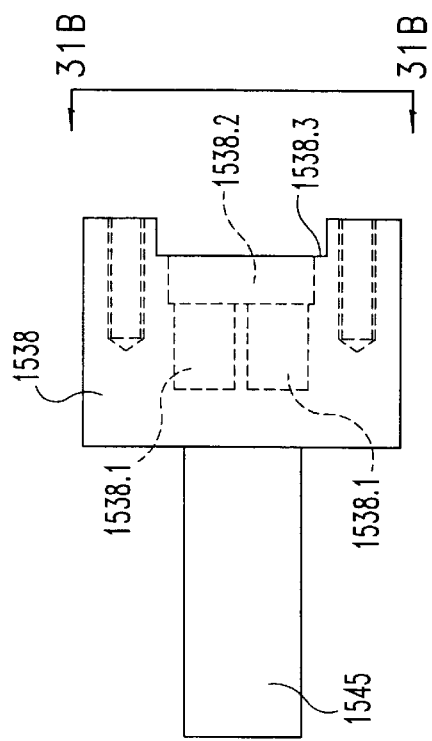

ADJUSTMENT METHOD AND APPARATUS FOR A BORING TOOL

This application claims the benefit of priority to U.S. Provisional Applications Serial No. 60/256,371, filed Dec. 18, 2000; and Serial No. 60/270,723, filed Feb. 22, 2001, both of which are incorporated herein by reference.

FIELD OF THE INVENTION

This invention concerns an apparatus for a tool used when performing a machining operation, and more specifically to a boring tool used with a Computer Numerically Controlled (CNC) boring machine.

BACKGROUND OF THE INVENTION

Many products, such as automotive transmission housing and engine blocks, include precision bored holes. These holes are bored by cutting tools supported by a boring tool which is driven by a boring machine. In many situations, the boring machine is computer numerically controlled (CNC) for reasons of flexibility, economics, and precision. Many CNC boring machines are capable of performing a wide range of operations on a product, including the boring of many different sizes of holes, by the automatic selection of a previously adjusted boring tool from a tool bank.

However, many boring tools require manual adjustment by the machine operator. Some currently used boring tools, such as the 3F-HBD Boring and Facing Head by Criterion Machine Works of Costa Mesa, Calif.; and the tools of the Starflex Boring Tool Program of the Johne+ Company of Germany require manual adjustment of the position of the cutting tool corresponding to the desired bore diameter. Some tools include an internal worm gear adjustable by the operator with an Allen wrench to slide a tool holder within a groove of a machine coupling member. After the operator has manually positioned the cutting tool to bore the correct size diameter, the operator then tightens one or more fasteners to lock the position of the tool holder relative to the machine coupling element. Thus, the clamping force holding the cutting tool on the boring tool is not maintained during adjustment and the tool is reclamped after adjustment. This slow, inflexible, labor-intensive adjustment method detracts from the speed and economy of the CNC machine by requiring the operator to stop the operation of the CNC machine during the period of adjustment.

What is needed is a boring tool which permits adjustment of the position of the cutting tool by operation of the machine, and not by manual readjustment. Further, what is needed is a method of adjusting a boring tool on a CNC machine by software commands. The present invention overcomes the drawbacks of the related art in novel and unobvious ways.

SUMMARY OF THE INVENTION

One embodiment of the present invention is a unique method to adjust the position of a cutting tool. Other embodiments include unique apparatus, methods, systems, and devices for adjusting the position of a cutting tool.

A further embodiment of the present invention pertains to adjusting the position of a cutting tool used in a boring operation. The cutting tool is slidably coupled to the boring tool with a frictional force sufficient to hold the cutting tool steady during machining of a bore, but insufficient frictional force to prevent the adjustment of the lateral position of the cutting tool.

Still another embodiment of the present invention pertains to a machining apparatus in which a cutting tool is slidably coupled to a tool apparatus. The tool apparatus includes a mechanism for applying varying amounts of frictional force against the sliding tool holder.

Yet another embodiment of the present invention relates to a method for adjusting the sliding position of a cutting tool. The method includes sliding the cutting tool in a first direction to a first predetermined position. The cutting tool is then moved in a second direction opposite to the first direction to a second predetermined position.

In yet another embodiment of the present invention, there is a method for machining an object. The method includes coupling a boring tool to a boring machine, and clamping a slidable cutting tool to the boring tool. The lateral position of the cutting tool is changed while maintaining the coupling and clamping. After the position of the cutting tool has been changed, the object is machined while maintaining the coupling and clamping.

Yet another embodiment of the present invention includes a system for boring a hole. The system includes a computer numerically controlled machining apparatus having an electronic controller. The electronic controller adjusts the sliding position of the cutting tool holder by placing a surface of the cutting tool holder in contact with a second surface of a static member. The electronic controller commands the machining apparatus to apply a force across the surfaces in contact.

A still further embodiment of the present invention includes an apparatus for boring a hole. The apparatus includes means for applying a normal force between first and second contact surfaces. The normal force creates a predetermined frictional force sufficient to restrain the position of the tool holder when the cutting tool is boring a hole, but which predetermined frictional force is insufficient to restrain the lateral position of tool holder when the lateral position of the tool holder is adjusted.

A still further embodiment of the present invention includes an apparatus for machining a hole with a boring machine. The apparatus includes a movable tool holder slidably coupled to a coupling element. A spring urges a contact surface of the tool holder against a contact surface of the coupling element.

Yet another embodiment of the present invention includes an actuating mechanism which varies the contact force between a cutting tool holder and a coupling member. The mechanism is actuatable between a first state in which a first contact force is applied in a direction at least partly parallel to the rotational axis of the cutting tool holder, and a second state in which the mechanism is actuatable to provide a second contact force greater than the first contact force in a direction at least partly parallel to the rotational axis.

A still further embodiment of the present invention includes a method for boring a hole in an object, wherein a surface of the cutting tool holder slides against a surface of a static member placed proximate to the boring tool. The surface of the cutting tool holder slides against the surface of the static member during machining of the object.

In yet another embodiment of the present invention, there is a contoured surface on either an external surface of a slidable cutting tool holder, or on an external surface of a static member. The contour corresponds to the contour of the sidewalls of the hole to be bored. The surfaces of the cutting tool holder and static member are in contact during machining of the hole. Accordingly, one object of the present invention is to provide a unique method for adjusting the position of a cutting tool.

Another object of the present invention is to provide a unique method for machining a contoured sidewall of a hole.

Further objects, embodiments, forms, benefits, aspects, features, and advantages of the present invention can be obtained from the description, drawings, and claims provided herein.

DESCRIPTION OF THE DRAWINGS

FIG. 1A is an end view of an apparatus according to one embodiment of the present invention.

FIG. 1B is a side elevational view of the apparatus of FIG. 1A, and including a partial internal view.

FIG. 1C is an external side elevational view of the apparatus of FIG. 1B.

FIG. 3A is an end view of an apparatus according to another embodiment of the present invention.

FIG. 3B is a side elevational view of the apparatus of FIG. 3A, with some portions shown in cross-section.

FIG. 3C is a side elevational view of the apparatus of FIG. 3A with some portions shown in cross-section.

FIG. 12A is a side elevational view of an apparatus according to another embodiment of the present invention.

FIG. 12B is a view of the apparatus of FIG. 12A as taken along line 12B—12B of FIG. 12A.

FIG. 13A is a side elevational view of a portion of the apparatus of FIG. 12A.

FIG. 13B is a view of the apparatus of FIG. 13A as taken along line 13B—13B of FIG. 13A.

FIG. 30A is a side elevational and partial cutaway view of an apparatus according to another embodiment of the present invention.

FIG. 30B is a view of the apparatus of FIG. 30A as taken along line 30B—30B of FIG. 30A.

FIG. 31A is a side elevational view of a portion of the apparatus of FIG. 30A.

FIG. 31B is a view of the apparatus of FIG. 31A as taken along line 31B—31B of FIG. 31A.

DESCRIPTION OF THE PREFERRED EMBODIMENT

Figure 1D:
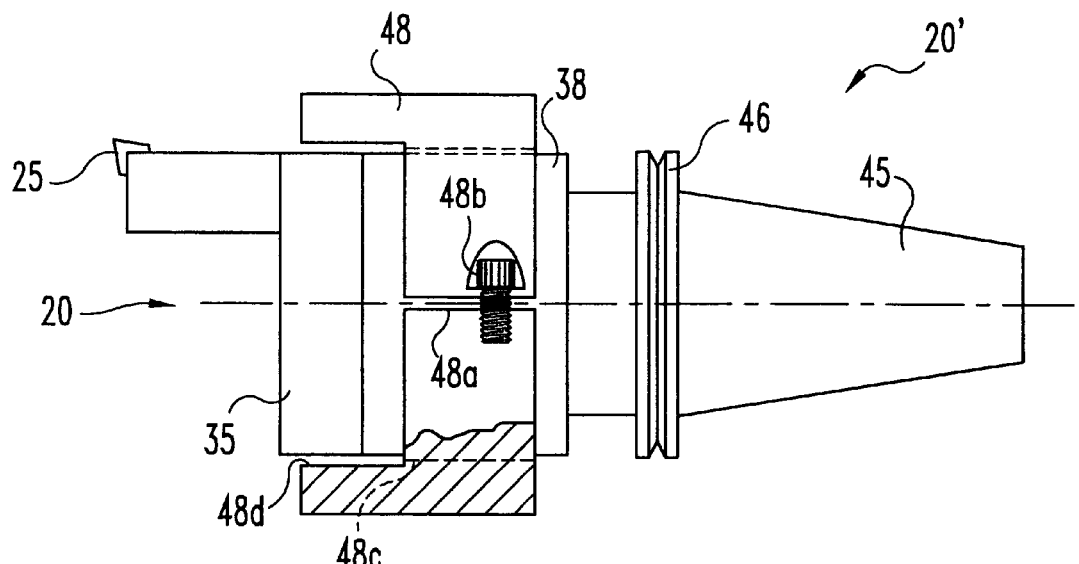
FIG. 1D is an external side elevation view and partial cutaway view of the apparatus of FIG. 1C which includes a retaining ring.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention relates both to apparatus and method by which the operator can adjust the sideways location of a cutting tool used in a machining operation; for example, a cutting tool used for boring holes with a CNC boring machine. According to one embodiment of this invention, the cutting tool or cutting tool holder is coupled to the machine coupling element, and can be moved relative to the coupling element. In one embodiment, the relative movement of the cutting tool or cutting tool holder is sliding movement, although the present invention is not limited to sliding movement. The sliding movement of the tool holder relative to the coupling element is controlled at a frictional interface. The tool holder is held firmly within the coupling element by a predetermined amount of friction. This amount of friction is sufficient to hold the tool in place during machining operations. However, this friction can be overcome in order to adjust the position of the cutting tool by applying a sufficiently high sideways load.

In another embodiment, the cutting tool holder and coupling member include a contact or frictional force actuating mechanism. The mechanism can vary the contact or frictional force between the tool holder and the coupling member, thus varying the frictional force which holds the tool holder in place. The actuating mechanism can be actuated to a first position or state which applies a first contact force between the tool holder and the coupling mechanism, resulting in a first frictional force restraining movement of the sliding tool holder. The mechanism is also actuatable to a second position or state in which a second contact force is applied between the tool holder and the coupling member, resulting in a second frictional force restraining sliding motion of the tool holder. The second contact force is greater than the first contact force, and the second frictional force is greater than the first frictional force.

The mechanism is actuated to the first state when the lateral position of the tool holder is adjusted. The frictional load of the first state is preferably greater than the corresponding lateral loads associated with machining, but less than the lateral load that can be applied by a machining apparatus such as a boring machine to laterally adjust the position of the cutting tool. The actuating mechanism is actuated to the second state prior to machining of an object. Preferably, the frictional load of the second state is greater than the lateral loads encountered during machining, and also greater than the lateral loads applied during adjustment of the position of the cutting tool. However, the present invention also contemplates those embodiments in which the frictional loads from both the first state and the second state are greater than the loads applied during machining, but less than the loads applied during adjustment of the position of the cutting tool. Further, the present invention contemplates those embodiments in which the frictional load from the first state is less than the lateral load encountered during machining. As non-limiting examples, the contact force actuating mechanism can include an electromagnet, an electromagnetic solenoid, a hydraulic piston, a hydraulic bladder, and/or centrifugal weights.

One embodiment of the present invention relates to a method for machining a bore. In this method an electronically controlled boring machine is commanded by an operator or by software to place a surface of a boring tool in contact with a static surface. The operator or software then commands the boring machine to apply a force against the static surface, this pressing of the boring tool against the static surface resulting in sliding of the cutting tool on the boring tool relative to the body of the boring tool. The boring machine moves the boring tool a predetermined distance against the static surface, this distance having been calculated to set the cutting tool in a proper position for the next boring operation. The cutting tool is held in place by friction relative to the boring tool body, and this friction maintains the cutting tool in the proper position during machining. However, the frictional force is of a low enough value so as to be overcome by the lateral force exerted by the boring machine against the static surface.

In another embodiment, the present invention relates to an apparatus for boring a hole with a boring machine. The boring apparatus includes a tool holder which is slidably coupled to a boring machine coupling element. The sliding interface between the tool holder and the coupling element includes a first contact surface of the tool holder that is in contact with a second contact surface of the coupling element. A predetermined normal force can be applied between the contact surfaces to create a predetermined frictional force between the first and second contact surfaces. This predetermined frictional force resists sliding of the tool holder relative to the coupling element. The predetermined frictional force is sufficient to restrain the lateral position of the tool holder when the tool holder is boring a hole, but is of a magnitude insufficient to restrain the lateral position of the tool holder during lateral adjustment of the tool holder relative to the coupling element. Some embodiments of the present invention utilize a spring to urge the first contact surface against the second contact surface. Other embodiments include the spring and also an adjusting element such as a fastener which permits adjustment of the force exerted by the spring to urge the first and second contact surfaces together.

Other embodiments include adjusting the friction in a boring tool by lessening of the torque of the set screws that maintain the sliding cutting tool in place. Typically, these set screws are adjusted to a high level of torque to maintain the sliding tool holder in place at all times. For example, the torque applied to the set screws may be the recommended maximum torque for the screw. This high torque creates substantial holding friction which prevents any lateral movement of the tool holder without first loosening one or more of the set screws. Typically, the screw is loosened, the tool position is adjusted, the screw is retightened, and machining resumes.

According to one embodiment of the present invention, the set screws are adjusted to a level of torque that is less than the recommended torque for holding the tool in place. This lower level places sufficient friction on the sliding tool holder to maintain it in place during machining, but insufficient friction to maintain the sliding tool holder in place during on-machine adjustment as described herein. This adjustment can be performed with the boring tool coupled to the boring machine, and without the need to stop the operation of the machine to make manual adjustments to the tool position. In some embodiments of the present invention, the set screws include a locking device or locking method to insure that the set screw retains a particular angular position and therefore a particular amount of friction. As one example, the threads of the set screws can be coated with a locking compound. As another example, the threads of the set screw can have a shape that results in interference with the mating threads. Those of ordinary skill in the art will recognize other methods for retaining a screw in position.

The various FIGS. shown in this application include schematic representations of systems, methods, and apparatus.

FIGS. 1A, 1B, and 1C show an end view and two side views, respectively, of one embodiment of the present invention. A boring tool 20 according to the present invention includes a cutting tool 25 held at the end and side of a tool support 30 that rigidly extends from a tool holder 35. Cutting tool 25 is a conventional cutting tool of any shape and material suitable for a boring operation. FIG. 1A also includes a static member 50 which preferably includes a static surface 51. By way of non-limiting examples, static member 50 can be a portion of the boring machine, the object to be machined, or a fixture attached to the boring machine or to the object.

Cutting tool 25 is used to machine an object in a conventional manner. Cutting tool 25 is rotated about the central axis of the boring tool, and brought into contact with an object to be machined. The outermost corner of cutting tool 25 contacts the surface of the object to be machined, and removes material from the object as the cutting tool both rotates about axis 22 and translates relative to the object.

Machining of the object places a three dimensional load on the cutting tool. Referring to FIG. 1C, there is an axial force X which is parallel to axis 22. There is also a lateral load Y, which can also be thought of as a radially-directed load, which is a force on cutting tool 25 that is substantially parallel (or includes a parallel component) to the sliding direction of tool holder 35. Finally, there is a third load (not shown on FIG. 1C) acting in a tangential direction which is perpendicular to both forces X and Y, and is related to the frictional drag and cutting forces of the cutting tool on the object.

It is believed that the lateral load Y encountered during machining which is parallel to the sliding motion of the cutting tool holder has a relatively small value compared to the other forces acting on the cutting tool. Therefore, although the axial and tangential forces acting on the cutting tool in response to axial and rotary motion of the cutting tool, respectively, can be significant, it is believed that the lateral load Y is lesser in value. Further, it is believed that some machining apparatuses, including some CNC boring machines, are capable of applying a sideways load to a tool holder that is parallel to Y and larger than the Y-direction loads encountered during machining. Therefore, a sliding tool holder which is restrained from sliding motion by a frictional load which is greater than the load Y encountered during machining will be sufficient to maintain the tool holder in place during machining. Further, by providing a frictional force which is less than the amount of lateral load which can be applied by the machining apparatus through the tool holder against a static member, it is possible for the machining apparatus to laterally reposition the cutting tool, while maintaining the cutting tool clamped to the coupling member in a manner suitable for subsequent machining.

Tool holder 35 is slidable by a T-joint 37 within coupling element body 38 of machine coupling element 45. Although a T-joint 37 in a squared-off configuration is shown and described, the present invention also contemplates other types of sliding joints between tool holder 35 and machine coupling element 45, including a dovetail joint. Machine coupling element 45 locks apparatus 20 to the CNC machine at a coupling interface 46, and is powered by the CNC machine so as to rotate tool 25 within the bore to be machined. The present invention is not limited to the configuration of coupling interface shown, and can include any coupling interface which provides powering and location of the boring tool 20. Further, although machine coupling device 45 is shown and described as interfacing to both tool holder 35 and a boring machine, the present invention further contemplates the use of intermediate coupling members between coupling element 45 and the boring machine.

FIG. 1B includes a partial internal cutaway view of boring tool 20. Machine coupling element 45 includes an internal frictional adjustment apparatus 40. Apparatus 40 includes an adjusting member 41 that can be manually adjusted, such as a bolt threadably retained within an internal bore of coupling element 45. Adjusting member 41 places contact pressure on an adjustment plate 42. Adjustment of member 41 against plate 42 results in a change in the force exerted by springs 43 against movable member or brake plate 44. The present invention contemplates springs 43 which can be any kind of spring-biasing member, including coil springs, torsional springs, cantilever springs, leaf springs, and gas or hydraulic springs. Further, although what is shown and described are springs placed in compression and urging the sliding tool holder away from the body of the coupling member, the present invention also contemplates those embodiments in which the springs are adapted and configured to urge the sliding tool holder toward the body of the coupling member. As one example, referring to FIG. 1B, the present invention contemplates those embodiments in which adjusting member 41 is threadably coupled to plate 42, such that rotation of member 41 pulls plate 42 toward the conical driven end of apparatus 20. In this embodiment, springs 43 would be attached at one end to plate 42 and at the other end to tool holder 35. The springs are in tension and urge tool holder 35 toward the conical end of apparatus 20.

Movable member or brake plate 44 includes a contact surface 44a with a frictional coating 47 comprising a frictional material such as a brake pad material. In some embodiments, a similar frictional coating 47 is applied to a contact surface 37a of T-joint 37 that is in contact with surface 44a. Adjustment of member 41 results in adjustment of the normal force acting between contact surface 37a and 44a. This predetermined normal force establishes a predetermined frictional force between contact surfaces 37a and 44a, and thus controls the amount of sliding friction at the interface of surfaces 44a and 37a. This friction is adjusted so that tool holder 35 is prevented from sliding during boring or other machining operations, but can be adjusted sideways with a force sufficient to overcome the frictional force between internal surfaces 37a and 44a.

Although what has been shown and described depict a frictional interface between contact surfaces 37a and 44a, the present invention contemplates other locations for a frictional interface. For example, frictional contact can be utilized between contact surface 37b of T-joint 37 and surface 38b of coupling element body 38. In addition, the frictional interface can be established between mating contact surface 35c of holder 35 and contact surface 38c of element body 38. Preferably, the frictional interface is established against any surface of the sliding tool holder, such that the tool holder is restrained from sliding relative to the coupling member.

The present invention contemplates application of frictional coating 47 to either one or both of the contact mating surfaces. In addition to the use of a frictional material such as a brake pad material for frictional coating 47, the present invention further contemplates other types of materials applied to one or more contact surfaces, including surface coatings for increased resistance to abrasion, wear, galling, and the like. Such coatings may provide this increased resistance by a drop in the coefficient of friction. In such applications, the required frictional force can be achieved by increasing the normal or contact force between contacting surfaces. Non-limiting examples of various surface coatings providing increased resistance to abrasion, wear, galling, and the like include the use of a Babbitt bearing alloy, polyvinyl chloride polymer, polyethylene polymer, TFE fluorocarbon polymer, molybdenum-disulfide (with or without solid film lubricants such as graphite), and oil. Further, as non-limiting examples, the present invention contemplates the use of thermochemical coatings, hot-dipped coatings, plating, mechanical cladding, deposited coatings, and heat treating of the contact surfaces to achieve the appropriate wear and frictional characteristics.

Some embodiments of the present invention use one pair of contact surfaces to provide most of the frictional force holding the tool holder stationary relative to the coupling element during machining. Other contact surfaces between the tool holder and coupling element can include surface finishes or surface coatings which have a low coefficient of friction. By limiting the high coefficient of friction coatings, materials, and surfaces to a single pair of mating contact surfaces, the total amount and location of sliding friction between the tool holder and coupling element can be reliably and accurately maintained.

FIG. 1D depicts a side elevational view and partial cutaway view of another embodiment according to the present invention. The use of a single prime (XX.X') or double prime (XX.X") with an element number (XX.X) refers to an element that is the same as the non-prime element (XX.X) previously described or depicted except for the differences which are described or depicted hereafter. FIG. 1D shows apparatus 20', which is substantially the same as apparatus 20, but further includes a retaining ring assembly 48 which is a safety device to prevent sliding tool holder 35 from sliding out of contact with coupling member 45, such as can occur during rotation at high speed. Under conditions of high rotational speed, a rotational mass imbalance of cutting tool holder 35, such as that created by tool support 30, can result in creation of a centrifugal load larger than the frictional load which restrains movement of cutting tool holder 35. Under these conditions, cutting tool holder 35 can move laterally. Retaining ring 48 limits the sliding movement of tool holder 35 so that there is contact between tool holder 35 and body 38 of coupling member 45.

Retaining ring 48 has a split 48a along one side. Split 48a permits ring 48 to slide in close tolerance over the outer diameter of body 38. A fastener 48b can be tightened to retain compression of ring 48 along inner diameter 48c against the outer surface of body 38. A second, larger inner diameter 48d provides clearance to the outer surface of cutting tool 35, this clearance being sufficient for adjustment of the position of cutting tool 25. However, this clearance is insufficient for disengagement of cutting tool 35 from body 38.

Figure 11:
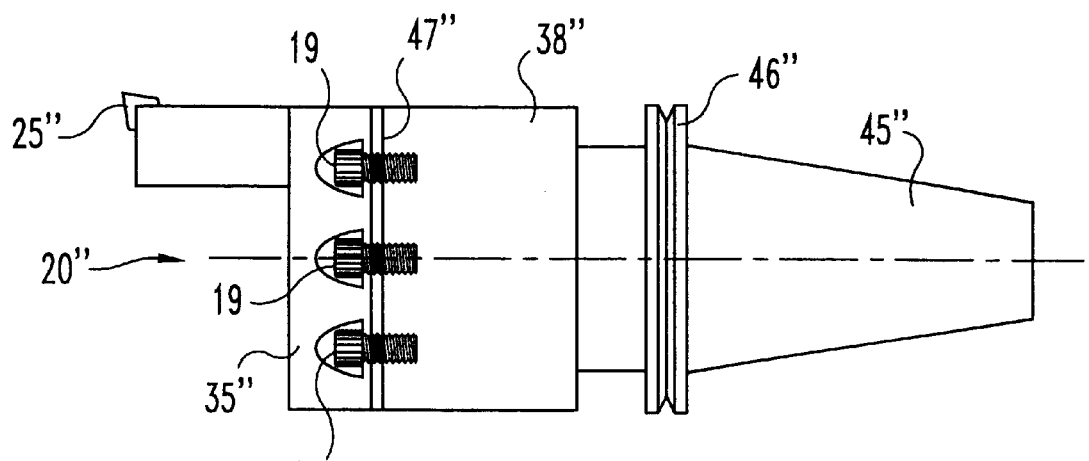
FIG. 11 is a side elevational view of an apparatus according to another embodiment of the present invention.

FIG. 11 depicts a side elevational view of a boring tool apparatus 20" according to another embodiment of the present invention. Apparatus 20" is substantially similar to apparatus 20, but includes a plurality of set screws 19 for clamping tool holder 35" to body 38". Apparatus 20" does not necessarily include the internal frictional adjustment apparatus 40 of boring tool 20. Set screws 19 are adjusted to a predetermined level of torque. This predetermined level of torque places sufficient friction on sliding tool holder 35" to maintain it in place during machining, but insufficient friction to maintain sliding tool holder 35" in place during on-machine adjustment as described herein. Set screws 19 can include various locking devices or locking methods known to those of ordinary skill in the art which insure that the set screws maintain a particular angular position and therefore a particular amount of friction.

One embodiment of the present invention similar to apparatus 20" includes a boring tool manufactured by Criterion Machine Works of Costa Mesa, Calif. A Criterion boring tool part no. DBL-204 head is coupled to a Criterion CB3-CV50 tapered adapter body. This boring tool includes an original equipment worm-gear mechanism to adjust the position of the cutting tool. This worm-gear is removed. The three set screws which restrain the cutting tool holder from sliding relative to the adapter body are torqued to approximately 40 inch pounds. The boring tool is installed on a SPN63 (serial no. 46600031) CNC boring machine manufactured by Niigata Machinery of Schaumburg, Ill. The boring tool is automatically adjusted by the boring machine by placing a surface of the boring tool against a static member, with the CNC machine applying a lateral load sufficient to adjust the lateral position of the cutting tool. The boring tool can machine a plurality of bores while maintaining the coupling of the boring tool to the boring machine, and maintaining the same clamping of the cutting tool to the boring tool. It is believed that the force required to slide the tool holder relative to the adapter body is about 370 pounds force.

Figure 4:
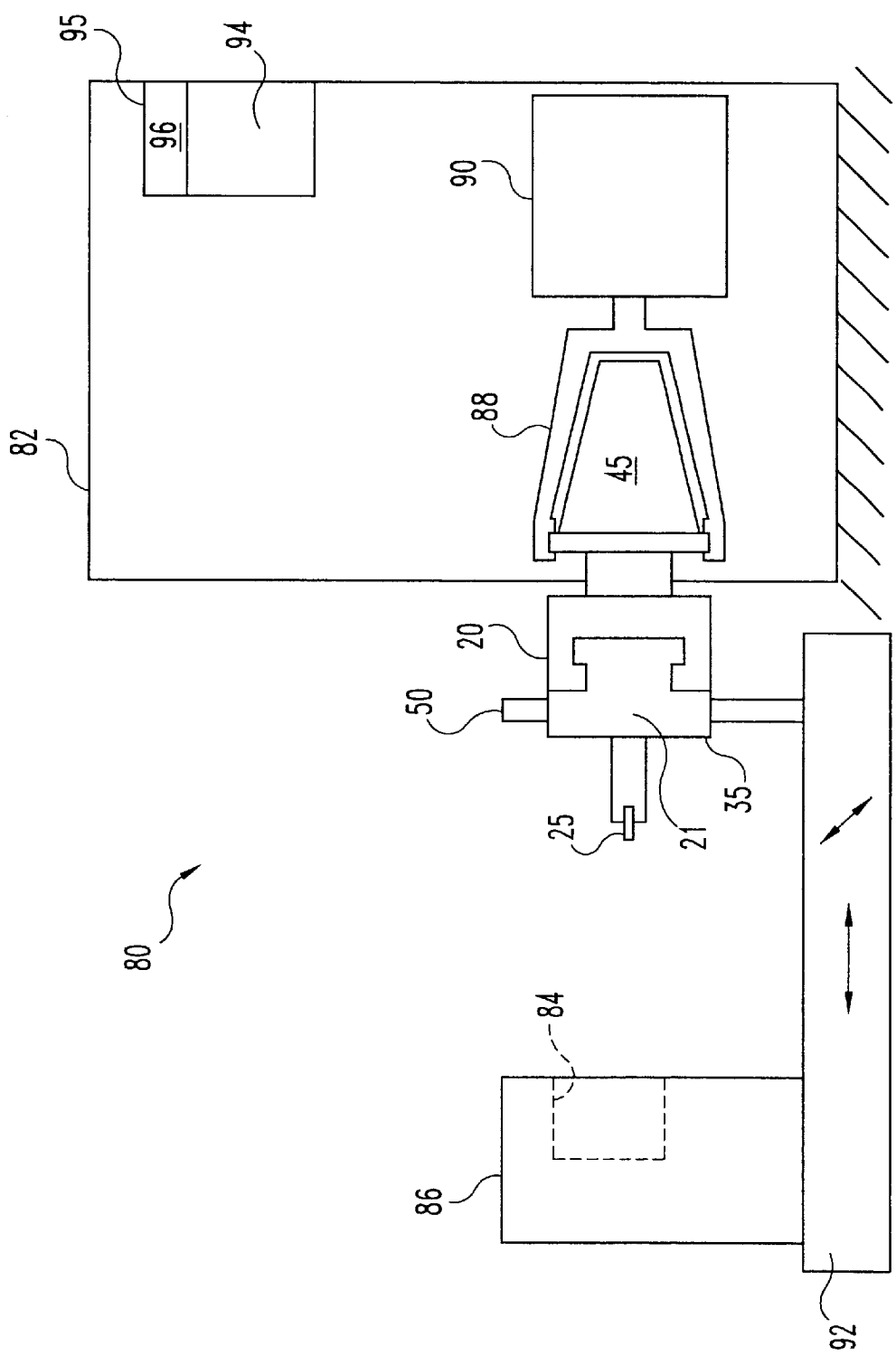
FIG. 4 is a schematic representation of a system for boring holes and adjusting a boring tool according to another embodiment of the present invention.

FIG. 4 schematically depicts a system 80 according to another embodiment of the present invention. An electronically controlled machine (such as a CNC boring machine) 82 uses a slidably adjustable boring tool 20 to bore a hole 84 in a workpiece or product 86, such as a transmission case. Boring machine 82 includes a drive unit 88 which releaseably couples to coupling element 45 in a conventional manner. Drive unit 88 provides power from a motor 90 to rotate boring tool 20 during the boring process. In one embodiment, motor 90 and drive unit 88 maintain boring tool 20 in a fixed location, and machining of bore 84 is accomplished by mounting product 86 to a table 92 which is capable of movement in multiple axes. However, the present invention also contemplates lateral and axial movement of boring tool 20 relative to table 92, or lateral and axial motions of both boring tool 20 and table 92. Preferably, machine 82 includes a computer 94 which includes memory 95 for storing a software algorithm 96. Machine 82 preferably includes a plurality of position sensors (not shown) which detect translational movement of table 92 and/or drive unit 88. Although a CNC boring machine has been shown and described, the present invention also contemplates boring machines which are electronically controlled without the use of a computer, as well as boring machines which are mechanically controlled.

One manner of adjusting the location of cutting tool 25 of boring tool 20 is as follows. The operator machines a feature on the object such as a bore, measures a characteristic of the feature such as the diameter of the bore, and determines the magnitude of error in the size of the feature. The operator then issues instructions to the CNC machine, or alternatively runs software on the CNC machine or electronically positions an electronically controlled boring machine or manually positions a manually controlled boring machine, to adjust the position of cutting tool 25 by a distance corresponding to the measured error. In the case of an electronically or mechanically controlled boring machine that is not computer controlled, the operator uses the appropriate electrical or manual controls for sideways movement of the boring tool. Further, the present invention contemplates those embodiments in which the measurement of the diameter of the bore is performed automatically by one or more position sensors of the electronically controlled machine 82. The present invention contemplates the use of any type of position sensor, including LVDTs, potentiometers, lasers, or any other devices known in the art.

Adjustment of the lateral position of cutting tool 25 relative to coupling element 45 is accomplished by placing an external surface 21 of tool holder 35 against a surface 51 of a static member 50. In one embodiment of the present invention, drive unit 88 and the coupled boring tool are moved laterally at a first, high travel rate until surface 21 is close to surface 51, at which time a slower travel rate is used. This placement of external surface 21 against rigid surface 51 is consistent with the direction in which tool holder 35 slides relative to coupling element 45. For example, for a boring tool 20 as shown in FIG. 1B, the rigid member 50 extends vertically as shown on FIG. 1B and touches the side external surface 21 of tool holder 35. Forces exerted between rigid member 50 and surface 21 are at least partly parallel to the direction of sliding motion of tool holder 35 relative to coupling element 45. However, the present invention is not limited to the use of a vertically oriented rigid member, and contemplates any orientation for a surface that permits contact between the surface and an external surface of the tool holder for exerting a force for sliding movement of the tool holder 35 relative to coupling element 45. In some embodiments of the present invention, the boring tool is moved relative to a static member. In other embodiments, a member, preferably a member under control of the CNC machine, is moved relative to a static boring tool.

After placement of surface 21 against surface 51, the machine presses the two surfaces together. This pressing together of the two surfaces does not result in sliding movement of tool holder 35 until the static friction force holding tool holder 35 relative to coupling element 45 is overcome. Once the lateral force exerted by the machine overcomes the static frictional force, tool holder 35 moves laterally as long as the force applied by the machine is greater than the dynamic (or moving) frictional force between tool holder 35 and coupling element 45. The machine continues to apply a lateral force until position sensors (not shown) of the electronic machine, or alternatively the human operator of a manually controlled machine, indicates that sufficient movement has occurred to place the cutting tool at the new, proper location.

The CNC boring machine moves tool 20 sideways with a force sufficient to overcome the friction between surfaces 37a and 44a, as well as any other sliding contact surfaces. In one embodiment of the present invention, the drive unit and boring tool are moved laterally at a slow rate. The present invention also contemplates those embodiments in which tool 20 is held stationary and table 92 moves laterally relative to boring tool 20, and also those embodiments in which both boring tool 20 and table 92 move relative to each other. The force required to move the cutting tool relative to the coupling member can be a first, higher value to overcome static or breakaway friction, followed by a second, lower value to overcome moving or dynamic friction. The machine applies this force until it has moved tool holder 35 sideways by the distance necessary to correctly size the bore. This distance corresponds to a dimensional error previously determined by the operator.

As seen in FIG. 1A, moving the tool holder 20 in the direction indicated by the "larger" arrow against static member 50 results in tool holder 35 and cutting tool 25 becoming offset from machine coupler 45 in a direction to bore a larger hole. Moving tool holder 20 in the direction indicated by the "smaller" arrow against rigid member 50 results in tool holder 35 and cutting tool 25 becoming offset from machine coupler 45 in a direction to bore a smaller hole. If it is desired to increase the size of the machined bore, then the lateral position of the cutting tool holder would be moved as indicated by the "larger" arrow against static member 50. Correspondingly, if it is desired to produce a smaller bore (such as on a new object), then the sliding tool holder will be moved relative to coupling member 45 in the direction indicated by the "smaller" arrow. Although what has been shown and described is a method including machining, measuring, calculating an error, and re-machining a feature such as a bore, the present invention contemplates the machining of any type of feature on an object which can be machined with a slidably adjustable tool holder. In some circumstances it is desirable to reset the position of the cutting tool holder, such as from a "unknown" position to a "known" position.

In these circumstances, one embodiment of the present invention contemplates a first sliding of the cutting tool relative to the coupling member in a first direction to a first position, especially a position for machining a small bore. This first sliding is accomplished after placing a first surface of the boring tool in contact with the static member. In one embodiment, this first sliding is designed to accept a boring tool having a cutting tool in an unknown position, and by the first sliding place the cutting tool in a first known position, such as a reference position.

After this first sliding, a second surface of the boring tool is placed in contact with a second surface of the static member. Preferably, the second surface of the boring tool is on a side of the boring tool opposite of the first surface. As a result of sliding motion of the machining apparatus table relative to the machining apparatus drive unit, a force is exerted on a surface slidable with the cutting tool holder of the boring tool to move the cutting tool holder in a second direction opposite of the first direction to a second, known position. The second sliding moves the cutting tool from the first known reference position to a position for ready for machining an object.

The present invention contemplates a static member 50 for reacting and resisting the lateral adjustment force exerted by the boring machine. Preferably, static member 50 reacts to the lateral adjustment force with little movement of the member itself. In this way, the lateral movement of the coupling member during adjustment as measured by one or more position sensors of machine 82 is primarily the sliding movement of the cutting tool holder relative to the coupling member, and not the flexibility or "give" of the static member. However, the present invention also contemplates those embodiments in which member 50 has flexibility, including embodiments in which there is compensation for this flexibility. Therefore, some embodiments include an algorithm in which the amount of sliding motion adjusting the position of the cutting tool as measured by the position sensors of the machining apparatus is different than the machining error calculated by the operator. For example, the algorithm can include adding or subtracting a fixed amount to the calculated error, and/or multiplying the error by a constant greater than or less than one. As another example, the present invention contemplates those embodiments in which static member 50 freely moves a small distance after being contacted by the boring tool, such as the case where the contact surface of the static member is coupled to a button or sensor which provides a signal to the operator or electronic controller that contact between the boring tool and the static member has been established. As another example, it may be known that a particular static member deflects a particular amount before the cutting tool holder slides relative to the coupling member.

The present invention contemplates a static member 50 comprising a separable fixture bolted or otherwise attached to the boring machine, a static surface of the product being bored, or any other static surface which is within the travel distance of the table relative to the boring machine. Although what has been shown and described is a system 80 which includes a slidably adjustable boring tool 20, the present invention contemplates the use of any slidably adjustable boring tools described herein with system 80. Further, although what has been shown and described is a slidably adjustable boring tool 20 in which the cutting tool holder 35 slides relative to coupling member 45, it is understood that repositioning of the cutting tool is contemplated, and the use of any tool holder which permits that repositioning is included in the present invention.

Yet another embodiment of the present invention contemplates a method for machining a characteristic of an object in which either the operator or electronically controlled machine 82 adjusts the position of cutting tool 25 while maintaining the boring tool coupled to the driving element and maintaining clamping of the tool holder relative to the coupling member to a first, initial position for rough cutting of the characteristic on the object. The operator or electronic controller then slidably adjusts the position of cutting tool 25 to a second position for a second, fine cut of the characteristic without making a measurement of the characteristic after the first, rough cut.

Figure 2A:
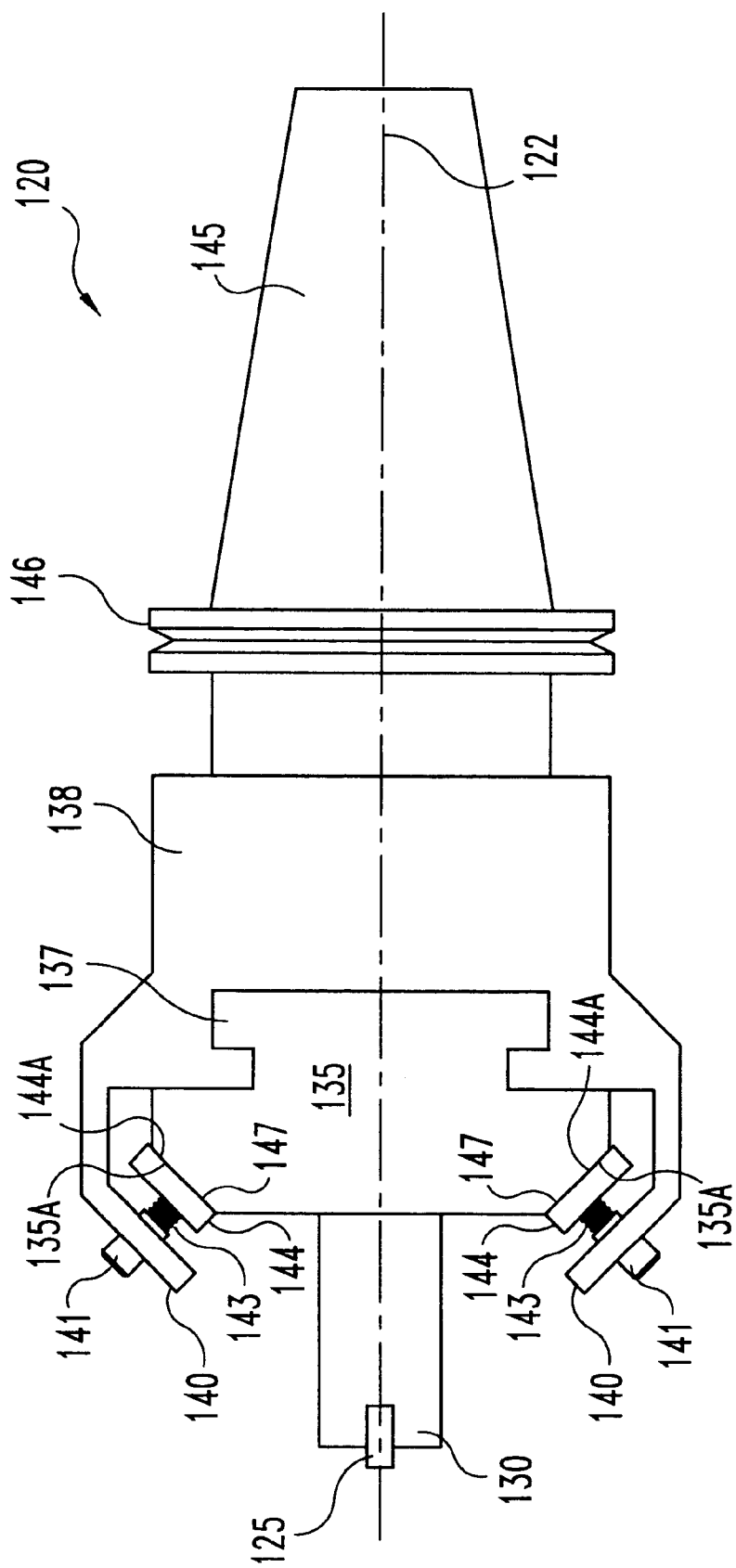
FIG. 2A is a side elevational view according to another embodiment of the present invention.

FIG. 2A shows a side view of slidably adjustable boring tool 120 according to another embodiment of the present invention. The use herein of an "N" hundred-series prefix (NXX) with an element number (XX.X) refers to an element that is the same as the non-prefixed element (XX.X) previously described or depicted, accept for the differences which are described or depicted hereafter.

Boring tool 120 includes a tool holder 135 that is slidably adjustably relative to coupling element 145 by overcoming the friction forces at a frictional interface between coupling element 145 and tool holder 135.

Body 138 of coupling 145 preferably includes a pair of frictional adjustment apparatus 140. Each adjustment apparatus 140 includes an adjusting member 141 such as a threaded fastener. One end of adjusting element 141 bears against a spring 143. Rotation of adjusting element 141 results in a change in the force exerted by spring 143 against a brakeplate 144. Brakeplate 144 includes a contact surface 144A which contacts surface 135A of tool holder 135. Preferably, one or both of contact surfaces 144A and 135A include a frictional coating 147 for increasing or modifying the coefficient of friction between the two contact surfaces.

Although the use of a friction coating 47 and 147 has been shown and described for increasing the coefficient of friction between the contact surfaces, the present invention also contemplates the use of materials and surface coatings on one or both of the contact surfaces which do not increase the coefficient of friction, but provide a known and consistent coefficient of friction. For example, some embodiments of the present invention include surface coatings between the contact surfaces that decrease the coefficient of friction, but in these cases the total frictional force which clamps holder 35 relative to coupling element 45 can be increased by increasing the normal force between the contact surfaces. Some embodiments of the present invention utilize a low coefficient of friction surface coating combined with a high normal force particularly where the surface coating provides resistance to galling, adequate wear resistance, and adequate durability. Regardless of the coefficient of friction between the contact surfaces, the frictional force clamping tool holder 35 relative to coupling element 45 is sufficient to maintain the location of cutting tool 25 during machining, and the frictional force is insufficient to withstand the lateral load imposed against the rigid surface during adjustment.

Preferably, the contact surfaces are parallel to each other. As can be seen in FIG. 2A, both contact surfaces 135A and 144A are displaced 45° relative to centerline 122 of boring tool 120. However, the present invention also contemplates those embodiments in which the contact surfaces are not parallel to each other, such that an edge of one contact surface makes line contact with the other contact surface. Further, the present invention contemplates those embodiments in which the contact between brakeplate 144 and tool holder 135 is not coated with frictional material 147. In these embodiments contact between contact surfaces 135A and 144A does not provide the primary frictional load for clamping tool holder 135 relative to coupling element 45. Instead, the contact surfaces are the primary means for imparting a normal force onto other surfaces of tool holder 135 that are in contact with surfaces of body 138 of coupling element 145. Therefore, the present invention also contemplates creating a normal force between a first pair of contact surfaces, and providing the primary frictional force between a different pair of contact surfaces.

FIGS. 3A, 3B, and 3C present one front and two side elevational views, respectively, of an apparatus according to another embodiment of the present invention. These figures depict various views of a boring tool 220 according to another embodiment of the present invention. Boring tool 220 includes preferably a pair of frictional adjustment apparatus 240 which provide clamping between tool holder 235 and body 238 of coupling element 245. Each adjustment apparatus 240 includes a static member 244 that is fastened by a fastener 241 to body 238. Member 244 includes a contact surface 244A that is in contact with a mating contact surface 235A of tool holder 235. Preferably, both contact surfaces 244A and 235A are generally parallel, and both are preferably displaced at an acute angle 223 relative to centerline 222. Tightening of fasteners 241 into body 238 provides a normal force between contact surfaces 235A and 244A. However, the normal force between the contact surfaces is a fraction of the axial load within the fasteners 241. This fraction depends upon the sine of angle 223. For example, for an angle 223 of 30°, the normal force exerted between the contact surfaces is only half of the axial load within the fasteners 244, since the fasteners 244 are oriented parallel to centerline 222. Therefore, the amount of normal force between the contact surfaces can be adjusted by selection of angle 223. As angle 223 approaches zero, the normal force between the contact surfaces decreases toward zero. In this way, the normal load between contact surfaces is controlled by selection of the angle 223 and the torque applied to fasteners 241. Thus, the present invention contemplates those embodiments such as boring tool 220 in which the frictional adjustment apparatus does not require a spring for adjusting the normal load.

It is to be understood that the present invention contemplates those embodiments in which the frictional force which restrains movement of sliding tool holder 35 results from forces applied parallel to axis 22, in either direction. For example, some of the springs, hydraulic pressure, solenoids, electromagnets, and centrifugal weights shown herein and related and equivalent devices can be used to urge the sliding tool holder apart from the coupling member. However, the present invention also contemplates those embodiments in which the springs, hydraulic pressure, solenoids, electromagnets, and centrifugal weights and related and equivalent devices are used to urge the sliding tool holder toward the coupling element. For those embodiments in which the tool holder and coupling element are urged apart, the axial load X imparted to the cutting tool during machining opposes this urging force on the boring tool, and thus reduces the net normal force acting between frictional surfaces. This net reduction in normal forces corresponds to a net reduction in the frictional force which restrains sliding movement of the tool holder.

For those embodiments in which the tool holder and coupling member are urged together, the axial load X applied on the cutting tool during machining increases the normal force applied between frictional surfaces. In this latter example the frictional forces which restrain lateral movement of the tool holder are increased during machining. For those embodiments in which boring tool 20 is arranged and configured such that the sliding tool holder is urged toward the coupling member, the X-direction machining forces act in what can be thought as a "self-energizing" manner, i.e., use of the cutting tool increases the frictional force which restrains the tool holder from sliding.

Figure 5:
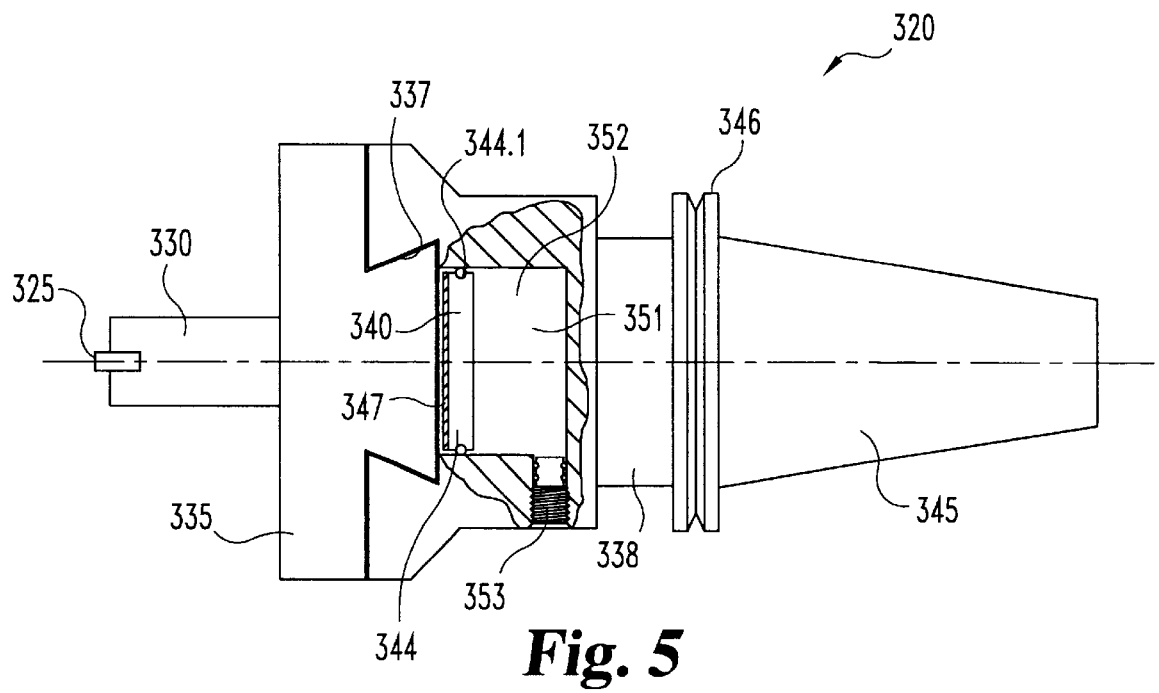
FIG. 5 is a side elevational view of an apparatus according to another embodiment of the present invention, and including a partial internal view.

FIG. 5 shows a side elevational view of an apparatus 320 according to another embodiment of the present invention.

Apparatus 320 is a boring tool which includes a slidably adjustable cutting tool 325. Cutting tool 325 is fixedly supported, such as by a tool support 330, which extends from a slidably adjustable tool holder 335. Tool holder 335 preferably includes a joint 337 such as a dovetail joint or T-joint which slidingly couples to a complementary-shaped joint of a coupling element body 338. Coupling element body 338 is part of a coupling element 345. Coupling element 345 preferably includes a conically-shaped end and a coupling interface 346, both of which locate boring tool 320 in a drive unit such as drive unit 88 of electronically controlled machine 82 (referring to FIG. 4). Referring again to FIG. 5, apparatus 320 includes a friction adjustment apparatus 340 which applies a normal force between facing contact surfaces of apparatus 320.

Apparatus 320 includes means 340 for applying a friction force between contact surfaces for clamping the sliding cutting tool to the boring tool. Means 340 includes a chamber 351 within coupling element body 338. A piston 344 is slidable within chamber 351. A sealing member 344.1 provides a seal between piston 344 and the walls of chamber 351. A pressure adjusting screw 353 is threadably received within a bore of body 338. Chamber 351 includes hydraulic fluid 352. Rotation of adjusting screw 353 either inward or outward relative to body 338, either increases or decreases, respectively, the amount of fluid 352 displaced from the bore. This change in the amount of displaced fluid results in a corresponding change in the position of piston 344. For example, inward rotation of screw 353 results in movement of piston 344 toward cutting tool holder 335. After screw 353 has been moved sufficiently to bring piston 344 in contact with tool holder 355, any subsequent change in the position of screw 353 changes the pressure within chamber 351, with a corresponding change in the force applied between piston 344 and tool holder 335. In one embodiment, a surface treatment or surface coating 347 is applied to a surface of piston 344 (as shown in FIG. 5), or alternately to the corresponding contact surface of tool holder 335. In another embodiment, a surface treatment or surface coating is applied against one or both of the angled surfaces of dovetail joint 337. The present invention contemplates creation of a frictional force between any pair of surfaces contacting between body 338 and tool holder 335, and/or adjusting means 340 and tool holder 335.

Figure 6A:
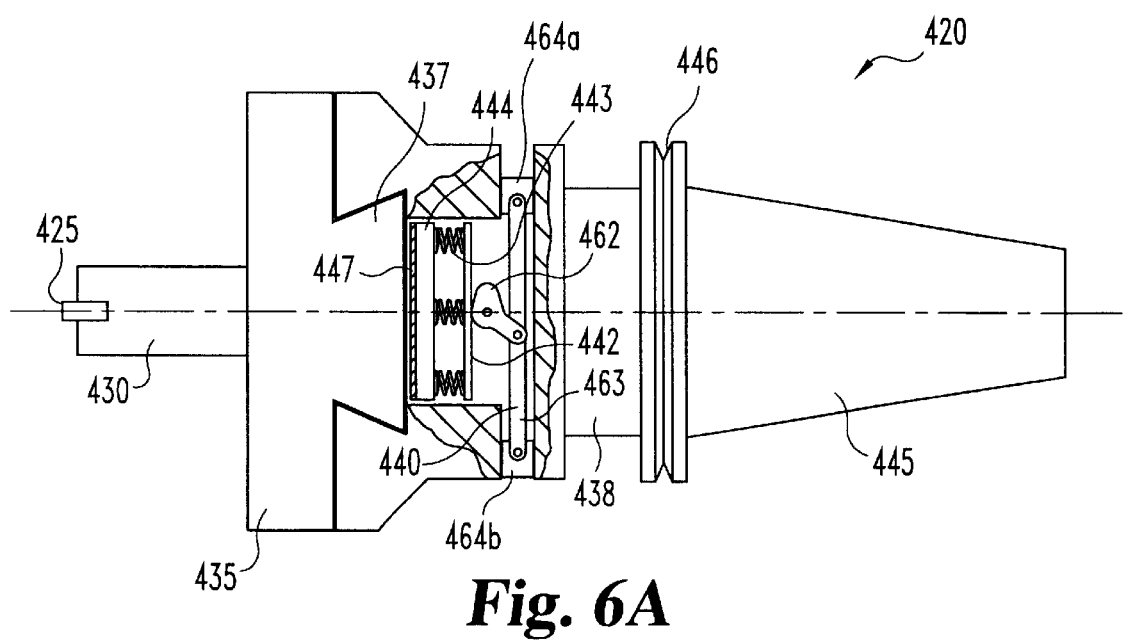
FIG. 6A is a side elevational view of an apparatus according to another embodiment of the present invention, and including a partial internal view.

FIG. 6A shows a side elevational view of an apparatus 420 according to another embodiment of the present invention. Apparatus 420 is a boring tool which includes a slidably adjustable cutting tool 425. Cutting tool 425 is fixedly supported, such as by a tool support 430, which extends from a slidably adjustable tool holder 435. Tool holder 435 preferably includes a joint 437 such as dovetail joint or T-joint which slidingly couples to a complementary-shaped joint of a coupling element body 438. Coupling element body 438 is part of a coupling element 445. Coupling element 445 preferably includes a conically-shaped end and a coupling interface 446, both of which locate boring tool 420 in a drive unit such as drive unit 88 of electronically controlled machine 82 (referring to FIG. 4).

Referring again to FIG. 6A, apparatus 420 includes a friction adjustment apparatus 440 for clamping the sliding cutting tool to the boring tool which applies a normal force between facing contact surfaces of apparatus 420, which can also be operated as means for actuating a variable friction force between a pair of contact surfaces, at least one of the contact surface being on sliding tool holder 435. Actuating means 440 includes a member 442 which displaces a plurality of springs 443 so as to urge member 444 toward tool holder 435. A surface treatment or surface coating 447 applied to member 444 (as shown), or alternately to the opposing face of tool holder 435, creates a frictional drag which opposes lateral sliding movement of tool holder 435. Further, the present invention contemplates application of a surface treatment or surface coating 447 to any pair of contact surfaces loaded in compression between tool holder 435 and body 438.

Actuating means 440 includes a cam 462 pivotally coupled to body 438, and also pivotally coupled to a linkage 463. Arranged on either end of linkage 463 are moveable buttons 464a and 464b. As shown in FIG. 6A, actuating means 440 is in a first state in which button 464b is in an outward location, and cam 462 pivoted to a first position. Cam 462 displaces member 442 by a first predetermined distance and thereby applies a first predetermined force through springs 443 which create a first contact force against sliding tool holder 435. This first contact force creates a corresponding first frictional force which resists sliding motion of tool holder 435.

Actuation means 440 can also be actuated to a second state which results in a second predetermined frictional force between contact surfaces of sliding tool holder 435 and either body 438 or actuating means 440. Actuating 440 can be placed in this second state by moving button 464b inward, which action causes linkage 463 to pivot cam 462 to a second position which further displaces member 442 and increases the compression of springs 443. This additional compression of springs results in a higher normal force of member 444 against tool holder 435. Actuation means 440 can be returned to the first state by inward movement of button 464a. Actuation means 440 can be actuated to either the first state or the second state by an operator using a tool to either push or pull buttons 464b or 464a. Further, the present invention also contemplates those embodiments in which actuation means 440 is actuated to either the first state or the second state automatically by a mechanism, such as a mechanism operably coupled to the CNC boring machine. For example, a tool such as a rod can be attached to the boring machine or the table, with the controller of the boring machine placing apparatus 420 such that one of buttons 464a or 464b are in contact with the rod. Subsequent lateral movement of apparatus 420 will result in movement of the contacting button.

Figure 6B:
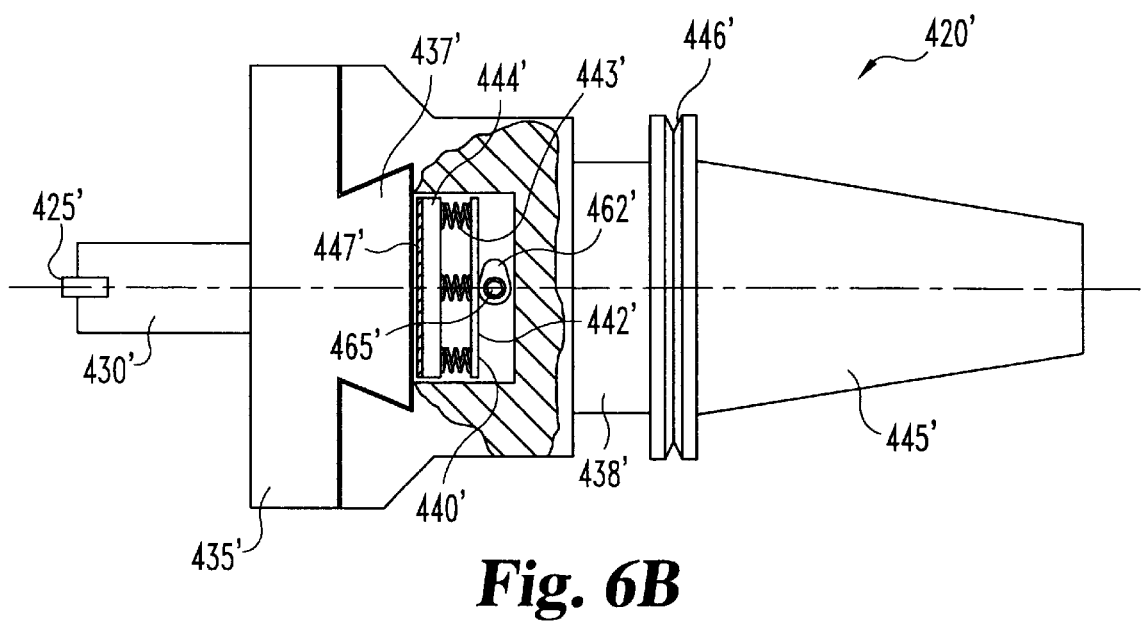
FIG. 6B is a side elevational view of an apparatus according to another embodiment of the present invention, and including a partial internal view.

FIG. 6B depicts an apparatus 420' substantially identical to apparatus 420, but including features for direct coupling of a tool to cam 462'. Apparatus 420b does not necessarily include the push buttons 464a or 464b and does not necessarily include link 463 for actuation of actuating means 440'. Apparatus 440' includes an Allen head or related torque-application feature coincident with pivot point 465 which permits the machine operator to directly pivot cam 462'. Access to the Allen head of cam 462' is provided through a bore (not shown) in body 438'. Thus, an operator can rotate cam 462' with a tool to a first position or state in which frictional forces restraining motion of tool holder 435 can be overcome by an adjusting force laterally applied to tool holder 435. After the position of cutting tool 425' has been laterally adjusted, the operator inserts the tool through the bore of body 435 to turn cam 462' to a second position or state in which a higher frictional force restrains sliding motion of 435, the second higher level of frictional force being sufficient to withstand any lateral loads applied during machining. In addition, the present invention contemplates those embodiments in which cam 462' is turned automatically by a mechanism such as a portion of the CNC machine, without the need for operator manual access.

Figure 7:
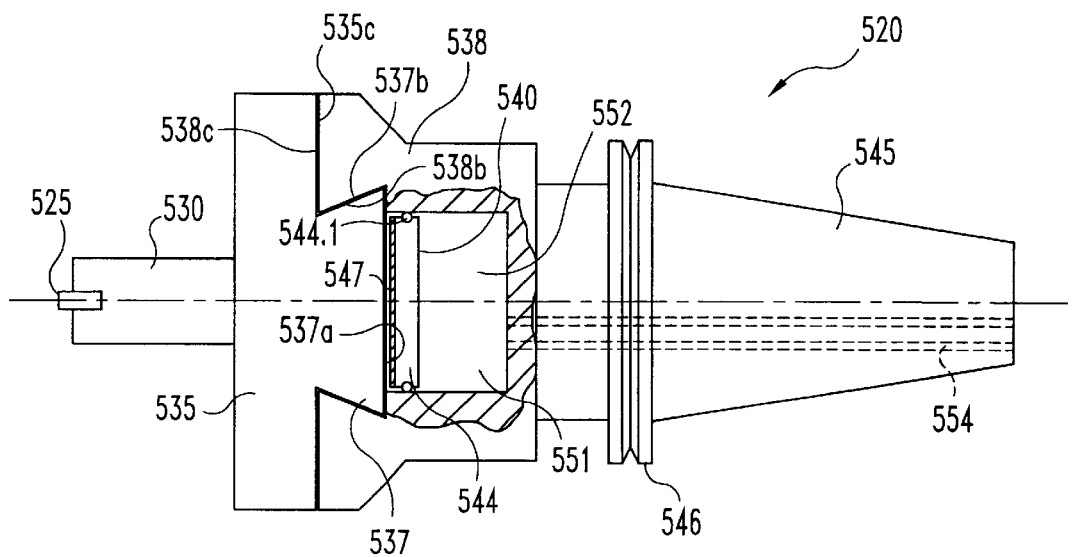
FIG. 7 is a side elevational view of an apparatus according to another embodiment of the present invention, and including a partial internal view.

FIG. 7 shows a side elevational view of an apparatus 520 according to another embodiment of the present invention. Apparatus 520 is a boring tool which includes a slidably adjustable cutting tool 525. Cutting tool 525 is fixedly supported, such as by a tool support 530, which extends from a slidably adjustable tool holder 535. Tool holder 535 preferably includes a joint 537 such as dovetail joint or T-joint which slidingly couples to a complementary-shaped joint of a coupling element body 538. Coupling element body 538 is part of a coupling element 545. Coupling element 545 preferably includes a conically-shaped end and a coupling interface 546, both of which locate boring tool 520 in a drive unit such as drive unit 88 of electronically controlled machine 82 (referring to FIG. 4).

Referring again to FIG. 7, apparatus 520 includes a friction adjustment apparatus 540 for clamping the sliding cutting tool to the boring tool which applies a normal force between facing contact surfaces of apparatus 520, which can also be operated as means 540 for actuating a variable frictional force. Actuating means 540 includes a piston 544 slidable within a chamber 551. Pressure from a source such as a hydraulic pump (not shown) through hydraulic pressure port 554 pressurizes the hydraulic fluid 552 within chamber 551. As one example, a hydraulic pump mounted to machine 82 provides hydraulic pressure through drive unit 88 into port 554 of coupling member 545.

Pressure of fluid 552 results in a corresponding force exerted by member 544 upon sliding tool holder 535. This force exerted by member 544 corresponds to a predetermined frictional force between opposing surfaces of tool holder 535 and either body 538 and/or actuating means 540. In one embodiment, actuating means 540 can be actuated to a first state corresponding to first predetermined frictional force by application of a first hydraulic pressure within chamber 551. In another embodiment, actuating means 540 can also be actuated to a second state in which a second, higher pressure within chamber 551 results in a correspondingly higher frictional force exerted against a contact surface of tool holder 535 to resist sliding movement of tool holder 535 relative to coupling member 545. In addition, the present invention contemplates those embodiments in which pressure is provided pneumatically by a gas such as compressed air.

Figure 8:
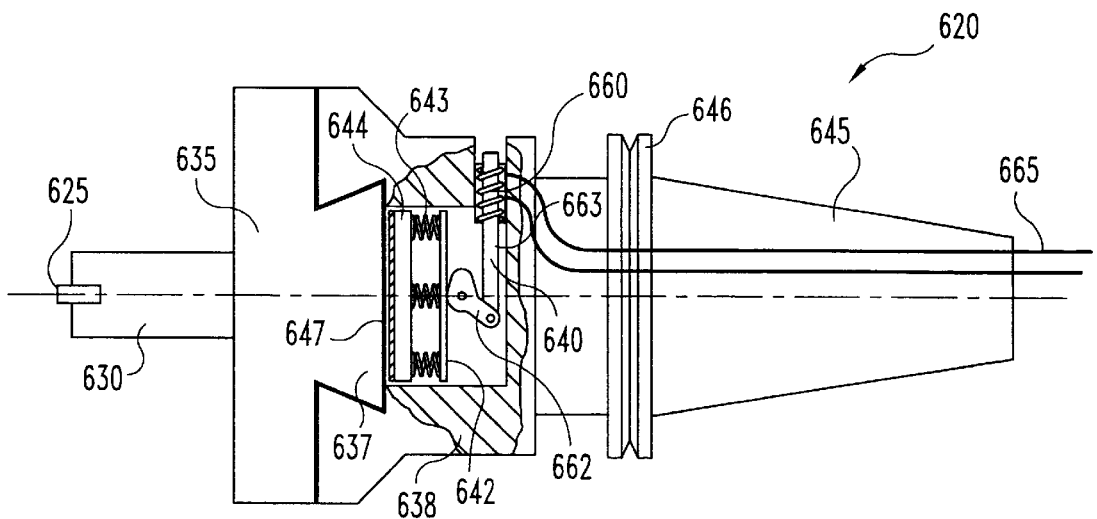
FIG. 8 is a side elevational view of an apparatus according to another embodiment of the present invention, and including a partial internal view.

FIG. 8 shows a side elevational view of an apparatus 620 according to another embodiment of the present invention. Apparatus 620 is a boring tool which includes a slidably adjustable cutting tool 625. Cutting tool 625 is fixedly supported, such as by a tool support 630, which extends from a slidably adjustable tool holder 635. Tool holder 635 preferably includes a joint 637 such as dovetail joint or T-joint which slidingly couples to a complementary-shaped joint of a coupling element body 638. Coupling element body 638 is part of a coupling element 645. Coupling element 645 preferably includes a conically-shaped end and a coupling interface 646, both of which locate boring tool 620 in a drive unit such as drive unit 88 of electronically controlled machine 82 (referring to FIG. 4).

Referring again to FIG. 8, apparatus 620 includes a friction adjustment apparatus 640 for clamping the sliding cutting tool to the boring tool which applies a normal force between facing contact surfaces of apparatus 620, which can also be operated as actuating means for applying a variable frictional force against sliding tool holder 635. Actuating means 640 includes a cam 662 pivotally coupled to body 638 and also pivotally coupled in a slot to linkage 663. Linkage 663 is linearly actuated by an electromagnetic solenoid 660 comprising a core and windings. A pair of electrical conductors 665 provide electrical power from a source (not shown) to actuate solenoid 660 between first and second states. As one example, electrical power is provided from machining apparatus 82 through slip rings (not shown) of drive unit 88 to conductors 665.

As shown in FIG. 8, solenoid 660 is in a first state, in which cam 662 is in a first position to urge springs 643 against a member 644 to create a contact force against tool holder 635. Solenoid 663 can be changed in state to transition link 663 upwards (as seen in FIG. 8) and thus pivot cam 662 to a second position in which springs 643 urge member 644 against tool holder 635 with a second, higher contact force. This second contact force results in a second, higher frictional force applied against tool holder 635 which restrains tool holder 635 from lateral movement during machining.

In one embodiment, solenoid 660 is an electromagnetic solenoid with two positions. As one example, solenoid 660 can be actuated by application of electrical voltage to a first state. Removal of the electrical voltage results in the core of solenoid 660 transitioning to a second state by an internal spring load. In other embodiments, solenoid 660 is a two position latching electromagnetic solenoid, in which application of a first voltage moves the core of solenoid 660 to a first direction to a first position, and application of a reverse voltage moves the core of solenoid 660 in an opposite direction to a second position. Further, the present application contemplates those embodiments in which the core of the electromagnetic solenoid does not directly act upon the cam and linkage of the actuating means, but instead acts upon a second stage, and the second stage provides the motive force necessary to pivot the cam. As one example, the second stage can be a hydraulically actuated stage, in which case the first stage of solenoid 660 operates to actuate an electrohydraulic valve.

Figure 9:
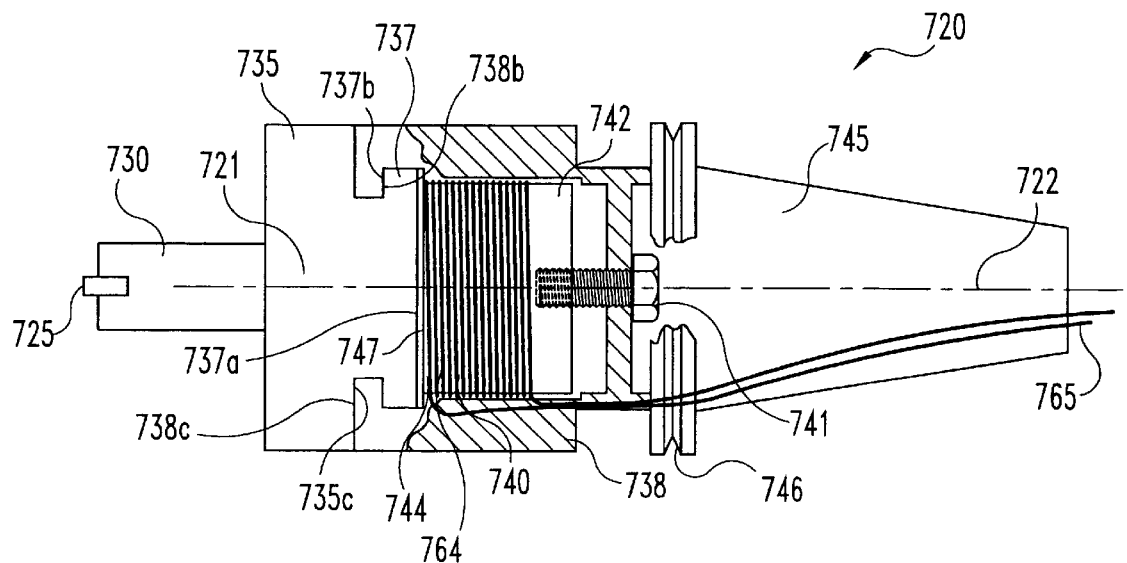
FIG. 9 is a side elevational view of an apparatus according to another embodiment of the present invention, and including a partial internal view.

FIG. 9 shows a side elevational view of an apparatus 720 according to another embodiment of the present invention. Apparatus 720 is a boring tool which includes a slidably adjustable cutting tool 725. Cutting tool 725 is fixedly supported, such as by a tool support 730, which extends from a slidably adjustable tool holder 735. Tool holder 735 preferably includes a joint 737 such as dovetail joint or T-joint which slidingly couples to a complementary-shaped joint of a coupling element body 738. Coupling element body 738 is part of a coupling element 745. Coupling element 745 preferably includes a conically-shaped end and a coupling interface 746, both of which locate boring tool 720 in a drive unit such as drive unit 88 of electronically controlled machine 82 (referring to FIG. 4).

Referring again to FIG. 9, apparatus 720 includes a friction adjustment apparatus 740 for clamping the sliding cutting tool to the boring tool which applies a normal force between facing contact surfaces of apparatus 720, which can also be operated as means for actuating a variable frictional force between contact surfaces of tool holder 735 and either actuating means 740 or coupling body 738. Actuating means 740 includes an electromagnet comprising a core member 744 and windings 764. Core member 744 is coupled at one end to an adjusting screw 741 which can adjust the distance between a face of core member 744 and an opposing face of sliding tool holder 735. As electrical power is applied to conductors 765 from an electrical power source (not shown), voltage and windings 764 create a magnetic field with core member 744 that attracts sliding tool holder 735. The force of attraction created by the electromagnet results in a contact force between opposing surfaces of tool member 735 and body 738. These contact forces result in a corresponding frictional force which restrains tool member 735 from sliding relative to body 738.

Actuating means 740 can be actuated to first and second states of magnetic attraction by corresponding application of first and second electrical currents through conductors 765. These first and second magnetic forces correspond to first and second levels of frictional force for restraining tool holder 735 from lateral movement. Further, some embodiments include application of a single amount of current through conductors 765 so as to apply a single force between opposing contact surfaces. Some embodiments of the present invention contemplate the use of slip rings on the coupling element to provide electrical power from an external source. Yet other embodiments contemplate the use of a battery placed within the boring tool to provide internal electrical power.

Although what has been shown and described is an electromagnet formed from a separable body within body 738 of coupling 745, the present invention further contemplates the use of an electromagnet that is integral to body 738, and which attracts at least a portion of tool holder 735 in a direction so as to create a frictional force on tool holder 735 that resists sliding motion. Further, the present invention also contemplates an electromagnet that is either separable or integral with tool holder 735, and which attracts tool holder 735 toward body 738 when energized. Those embodiments of the present invention using electromagnetic force to create the frictional force that resists sliding contemplate the use of magnetic materials in the construction of the boring tool, such as for the sliding tool holder or for the coupling member. Further, the present invention contemplates those embodiments in which there are two electromagnets, including as a non-limiting example, a first electromagnet coupled to the tool holder and a second electromagnet coupled to the coupling member.

Figure 10:
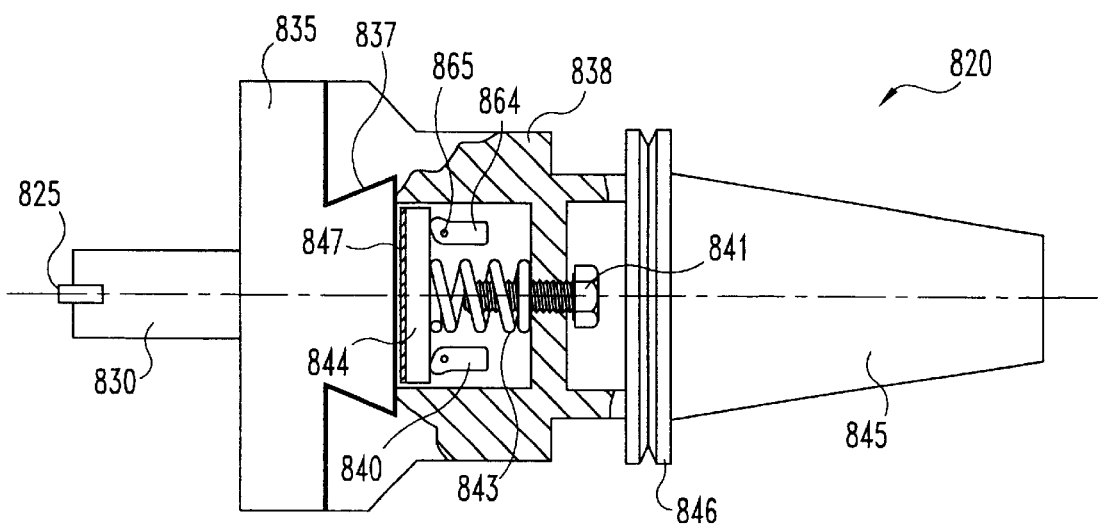
FIG. 10 is a side elevational view of an apparatus according to another embodiment of the present invention, and including a partial internal view.

FIG. 10 shows a side elevational view of an apparatus 820 according to another embodiment of the present invention. Apparatus 820 is a boring tool which includes a slidably adjustable cutting tool 825. Cutting tool 825 is fixedly supported, such as by a tool support 830, which extends from a slidably adjustable tool holder 835. Tool holder 835 preferably includes a joint 837 such as dovetail joint or T-joint which slidingly couples to a complementary-shaped joint of a coupling element body 838. Coupling element body 838 is part of a coupling element 845. Coupling element 845 preferably includes a conically-shaped end and a coupling interface 846, both of which locate boring tool 820 in a drive unit such as drive unit 88 of electronically controlled machine 82 (referring to FIG. 4).

Referring again to FIG. 10, apparatus 820 includes a friction adjustment apparatus 840 for clamping the sliding cutting tool to the boring tool which applies a normal force between facing contact surfaces of apparatus 820, and is also means 840 for actuating a variable force between opposing contact surfaces of sliding tool holder 835 and either coupling body 838 or actuating means 840. Actuating means 840 preferably includes a plurality of centrifugal weights 864 which are pivotally coupled by a pivot 865 to body 838. Actuating means 840 includes an adjusting screw 841 which applies a static load via spring 843 to member 844. This static load from spring 843 applies a first contact force against sliding tool holder 835 in a first, non-rotating state of apparatus 820. This first state creates a frictional force against tool holder 835 sufficient to restrain tool holder 835 from any loose lateral movement, but insufficient to restrain the lateral position of tool holder 835 when the lateral position of the tool holder is adjusted as described herein.

Rotation of apparatus 820 actuates means 840 to a second state which corresponds to a second, higher contact force applied by member 844 against sliding tool holder 835. As apparatus 820 rotates such as for machining an object, the more massive end of centrifugal weights 864 are thrown outwards, causing centrifugal weights 864 to pivot about pivot 865. Preferably, centrifugal weights 864 include a cam-type shape, and the pivoting actions of weights 864 cause the cam end to press against member 844 with a corresponding second, higher level of contact force against tool holder 835.

FIGS. 12–15 depict various views of an apparatus 920 according to another embodiment of the present invention. Apparatus 920 is a boring tool assembly which includes a slidably adjustable cutting tool 925. Cutting tool 925 is fixedly supported, such as by a tool support 930, which extends from a slidably adjustable tool holder 935. Tool holder 935 preferably includes a joint 937 such as a dovetail joint or a T-joint which slidably couples to a complementary-shaped joint of a coupling element body 938. Coupling element 945 includes a coupling element body 938, and locates boring tool 920 on a drive unit such as drive unit 88 of machine 82 (referring to FIG. 4).

Figure 14B:
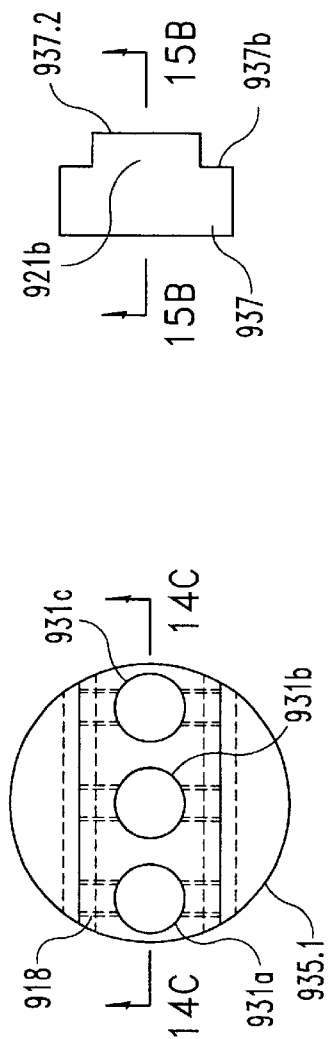
FIG. 14B is a view of the apparatus of FIG. 14A as taken along line 14B—14B of FIG. 14A.

Boring tool 920 preferably includes a multiple piece tool holder 935 which comprises a joint portion 937 coupled by a plurality of bolts 941 to tool holding portion 935.1. Referring to FIGS. 12B and 14B, tool holding portion 935.1 of tool holder 935 includes a plurality of bores 931a, 931b, and 931c for receiving an inserted tool support 930. A set screw (not shown) received within the appropriate threaded hole 918 locks tool support 930 within the specific hole.

Figure 15A:
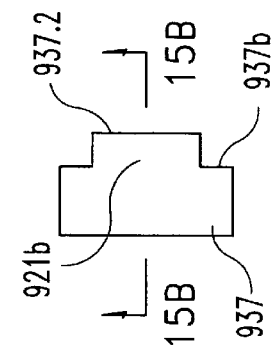
FIG. 15A is a side elevational view of a portion of the apparatus of FIG. 12A.
Figure 15B:
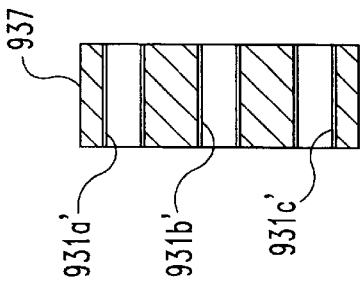
FIG. 15B is a cross sectional view of the apparatus of FIG. 15A as taken along line 15B—15B of FIG. 15A.

As best seen referring to FIGS. 12A, 13A, and 15A, joint portion 937 is slidingly received within a complementary-shaped portion of body 938. A second, tool-holding portion 935.1 is further slidingly received within a second complementary-shaped portion of body 938. Tool holder portions 937 and 935.1 are fastened together by one or more fasteners 941, which in one embodiment is an Allen head screw. Each fastener 941 is received within a counterbored hole 931a, 931b, and/or 931c (as best seen in FIG. 12A and FIG. 14C). Referring to FIGS. 12A, 13A, and 13B, the threaded end of the fastener is received within a counterbored well 938.1 of body 938. As seen in FIG. 15B, joint portion 937 includes one or more threaded holes 931a', 931b', and 931c' to accept the threaded portion of fasteners 941.

Figure 14A:
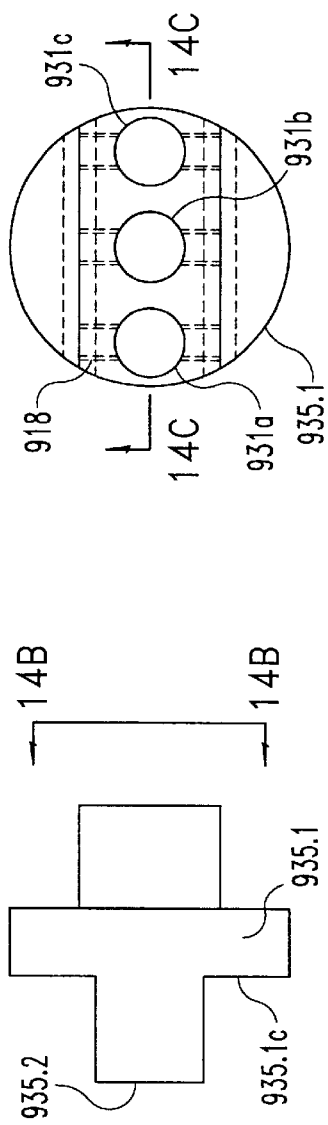
FIG. 14A is a side elevational view of a portion of the apparatus of FIG. 12A.
Figure 14C:
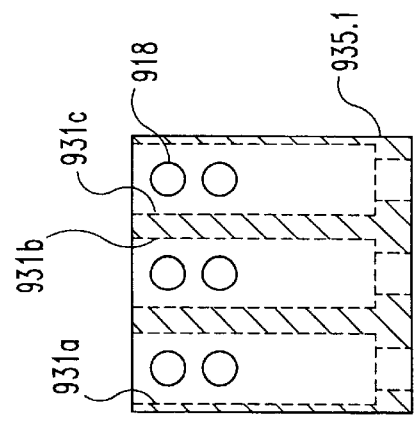
FIG. 14C is a cross sectional view of the apparatus of FIG. 14B as taken along line 14C—14C of FIG. 14B.

Referring to FIGS. 12A, 14A, and 15A, the sliding assembly of tool holder portions 935.1 and 937 within body 938 preferably leaves a small gap between opposing faces 935.2 and 937.2. In those embodiments having this gap, tightening of fasteners 941 results in compression and friction at two faces of body 938. Contact face 937b of T-joint portion 937 is placed in compressive contact with opposing face 938b of body 938 (see FIG. 13A). Further, contact surface 938c is placed in compressive contact with contact face 935.1c of tool holding portion 935.1. Because of the aforementioned gap between opposing faces of portions 937 and 935.1, these are two frictional interfaces for restraining the lateral motion of tool holder 935.

Boring tool 920 can include various combinations of layers of friction materials, surface coatings, and/or surface treatments so as to modify the frictional forces at either the first pair of contact surfaces, 937b and 938b, and/or the second pair of contact surfaces, 935.1c and 938c. As one non-limiting example, a first friction treatment to increase frictional forces can be applied at contact surfaces 938c and/or 935.1c. A second type of frictional treatment to decrease the coefficient of friction can be applied at contact surfaces 937b and/or 938b. In this embodiment, it is preferable to apply the lateral forces for adjusting the position of cutting tool 925 at a contact point 921a along a surface of tool holding portion 935.1, since portion 935.1 is more tightly held by friction than joint portion 937. However, the present invention also contemplates those embodiments in which the lateral force for adjusting the position of the cutting too is applied at a contact point 921b along a surface of T-joint portion 937. The present invention also contemplates those embodiments in which the lateral adjusting force is applied simultaneously along surfaces of portions 937 and 935.1.

FIGS. 16–19 depict various views of an apparatus 1020 according to another embodiment of the present invention. Apparatus 1020 is a boring tool assembly which includes a slidably adjustable cutting tool 1025. Cutting tool 1025 is fixedly supported, such as by a tool support 1030, which extends from a slidably adjustable tool holder 1035. Tool holder 1035 preferably includes a cylindrical joint 1037 which slidably couples to a complementary-shaped joint of a coupling element body 1038. Coupling element 1045 includes a coupling element body 1038 locates boring tool 1020 on a drive unit such as drive unit 88 of machine 82 (referring to FIG. 4).

Figure 16B:
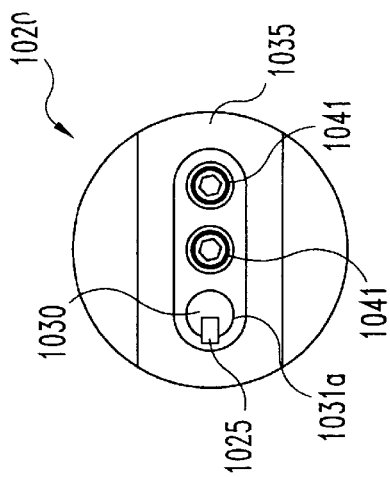
FIG. 16B is a view of the apparatus of FIG. 16A as taken along line 16B—16B of FIG. 16A.
Figure 18B:
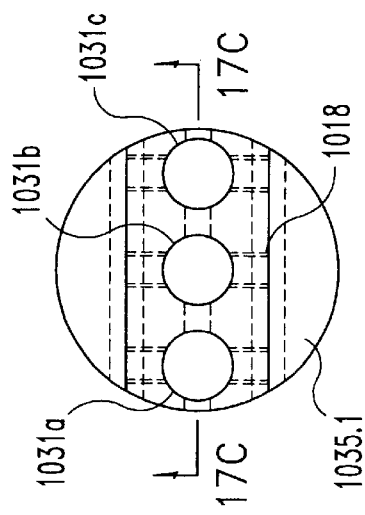
FIG. 18B is a view of the apparatus of FIG. 18A as taken along line 18B—18B of FIG. 18A.

Boring tool 1020 preferably includes a multiple piece tool holder 1035 which comprises a T-joint portion 1037 coupled by a plurality of bolts 1041 to tool holding portion 1035.1. Referring to FIGS. 16B and 18B, tool holding portion 1035.1 of tool holder 1035 includes a plurality of bores 1031a, 1031b, and 1031c for receiving an inserted tool support 1030. A set screw (not shown) received within the appropriate threaded hole 1018 locks tool support 1030 within the specific hole.

Figure 16A:
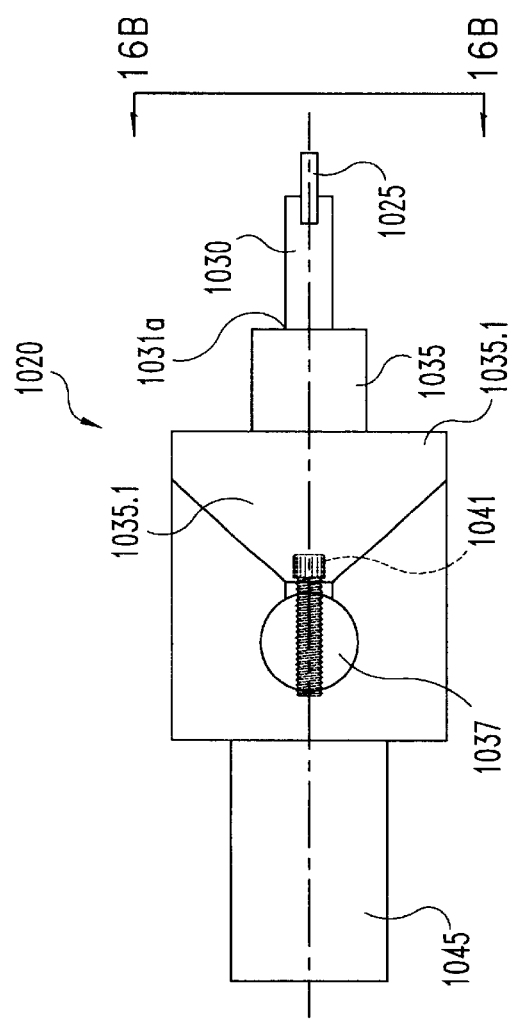
FIG. 16A is a side elevational view of an apparatus according to another embodiment of the present invention.
Figure 17B:
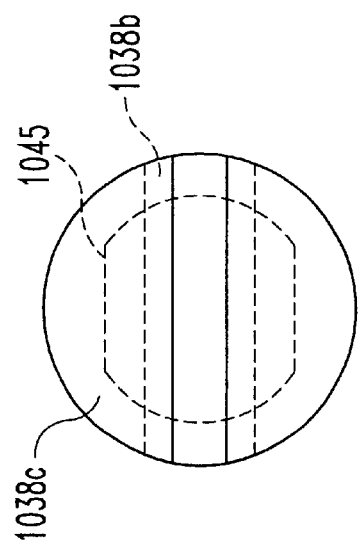
FIG. 17B is a view of the apparatus of FIG. 17A as taken along line 17B—17B of FIG. 17A.
Figure 19B:
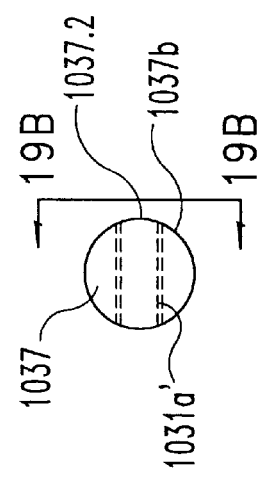
FIG. 19B is a view of the apparatus of FIG. 19A as taken along line 19B—19B of FIG. 19A.
Figure 17A:
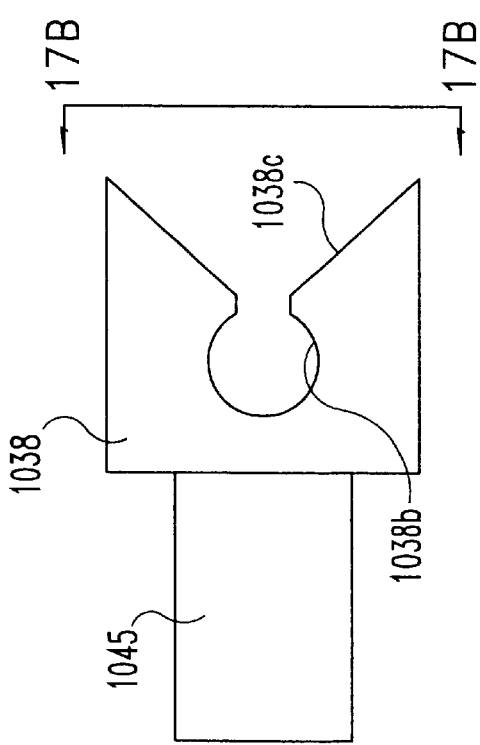
FIG. 17A is a side elevational view of a portion of the apparatus of FIG. 16A.
Figure 19A:
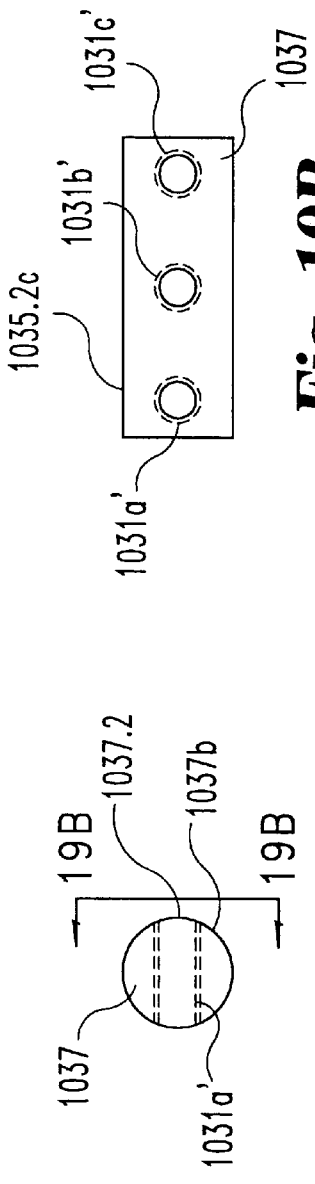
FIG. 19A is a side elevational view of portion of the apparatus of FIG. 16A.

As best seen referring to FIGS. 16A, 17A, and 19A, joint portion 1037 is slidingly received within a complementary cylindrically shaped portion of body 1038. A second, tool holding portion 1035.1 is further slidingly received within a second complementary-shaped portion of body 1038. Tool holder portions 1037 and 1035.1 are fastened together by one or more fasteners 1041, which in one embodiment is an Allen head screw. Each fastener 1041 is received within a counterbored hole 1031a, 1031b, and/or 1031c (as best seen in FIG. 16A and FIG. 18C). Referring to FIGS. 16A, 17A, and 17B, the threaded end of the fastener is received within a counterbored well 1038.1 of body 1038. As seen in FIG. 19B, joint portion 1037 includes one or more threaded holes 1031a', 1031b', and 1031c' to accept the threaded portion of fasteners 1041.

Figure 18A:
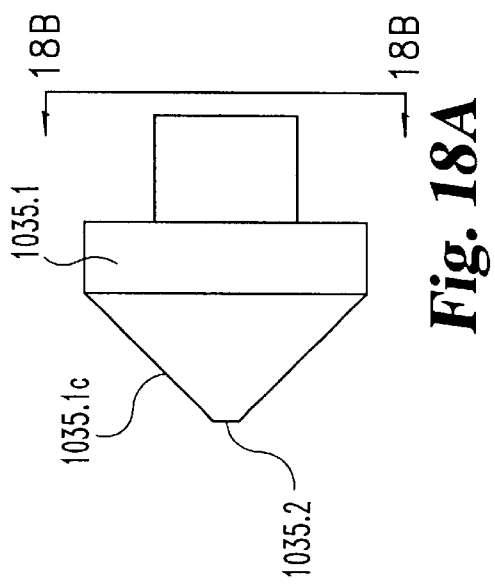
FIG. 18A is a side elevational view of a portion of the apparatus of FIG. 16A.
Figure 18C:
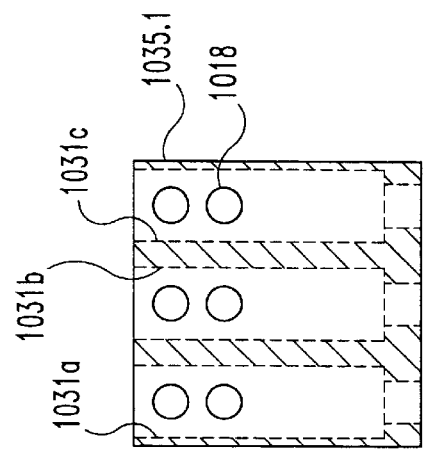
FIG. 18C is a cross sectional view of the apparatus of FIG. 18B as taken along line 18C—18C of FIG. 18B.

Referring to FIGS. 16A, 18A, and 19A, the sliding assembly of tool holder portions 1035.1 and 1037 within body 1038 preferably leaves a small gap between opposing faces 1035.2 and 1037.2. In those embodiments having this gap, tightening of fasteners 1041 results in compression and friction at two faces of body 1038. Cylindrical contact face 1037b of joint portion 1037 is placed in contact with opposing face 1038b of body 1038 (see FIG. 17A). Further, contact surface 1038c is placed in compressive contact with contact face 1035.1c of tool holding portion 1035.1. Because of the aforementioned gap between opposing faces of portions 1037 and 1035.1, these are two frictional interfaces for restraining the lateral motion of tool holder 1035.

Boring tool 1020 can include various combinations of layers of friction materials, surface coatings, and/or surface treatments so as to modify the frictional forces at either the first pair of contact surfaces, 1037*b* and 1038*b*, and/or the second pair of contact surfaces, 1035.1*c* and 1038*c*. As one non-limiting example, a first friction treatment to increase frictional forces can be applied at contact surfaces 1038*c* and/or 1035.1*c*. A second type of frictional treatment to decrease the coefficient of friction can be applied at contact surfaces 1037*b* and/or 1038*b*. In this embodiment, it is preferable to apply the lateral forces for adjusting the position of cutting tool 1025 at a contact point 1021*a* along a surface of tool holding portion 1035.1, since portion 1035.1 is more tightly held by friction than joint portion 1037. However, the present invention also contemplates those embodiments in which the lateral force for adjusting the position of the cutting too is applied at a contact point 1021*b* along a surface of joint portion 1037. The present invention also contemplates those embodiments in which the lateral adjusting force is applied simultaneously along surfaces of portions 1037 and 1035.1.

The embodiments of the present invention described and shown herein include a single cutting tool. However, it is understood that the present invention is not limited to embodiments with a single cutting tool, and also contemplates those embodiments in which there are multiple cutting tools on a single coupling element, including those embodiments in which there are multiple slidingly adjustable cutting tools on a single coupling element.

Yet other embodiment of the present invention pertains to a slidably movable cutting tool holder that machines a workpiece during the sliding. In one embodiment, the cutting tool holder includes a contoured external surface, the contour of which corresponds to the desired shape of a hole or other feature to be machined into the workpiece. As the boring tool is advanced toward the object during machining, a static member in rolling or sliding contact with the cutting tool contoured surfaces pushes the cutting tool holder so that the cutting tool machines shape in the sidewall of the hole that corresponds to the shape of the contoured surface. The cutting tool contoured surface acts as a template for the final shape of the sidewalls, and the static member acts as a follower to the template.

Figure 20:
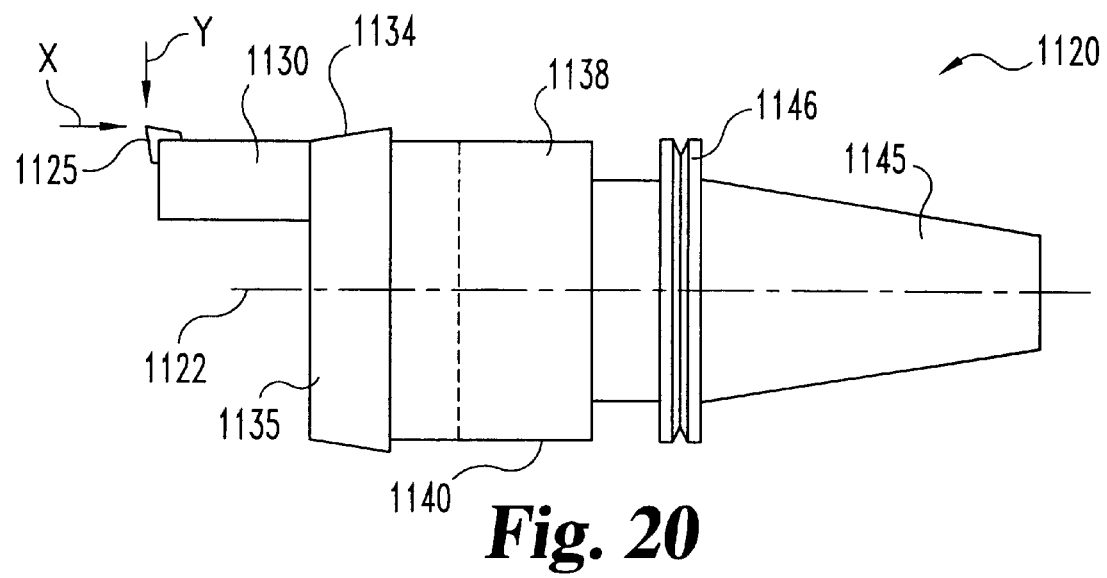
FIG. 20 is a side elevational view of a boring tool according to another embodiment of the present invention.
Figure 21:
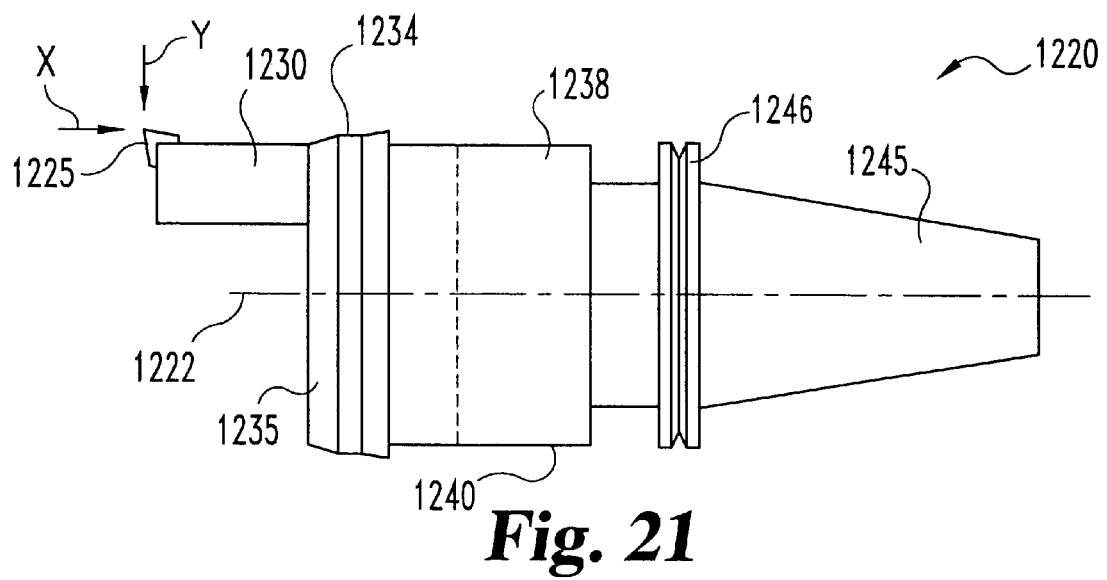
FIG. 21 is a side elevational view of a boring tool according to another embodiment of the present invention.

FIGS. 20 and 21 depict apparatuses 1120 and 1220 respectively, for boring a hole with a contoured sidewall. As used herein the term "contoured sidewall" refers to sidewalls of a hole in which at least a portion of the sidewall has a surface which is not parallel to the centerline of the hole. As non-limiting examples, contoured sidewalls can be conical, radiused, and/or S-shaped.

Boring tools 1120 and 1220 each include a cutting tool held within a cutting tool holder that is slidably coupled to a body of a coupling element. These boring tools include friction adjustment apparatus 1140 and 1240, respectively, for clamping sliding cutting tool to the boring tool by applying a normal surface between facing contact surfaces, and which can also be operated as means for actuating a variable friction force, in the manner generally as previously shown and described herein. However, the friction adjustment apparatus is adjusted to provide a frictional force which is sufficient to withstand any lateral force applied on the cutting tool holder by the machining forces applied to the cutting tool, but insufficient to withstand the lateral forces applied by the static member against the cutting tool holder.

Apparatus 1120 and 1220 differ from the other boring tools described herein by having an external contoured surface on the slidable cutting tool holder. As seen best in FIG. 20, boring tool 1120 includes an angled external surface 1134 which corresponds to a desired bevel angle to be machined into a hole of a workpiece. Referring to FIG. 21, boring tool 1220 includes a cutting tool holder 1235 with a contoured surface 1234 which includes a plurality of external angled surfaces, and also a central straight portion there between. Preferably, template surfaces 1134 and 1234 are hardened such as by heat treating and/or coating. Further, these contoured surfaces can be coated with a material that reduces sliding or rolling friction.

Figure 22:
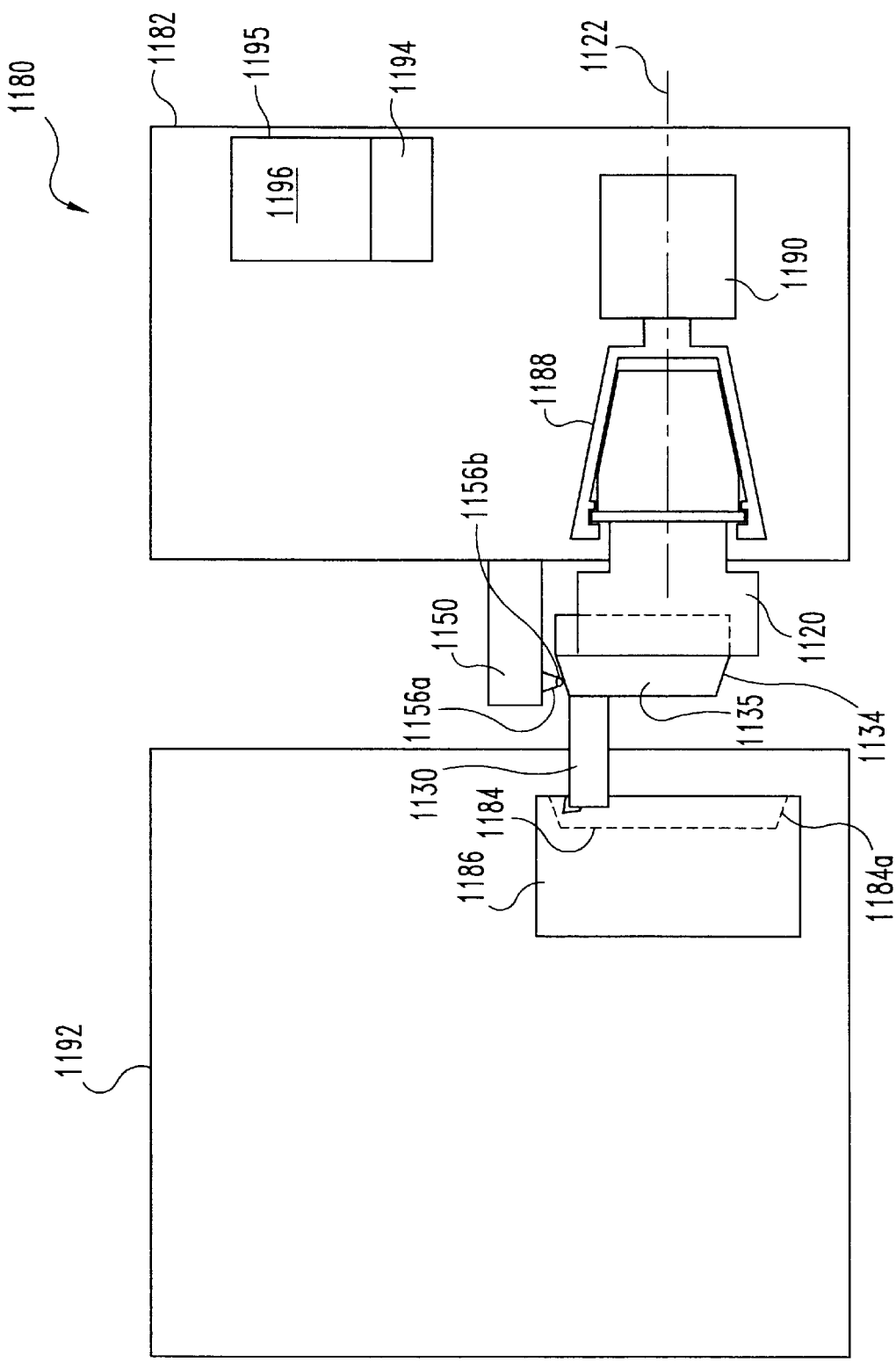
FIG. 22 is a schematic representation of a system for boring a contoured hole according to another embodiment of the present invention.

FIG. 22 schematically depicts a system 1180 according to another embodiment of the present invention. System 1180 preferably includes an electronically controlled machine (such as a CNC boring machine 1182) as previously described. As is well known in the art, boring machine 1182 advances boring tool 1120 along axis 1122 so as to machine workpiece 1186. However, the present invention also includes those embodiments in which table 1192 is moved axially toward the boring tool, which rotates but does not move axially.

System 1180 includes a static member 1150 which is preferably ridged and fixedly mounted to machine 1182. Thus, static member 1150 preferably does not move either axially or laterally as boring tool 1120 rotates and moves axially. However, in those embodiments in which table 1192 move axially toward the boring tool, static member 1150 is rigidly and fixedly mounted to either table 1192 or workpiece 1186.

Static member 1150 includes a projecting follower 1156*a* which preferably includes at its end in antifriction bearing 1156*b*, such as a ball bearing. Antifriction bearing 1156*b* is captured within a socket of follower 1156*a*, and is free to rotate within that socket.

Static member 1150 is located proximate boring tool 1120, such that bearing 1156*b* of follower 1156*a* is in contact with contoured surface 1134 of boring tool 1120. Bearing 1156*b* presses against contoured surface 1134. As boring tool 1120 is advanced forward along axis 1122 toward workpiece 1186, bearing 1156*b* presses against contoured surface 1134, and slides cutting tool 1135 relative to boring tool 1120 by this pressing. Since boring tool 1120 is being rotated by drive unit 1188 during this axial advancement, the resulting hole machined into workpiece 1186 includes a sidewall 1184*a* which includes a contour that corresponds to the contour of surface 1134.

As best seen in FIG. 22, bearing 1156*b* presses against that portion of surface 1144 which is furthest away from rotational centerline 1122. Thus, the pressing of bearing 1156*b* against surface 1134 occurs once per revolution of boring tool 1120. Since cutting tool 1125 is located on that part of cutting tool holder 1135 which is also furthest away from centerline 1122, the sidewall 1184*a* of hole 1184 corresponds directly to the shape of contoured surface 1134.

Figure 23:
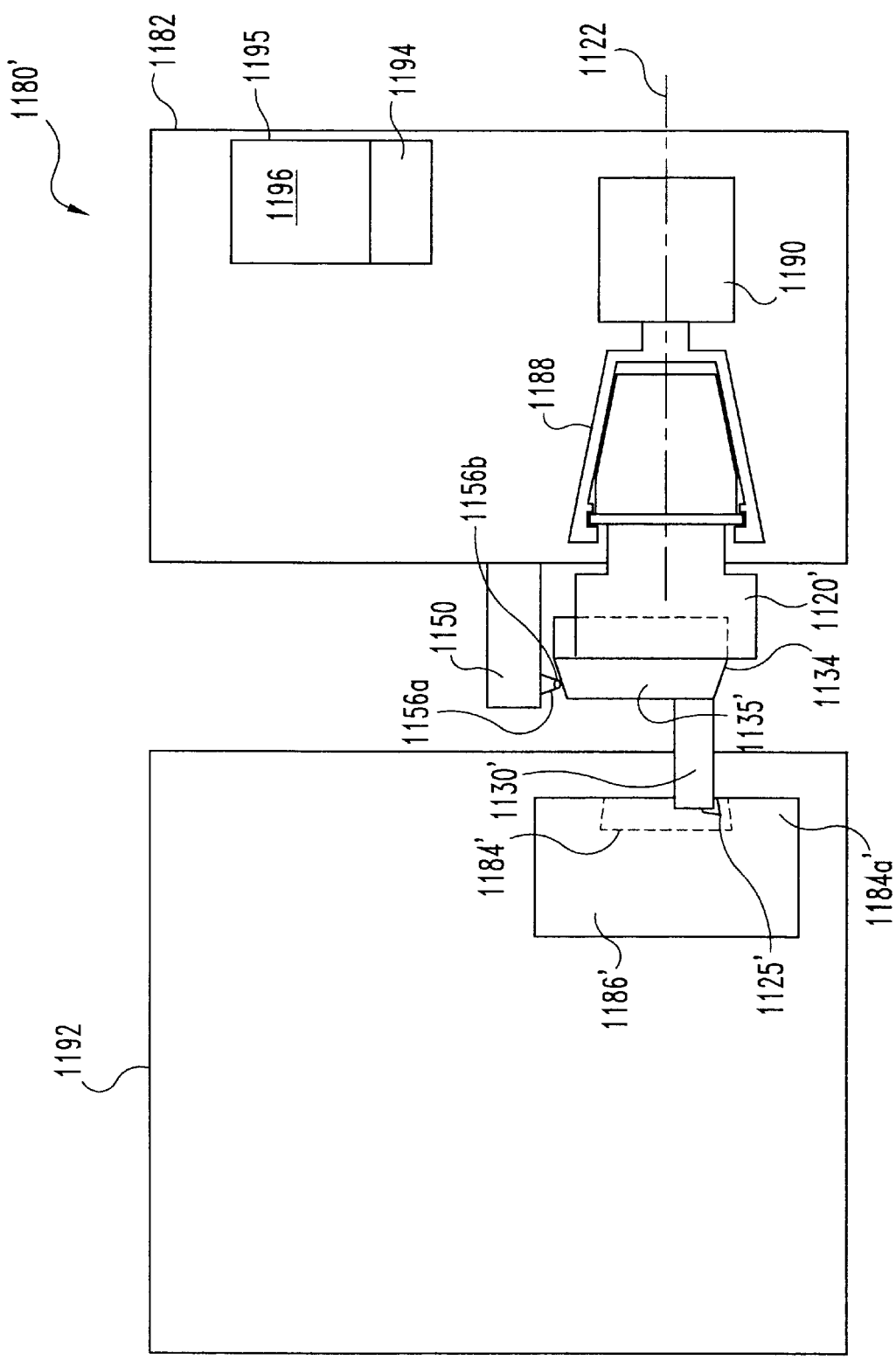
FIG. 23 is a schematic representation of a system for boring a contoured hole according to another embodiment of the present invention.

In contrast, FIG. 23 depicts a system 1180' for boring a hole such that the shape of the sidewalls corresponds to the inverse of the contoured surface of the cutting tool holder. In this embodiment, tool support 1130' is placed on the side of centerline 1122 that is opposite to the side of cutting tool holder 1135' which extends furthest from centerline 1122. As shown in FIG. 23, advancement of boring tool 1120' toward workpiece 1186' results in cutting tool 1125' machining a larger hole diameter as the advancement occurs because of the lateral movement of tool holder 1135. Therefore, contour 1184*a*' of hole 1184' corresponds to an inverted shape of contact surface 1134'.

Figure 24:
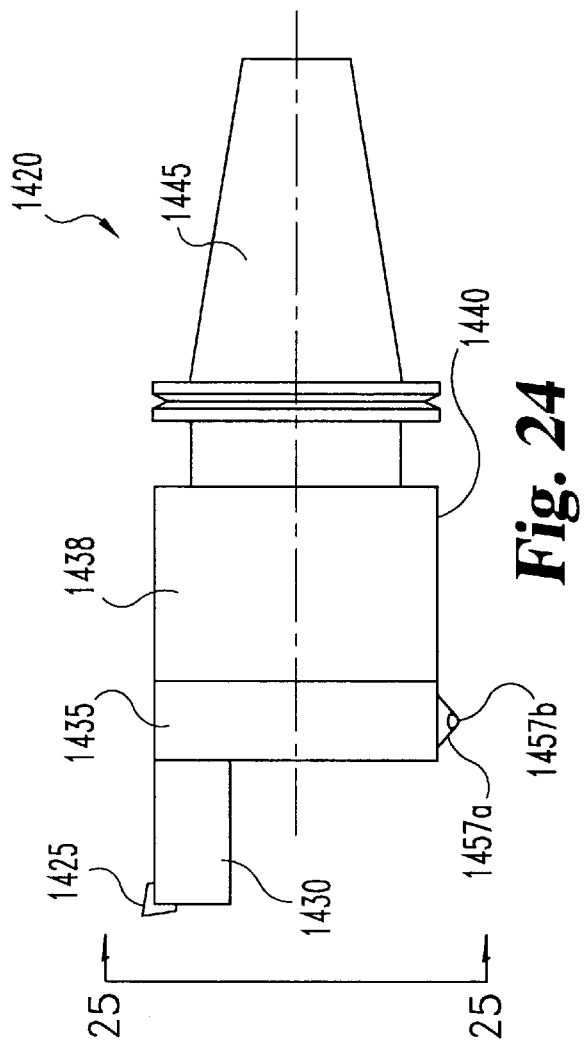
FIG. 24 is a side elevational view of a boring tool according to another embodiment of the present invention.
Figure 25:
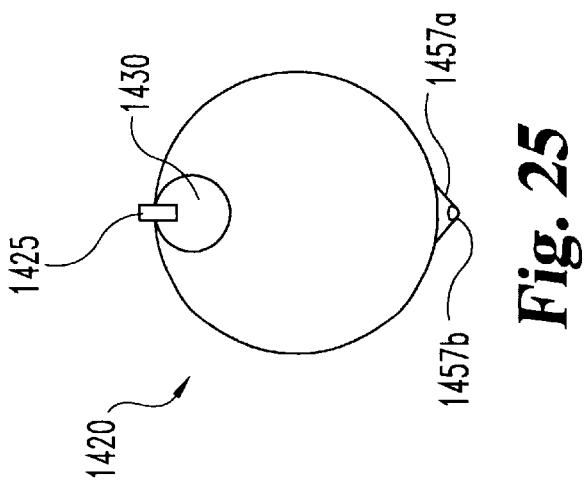
FIG. 25 is an end view of the apparatus of FIG. 24 as taken along line 25—25 of FIG. 24.

In yet another embodiment of the present invention, the contoured surface corresponding to the desired shape of the hole contoured sidewall is placed on the static member, and the surface follower is located on the rotating boring tool. FIGS. 24 and 25 depict an apparatus 1420 for boring a hole with a contoured sidewall.

Boring apparatus 1420 includes the cutting tool, tool support, slidable cutting tool holder, coupling element, and coupling element body as previously described. Further, boring apparatus 1420 includes a friction adjustment apparatus 1440 for clamping the sliding cutting tool to the boring tool which applies a normal force between facing contact surfaces, and which can also be operated as actuating means for applying a variable friction force. However, the friction adjustment apparatus is adjusted to provide a frictional force which is sufficient to withstand any lateral force applied on the cutting tool holder by the machining forces applied to the cutting tool, but insufficient to withstand the lateral forces applied by the static member against the cutting tool holder.

Slidable cutting tool holder 1435 also includes on its outer surface a follower assembly comprising a projecting follower 1457a which preferably includes an antifriction bearing 1457b. Preferably antifriction bearing 1457b is a ball bearing retained in a socket of follower 1457a, and is free to rotate within the socket. As best seen in FIG. 25, follower 1457a and antifriction bearing 1457b are preferably located 180° opposite of cutting tool 1425. Any force applied against bearing 1457b thus tends to radially oppose a component of the machining forces applied to cutting tool 1425.

Figure 26:
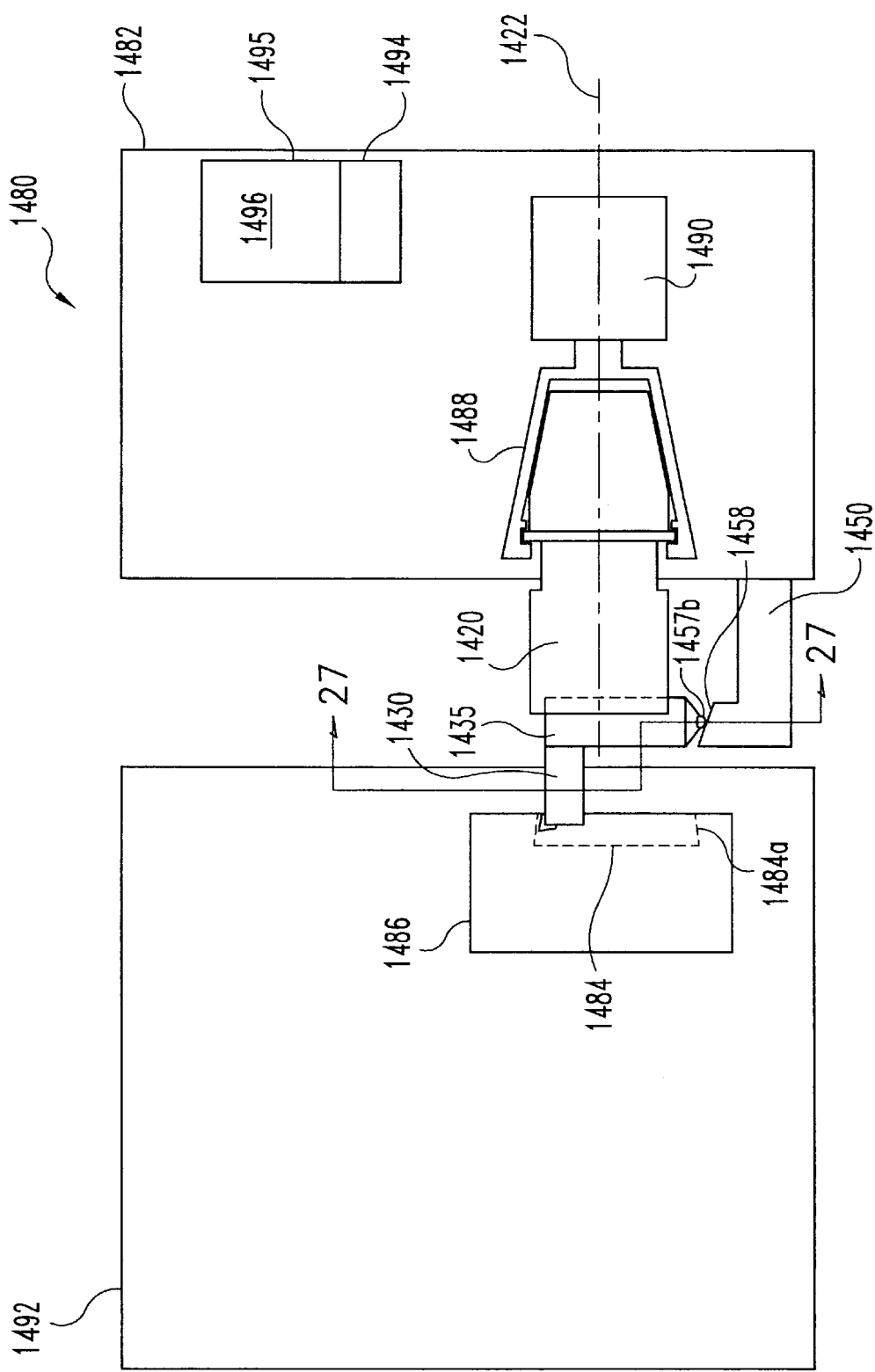
FIG. 26 is a schematic representation of a system for boring a contoured hole according to another embodiment of the present invention.

FIG. 26 schematically depicts a system 1280 according to another embodiment of the present invention. System 1280 preferably includes an electronically controlled machine (such as a CNC boring machine 1282) as previously described. As is well known in the art, boring machine 1282 advances boring tool 1220 along axis 1222 so as to machine workpiece 1286. However, the present invention also includes those embodiments in which table 1292 is moved axially toward the boring tool, which rotates but does not move axially.

System 1480 preferably includes a static member 1450 which is rigidly mounted to either table 1492, workpiece 1486, or for those embodiments in which the cutting tool is advanced along its central axis, to machining apparatus 1482. As shown in FIG. 26, static member 1450 includes a contoured surface 1458 which corresponds to a desired shape in the sidewalls 1484a of hole 1484. Bearing 1457b of boring tool 1420 is in rolling contact with contoured surface 1458. As boring tool 1420 is advanced along axis 1422 toward workpiece 1480, static member 1450 exerts a lateral force on cutting tool holder 1435 which slides tool holder 1435. As depicted in FIG. 26, tool support 1430 is located on the side of centerline 1422 that is opposite to the most radially outward portion of cutting tool holder 1435, and therefore the machined sidewall 1484a corresponds to the inverse of contoured surface 1458. It is understood that the present invention contemplates location of tool support 1430 anywhere on tool holder 1435.

Figure 27:
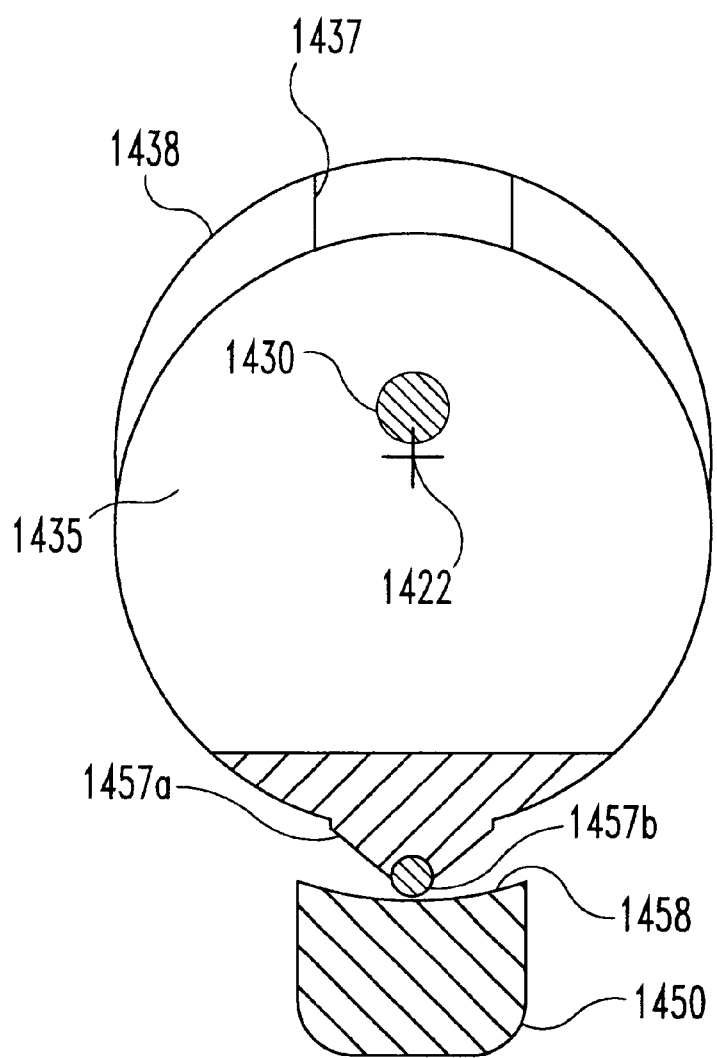
FIG. 27 is a cross sectional view of the apparatus of FIG. 26 as taken along line 27—27 of FIG. 26.

FIG. 27 illustrates a cross sectional view of FIG. 26. It can be seen that contoured surface 1488 preferably has a circular shape in a plane perpendicular to axis 1422.

Figure 28:
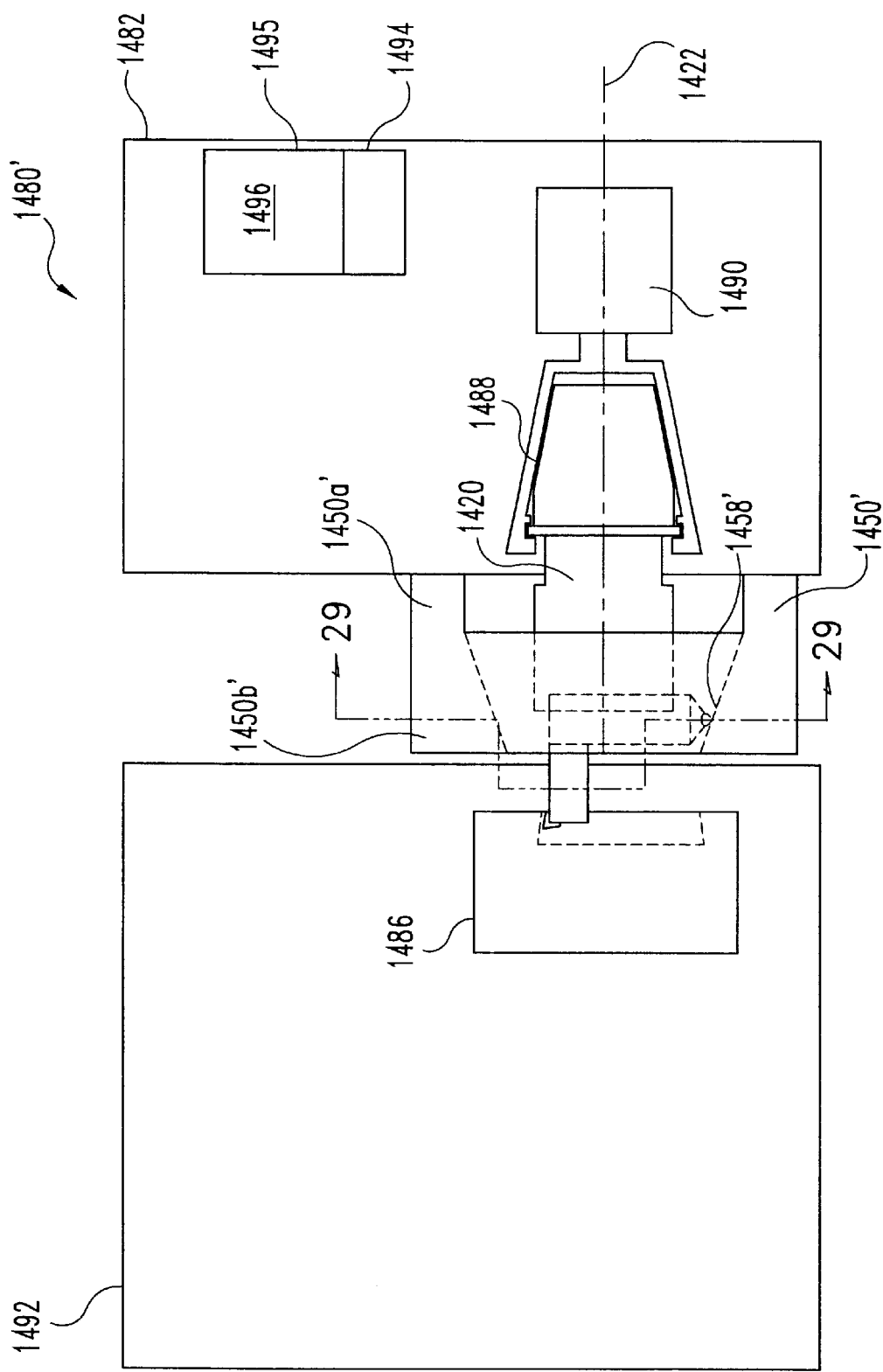
FIG. 28 is a schematic representation of a system for boring a contoured hole according to another embodiment of the present invention.

FIG. 28 illustrates a schematic representation of a system 1480' for boring a hole with a contoured sidewall. System 1480' is the same as system 1480 previously described, except for differences in the static member and contoured surface which will now be described.

System 1480' includes a static member 1450' which generally surrounds a portion of boring tool 1420. Static member 1450' includes support members 1450a' which couple a ring 1450b' to machining apparatus 1482. In other embodiments of the present invention, static member 1450' can be fixedly attached to either table 1492 or workpiece 1486.

Ring 1450b' includes a contoured inner surface 1458' which generally surrounds a portion of boring tool 1420. As boring tool 1420 is advanced along axis 1422 toward workpiece 1486, static member 1450' applies a lateral load to bearing 1457b which slides cutting tool holder 1435 during machining. This combined action of axial relative movement and lateral shifting results in a hole whose sidewalls correspond to the shape of contoured surface 1458'.

Figure 29:
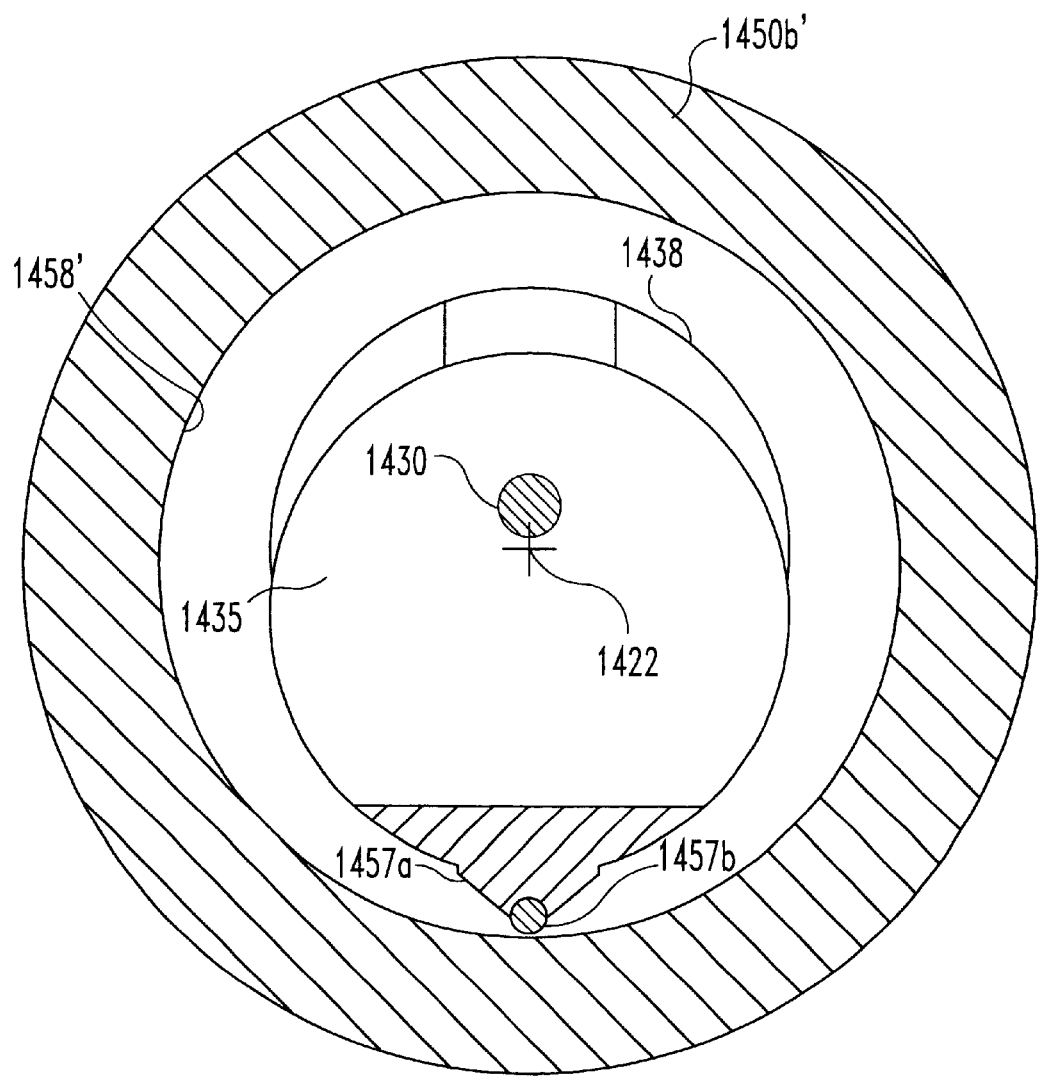
FIG. 29 is a cross sectional view of the apparatus of FIG. 28 as taken along line 29—29 of FIG. 28.

FIG. 29 is a cross sectional view of some of the apparatuses of FIG. 28. As previously discussed, ring 1450b' generally surrounds a portion of cutting tool 1420. As cutting tool 1420 rotates about axis 1422, bearing 1457b is in continuous contact with inner surface 1458'. Therefore, as cutting tool 1420 advances toward the workpiece, the radially inward load applied to bearing 1457b is applied throughout each revolution, in contrast to member 1450 (as seen in FIG. 27) where the radially inward force applied to cutting tool 1435 is applied over a portion of each revolution.

FIGS. 30–34 depict various views of an apparatus 1520 according to another embodiment of the present invention. Apparatus 1520 is a boring tool assembly which includes a slidably adjustable cutting tool 1525. Cutting tool 1525 is fixedly supported, such as by a tool support 1530, which extends from a slidably adjustable tool holder 1535. Tool holder 1535 preferably includes a joint 1537 such as a dovetail joint or a T-joint which slidably couples within a complementary-shaped joint formed by pocket 1538.3 and underside surface 1570b of retention member 1570. Coupling element 1545 includes a coupling element body 1538, and locates boring tool assembly 1520 on a drive unit such as drive unit 88 of machine 82 (referring to FIG. 4). Coupling element 1545 couples tool holder 1535 to the boring machine. Coupling element 1545 is slidable in a direction relative to tool holder 1535. Tool holder 1535 is adjustable over a range of positions in the direction for machining a hole within a range of dimensions that correspond to the range of positions.

Figure 32B:
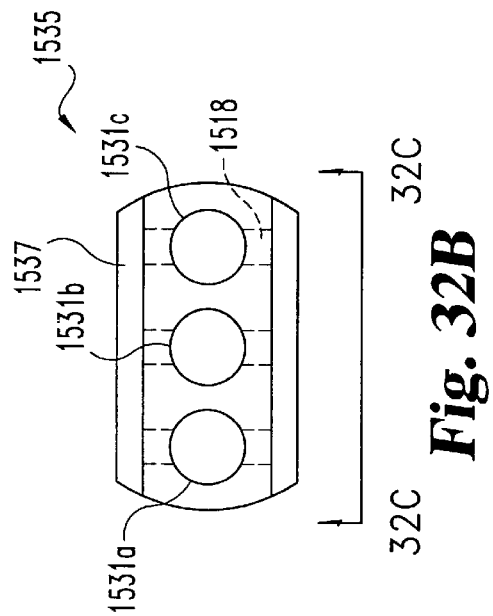
FIG. 32B is a view of the apparatus of FIG. 32A as taken along line 32B—32B of FIG. 32A.
Figure 32C:
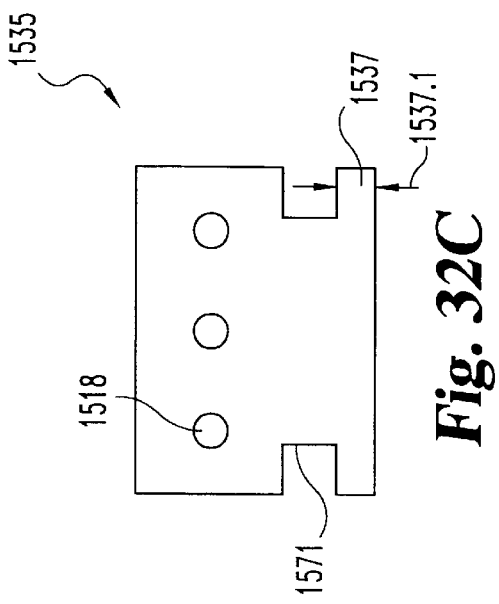
FIG. 32C is a view of the apparatus of FIG. 32B as taken along line 32C—32C of FIG. 32B.
Figure 32A:
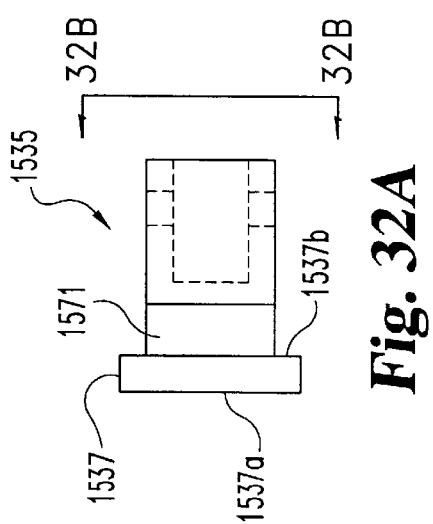
FIG. 32A is a side elevational view of a portion of the apparatus of FIG. 30A.

Boring tool 1520 preferably includes a multiple piece tool holder 1535 which comprises a joint portion 1537. Referring to FIG. 32B, tool holding portion 1535.1 of tool holder 1535 includes a plurality of bores 1531a, 1531b, and 1531c for receiving an inserted tool support 1530. A set screw (not shown) received within the appropriate threaded hole 1518 locks tool support 1530 within the specific hole.

Referring to FIGS. 30A and 30B, tool holder 1535 is slidably captured within the assembly of coupling element 1545, as will be described. Coupling element 1545 includes a body 1538 which includes at least one spring pocket 1538.1, and preferably includes a plurality of spring pockets. In one embodiment, spring pocket 1538.1 accepts therein a biasing member 1543. As shown in FIG. 30A, in one embodiment, biasing member 1543 is a coil spring. However, the present invention contemplates other types of biasing members, including, for example, pneumatically or hydraulically actuated expandable pressure vessels, coil springs, and leaf springs.

Figure 34B:
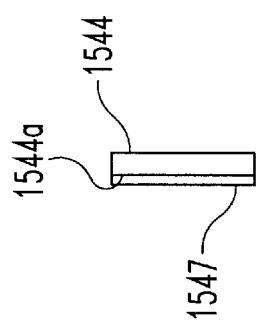
FIG. 34B is a view of the apparatus of FIG. 34A as taken along line 34B—34B of FIG. 34A.
Figure 34A:
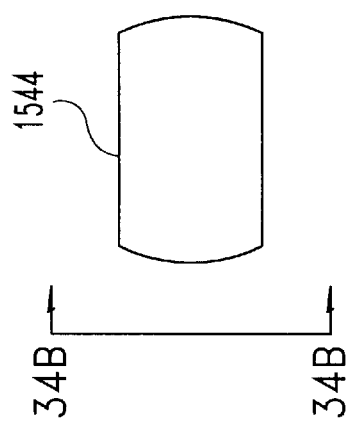
FIG. 34A is an end elevational view of a portion of the apparatus of FIG. 30A.
Figure 33:
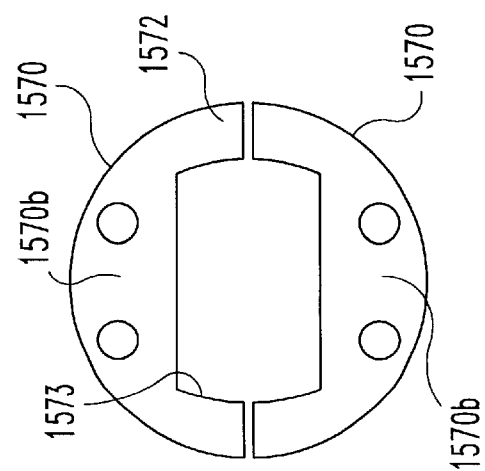
FIG. 33 is an end elevational view of a portion of the apparatus of FIG. 30A.

Preferably, each spring 1543 has a height that is greater than the depth of the corresponding pocket 1538.1. With this arrangement, each spring will "stand proud" when placed within the corresponding pocket. Located on top of the top end of springs 1543 is a movable plate member 1544. Spring forces bias movable member 1544 away from pockets 1538.1. Movable member 1544 preferably resides within a complementary-shaped pocket 1538.2. This pocket accepts the external shape of movable member 1544 (as best seen in FIG. 34A), and is preferably close fitting. However, the present invention also contemplates those embodiments in which movable member 1544 is located within a non-complementary shaped pocket that is not close fitting. Movable member 1544 preferably has a height that is less than the depth of pocket 1538.2.

Although what has been shown and described is an arrangement in which the springs have an end that extends beyond the top of the corresponding pocket, the present invention also contemplates those embodiments in which the springs are equal in height to the pocket, or lesser in height. In some of these embodiments, movable member 1544 includes a corresponding spacer portion that fits within the spring pocket and contacts the top of the spring.

Tool holder 1535 includes a sliding joint portion 1537 that fits within a pocket 1538.3 of body 1538. Joint 1537 has a height 1537.1 that is preferably less than the depth of pocket 1538.3. Tool holder 1535 includes a contact surface 1537*a* which is in contact with surface 1544*a* of movable member 1544. Preferably, surface 1544*a* includes a surface treatment or coating that provides a controlled coefficient of friction with surface 1537*a*. However, the present invention also contemplates those embodiments in which both surfaces 1544*a* and 1537*a* include a surface coating or surface treatment, and also those embodiments in which only surface 1537*a* includes a surface coating or surface treatment. Boring tool assembly 1520 includes means for applying a frictional force between contact surfaces including springs 1543 and movable member 1544.

Tool holder 1535 preferably includes a scalloped recess 1571 which slidably receives the retention ears 1572 of members 1570. A pair of retention members 1570 are received within recess 1571 and fastened to body 1538. Members 1570 compress the assembly of springs 1543, movable member 1544, and joint portion 1537 of holder 1535. Fasteners 1541 are preferably tightened until the underside surface 1570*b* of retention 1570 is in contact with body 1538. Since the height of joint portion 1537 is less than the depth of pocket 1538 and further that the thickness of movable member 1544 is less than the depth of pocket 1538.2, the tightening of fasteners 1541 results in a compression of movable member 1544 against springs 1543. In one embodiment, there are six springs 1543, and each is compressed about 0.1 inches in this assembled condition. These six springs preferably provide from about 10 to 100 pounds of force per spring against movable member 1544. Biasing members 1543 apply a compression force between contact surfaces 1544*a* and 1537*a* to increase the frictional force between those same two contact surfaces, such that sliding movement of tool holder 1535 relative to coupling member 1545 is restrained.

As will be appreciated from FIG. 30A, there is also a frictional interface between surface 1537*b* of tool holder 1535 and surface 1570*b* of retention members 1570. These facing surfaces are maintained in compression by springs 1543. The present invention contemplates those embodiments in which one or both of surfaces 1537*b* and 1570*b* also include coatings or treatments for control of the coefficient of friction therebetween.

Further, although what has been shown and described is a movable member urged by a biasing member against the bottom of the tool holder, the present invention also contemplates those embodiments in which the biasing members act directly against a surface of the sliding tool holder. In such embodiments, the biasing members act directly on the sliding tool holder, and the friction between the sliding tool holder and a retention member restrains lateral sliding of the tool holder.

Some embodiments of the present invention can include a small amount of "positional hysteresis" which affects the manner in which a slidably adjustable tool holder is moved to a position for boring a hole. For example, with regards to certain embodiments of the present invention, when the slidably adjustable tool holder is moved to a position for boring a hole, some components of the boring tool assembly retain a small stress or "memory" which can attempt to move the slidable tool holder back towards the position from which it came. For example, referring to FIG. 12A, boring tool 920 includes two slidable tool holder portions 935.1 and 937. As a lateral force is applied against tool holder portion 935.1, portion 937 within body 938 also slides in the same direction. The lateral force is present until portion 935.1 has moved to a new location. Once the lateral force is removed, portion 935.1 remains at the new position, held in place by frictional forces.

However, in some embodiments, tool holder portion 937 does not move laterally as much as portion 935.1, and therefore exerts a small lateral restoring force through fastener 941 which urges portion 935.1 away from its new position and back towards its original position. Although the frictional force maintaining portion 935.1 in its new location is sufficient to retain it in the desired position under many conditions, it is possible that a vibratory load or other load imposed during machining can cause portion 935 to move slightly as result of the "returning" force or "memory" force exerted by portion 937 and fastener 941. In some embodiments of the present invention, it is believed that this "returning" force is negligible. In other embodiments, the amount of returning lateral movement caused by this returning force can be accounted for in the control algorithm of the CNC boring machine. However, in other embodiments of the present invention, the boring tool assembly includes certain features that minimize and/or eliminate this mechanical hysteresis. FIGS. 35–41 depict various embodiments incorporating a variety of features which relate to the positional "hysteresis" or accuracy of methods, systems, and apparatus pertaining to slidably adjustable tool holders for a boring machine. It is understood that the various features described in these figures are applicable to many of the various embodiments described herein.

Figure 35:
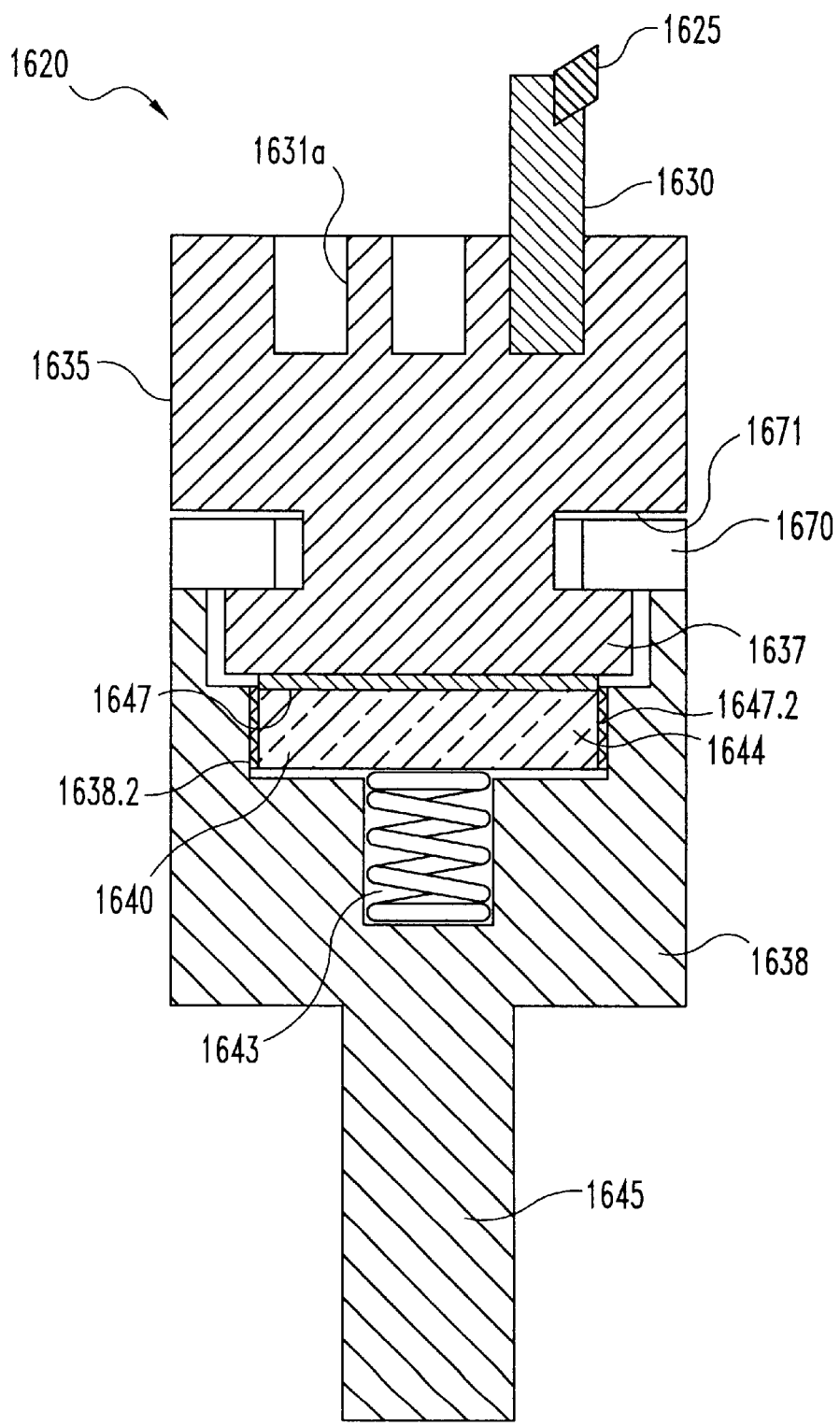
FIG. 35 is a schematic, cross-sectional view of an apparatus according to another embodiment of the present invention.

FIG. 35 is a schematic representation of another embodiment according to the present invention, shown in sectional view through the centerline of the apparatus. Apparatus 1620 is a boring tool assembly which includes a slidably adjustable cutting tool 1625. Cutting tool 1625 is fixedly supported by a tool support 1630, which extends from a slidably adjustable tool holder 1635. Preferably, apparatus 1625 further includes a coupling element 1645 which includes a coupling element body 1638, as well as various internal components which will be described. Tool holder 1635 is slidably retained on coupling member 1645, preferably by a retention member 1670. Retention member 1670 permits sliding of tool holder 1635 in a direction permitting cutting tool 1625 to bore a variety of hole diameters or other features. As one example, referring to FIG. 35, the direction is sideways.

Boring tool assembly 1620 includes an internal frictional adjustment apparatus 1640 which includes a movable member 1644 preferably including a surface treatment or surface coating 1647 for controlling sliding friction and one or more biasing members 1643 which preferably provide an elastic biasing force. As used herein the term elastic refers to the ability of the biasing member to provide a resisting force when the biasing member is placed in compression, tension, torsion and/or shear, such that the member returns to a shape without permanent deformation when the compressing tension, torsion, or shear is removed. For sake of clarity, FIG. 35 includes a single biasing member 1643, but it is appreciated that various embodiments of the present invention contemplate multiple biasing members. Further, although the various figures herein depict a particular type of biasing member, such as a coil spring, it is further appreciated that other embodiments of the present invention include any of the biasing members noted herein, including by way of example centrifugal apparatus, hydraulic or pneumatic pressure mechanisms, magnets, as well as others. And further with the biasing members adapted and configured either to urge apart the tool holder from the coupling member, or to urge together the tool holder and a coupling member. Further, biasing members depicted or described as coil springs can be any type of spring, including torsional, leaf, belleville, and others.

Movable member 1644 is preferably closely fitting within a pocket or bore 1638.2 of body 1638. Because of the close-fitting nature of member 1644 within bore 1638.2, any side to side motion of member 1644 is greatly reduced. However, to further minimize any lateral motion of member 1644, a surface coating 1647.2 is applied to the sides of member 1644. Surface coating or treatment 1647.2 can be any of the coatings or treatment previously described, although preferably the selected coating or treatment minimizes the sliding friction between member 1644 and the contacting walls of pocket 1638.2. As one example, the surface coating could be an organic material such as Teflon®, nylon, or other organic material with low friction and good wear properties. Further, the surface coating or treatment 1647.2 can be a build up of abradable material, a portion of which is worn-off during initial insertion of member 1644 within bore 1638.2. Further, the idea of "surface coating or treatment" as described herein includes the attachment of material to the sides of member 1644, such as by riveting, welding, brazing, use of adhesives, or other methods.

Figure 36:
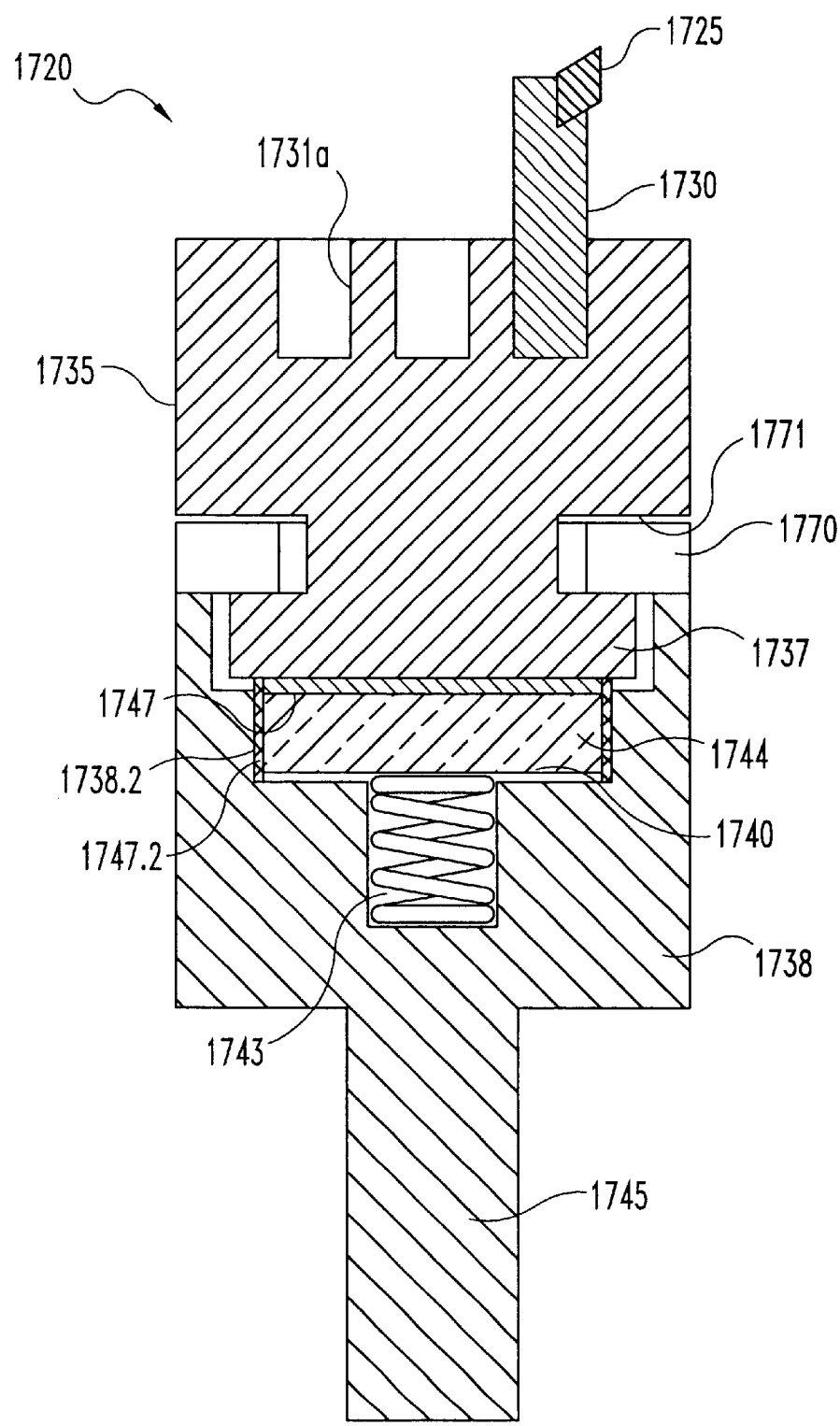
FIG. 36 is a schematic, cross-sectional view of an apparatus according to another embodiment of the present invention.

FIG. 36 is a schematic representation of another embodiment according to the present invention, shown in sectional view through the centerline of the apparatus. Apparatus 1720 is a boring tool assembly which includes a slidably adjustable cutting tool 1725. Cutting tool 1725 is fixedly supported by a tool support 1730, which extends from a slidably adjustable tool holder 1735. Preferably, apparatus 1725 further includes a coupling element 1745 which includes a coupling element body 1738, as well as various internal components which will be described. Tool holder 1735 is slidably retained on coupling member 1745, preferably by a retention member 1770. Retention member 1770 permits sliding of tool holder 1735 in a direction permitting cutting tool 1725 to bore a variety of hole diameters or other features. As one example, referring to FIG. 36, the direction is sideways.

Boring tool assembly 1720 includes an internal frictional adjustment apparatus 1740 which includes a movable member 1744 preferably including a surface treatment or surface coating 1747 for controlling sliding friction and one or more biasing members 1743 which preferably provide an elastic biasing force. As used herein the term elastic refers to the ability of the biasing member to provide a resisting force when the biasing member is placed in compression, tension, torsion and/or shear, such that the member returns to a shape without permanent deformation when the compressing tension, torsion, or shear is removed. For sake of clarity, FIG. 36 includes a single biasing member 1743, but it is appreciated that various embodiments of the present invention contemplate multiple biasing members.

Movable member 1744 is guided within body 1738 of coupling element 1745 in a second direction that is at least partly orthogonal to the direction of sliding. Further, biasing member 1743 applies a force between body 1738 and movable member 1744 that urges movable member 1744 at least partly in the second direction. As will now be discussed, movable member 1744 is substantially restrained from motion in the direction of sliding.

Movable member 1744 is preferably closely fitting within a pocket or bore 1738.2 of body 1738. Because of the close-fitting nature of member 1744 within bore 1738.2, any side to side motion of member 1744 is greatly reduced. However, to further minimize any lateral motion of member 1744, a surface coating 1747.2 is applied to the sides of bore 1738.2. Surface coating or treatment 1747.2 can be any of the coatings or treatment previously described, although preferably the selected coating or treatment minimizes the sliding friction between member 1744 and walls of pocket 1738.2. As one example, the surface coating could be an organic material such as Teflon®, nylon, or other organic material with low friction and good wear properties. Further, the surface coating or treatment 1747.2 can be a build up of abradable material, a portion of which is worn-off during initial insertion of member 1744 within bore 1738.2. Further, the idea of "surface coating or treatment" as described herein includes the attachment of material to the sides of member 1744, such as by riveting, welding, brazing, use of adhesives, or other methods.

Figure 37:
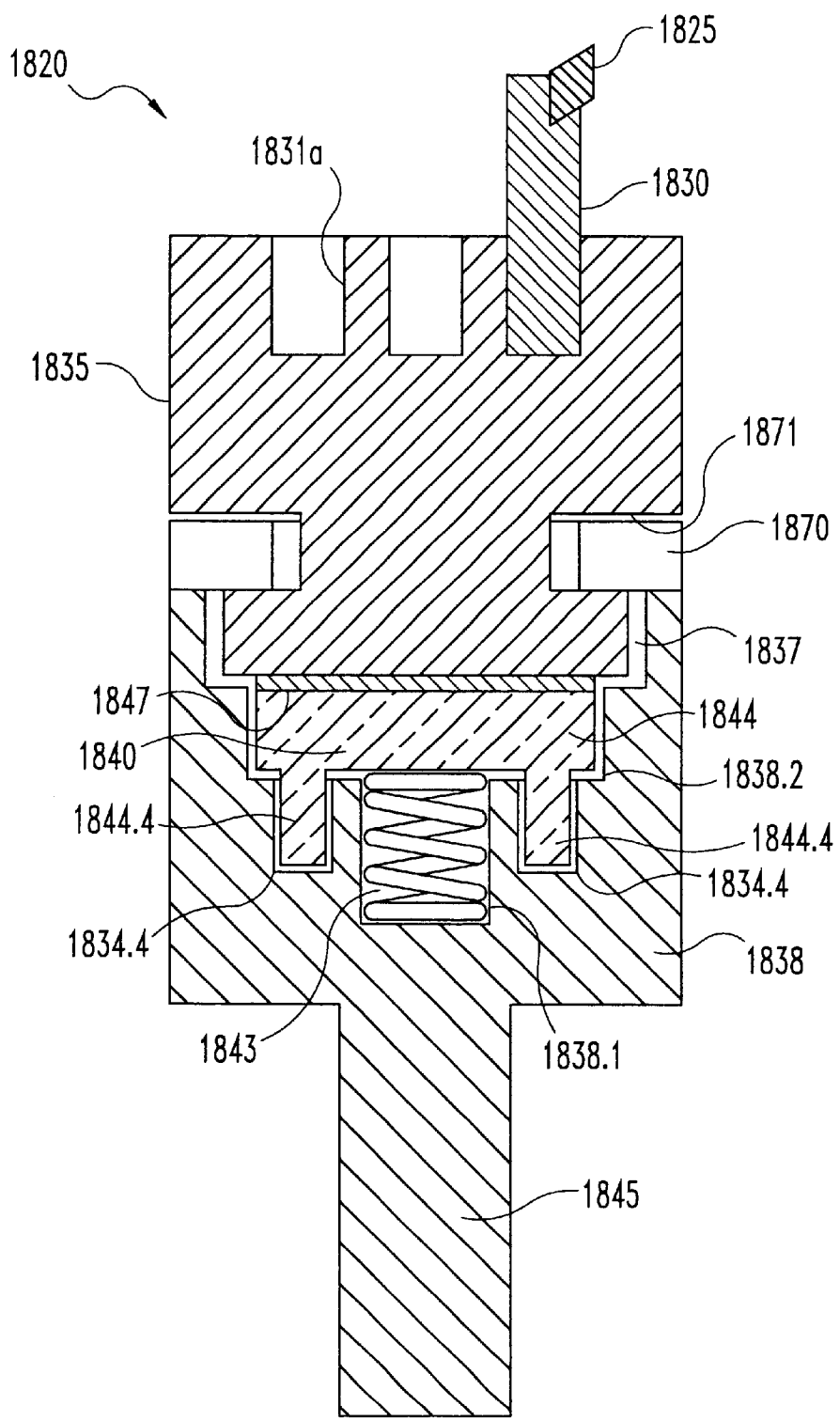
FIG. 37 is a schematic, cross-sectional view of an apparatus according to another embodiment of the present invention.

FIG. 37 is a schematic representation of another embodiment according to the present invention, shown in sectional view through the centerline of the apparatus. Apparatus 1820 is a boring tool assembly which includes a slidably adjustable cutting tool 1825. Cutting tool 1825 is fixedly supported by a tool support 1830, which extends from a slidably adjustable tool holder 1835. Preferably, apparatus 1825 further includes a coupling element 1845 which includes a coupling element body 1838, as well as various internal components which will be described. Tool holder 1835 is slidably retained on coupling member 1845, preferably by a retention member 1870. Retention member 1870 permits sliding of tool holder 1835 in a direction permitting cutting tool 1825 to bore a variety of hole diameters or other features. As one example, referring to FIG. 37, the direction is sideways.

Boring tool assembly 1820 includes an internal frictional adjustment apparatus 1840 which includes a movable member 1844 preferably including a surface treatment or surface coating 1847 for controlling sliding friction and one or more biasing members 1843 which preferably provide an elastic biasing force. For sake of clarity, FIG. 37 includes a single biasing member 1843, but it is appreciated that various embodiments of the present invention contemplate multiple biasing members.

Movable member 1844 is guided within body 1838 of coupling element 1845 in a second direction that is at least partly orthogonal to the direction of sliding. Further, biasing member 1843 applies a force between body 1838 and movable member 1844 that urges movable member 1844 at least partly in the second direction. As will now be discussed, movable member 1844 is substantially restrained from motion in the direction of sliding.

Movable member 1844 is received preferably loosely received within a pocket 1838.2 of body 1838. However, in order to minimize the side to side motion of movable member 1844, member 1844 includes one or more guiding features 1844.4 which are received within one or more corresponding close-fitting complementary-shaped features or bores 1838.4. The acceptance of a guiding feature 1844.4 within a complementary-shaped feature 1838.4 restrains movable member 1844 from side to side motion. In some embodiments of the present invention, one or both of the guiding features 1844.4 and 1838.4 include surface coating or treating as previously described, preferably for minimizing sliding friction. In one embodiment, guiding features 1844.4 are a pair of dowel rods coupled to movable member 1844, and the complementary-shaped guiding feature 1838.4 is a hole or bore having the same external shape as the dowel rod.

Figure 38:
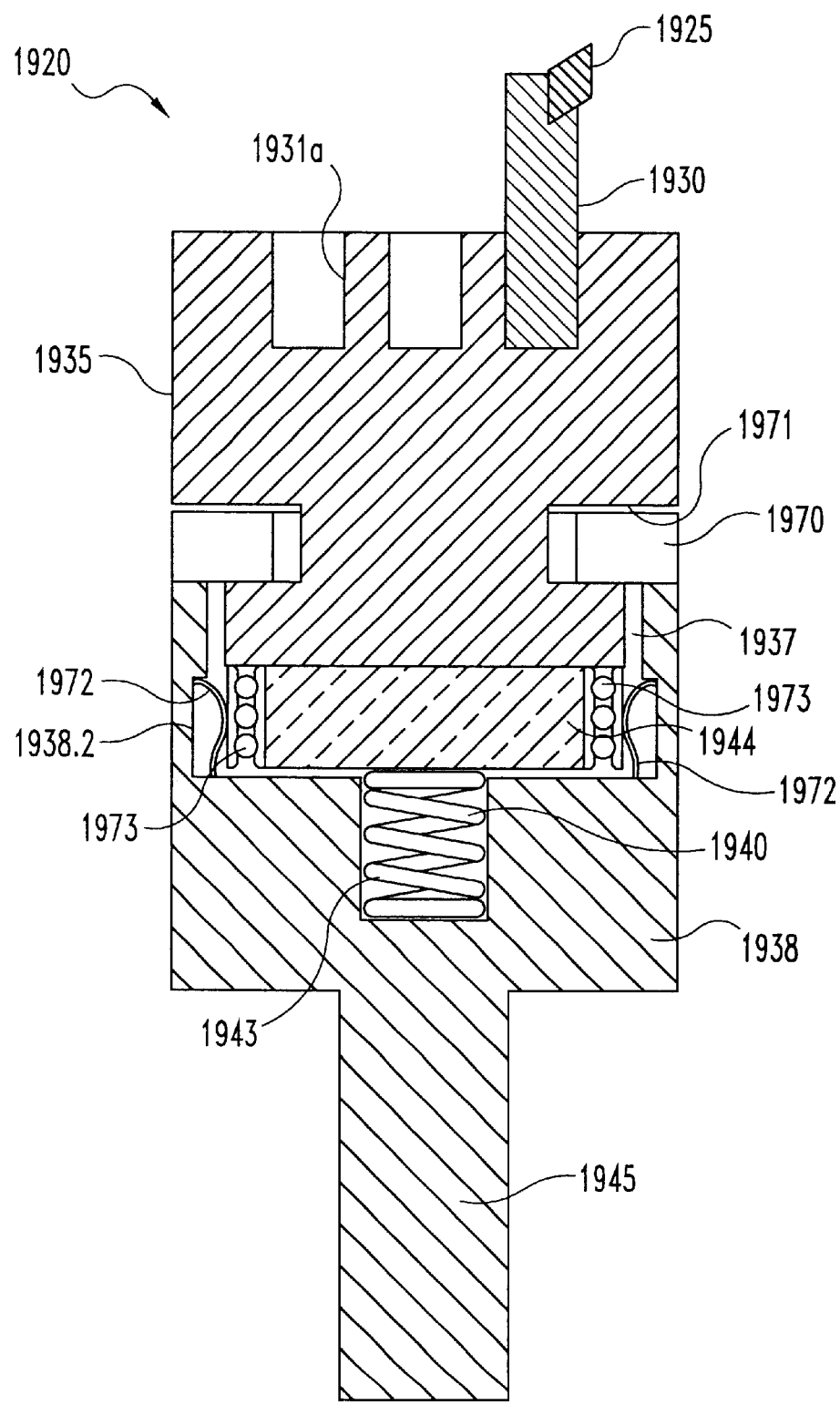
FIG. 38 is a schematic, cross-sectional view of an apparatus according to another embodiment of the present invention.

FIG. 38 is a schematic representation of another embodiment according to the present invention, shown in sectional view through the centerline of the apparatus. Apparatus 1920 is a boring tool assembly which includes a slidably adjustable cutting tool 1925. Cutting tool 1925 is fixedly supported by a tool support 1930, which extends from a slidably adjustable tool holder 1935. Preferably, apparatus 1925 further includes a coupling element 1945 which includes a coupling element body 1938, as well as various internal components which will be described. Tool holder 1935 is slidably retained on coupling member 1945, preferably by a retention member 1970. Retention member 1970 permits sliding of tool holder 1935 in a direction permitting cutting tool 1925 to bore a variety of hole diameters or other features. As one example, referring to FIG. 38, the direction is sideways.

Boring tool assembly 1920 includes an internal frictional adjustment apparatus 1940 which includes a movable member 1944 preferably including a surface treatment or surface coating 1947 for controlling sliding friction and one or more biasing members 1943 which preferably provide an elastic biasing force. For sake of clarity, FIG. 38 includes a single biasing member 1943, but it is appreciated that various embodiments of the present invention contemplate multiple biasing members.

Movable member 1944 is guided within body 1938 of coupling element 1945 in a second direction that is at least partly orthogonal to the direction of sliding. Further, biasing member 1943 applies a force between body 1938 and movable member 1944 that urges movable member 1944 at least partly in the second direction. As will now be discussed, movable member 1944 is substantially restrained from motion in the direction of sliding.

Movable member 1944 is bearingly guided within a pocket 1938.2 of body 1938. An assembly of roller bearings 1973 is preferably located on opposing sides of pocket 1938.2, and reduces any frictional force which opposes the urging force from biasing member 1943.

To reduce the lateral motion of member 1944, preferably at least one of the bearing assemblies 1973 is biased laterally by a spring member 1972. In one embodiment, biasing member 1972 urges a bearing assembly 1973 toward the opposite bearing assembly 1973, such that in the unassembled state, the distance between bearing assemblies is less than the width of movable member 1944. Insertion of member 1944 between the opposing bearing assemblies 1973 results in lateral movement of the spring loaded bearing assembly and compression of spring 1972. When assembled against at least one spring loaded bearing assembly, movable member 1944 does not move laterally unless the lateral force is sufficient to overcome the spring force exerted by spring 1972. Spring 1972 is adapted and configured to urge against movable member 1944 with a lateral force that is preferably greater than the lateral force for adjustment of tool holder 1935.

In yet other embodiments of the present invention, there are bearing assemblies on opposing sides of movable member 1944, with only one side being spring loaded. In some of those embodiments, the non-spring loaded bearing is located on a side of movable member 1944 such that movement of tool holder 1935 in a direction to increase the size of a hole bored by cutting tool 1925 slides movable member 1944 toward the non-spring loaded bearing.

Figure 39:
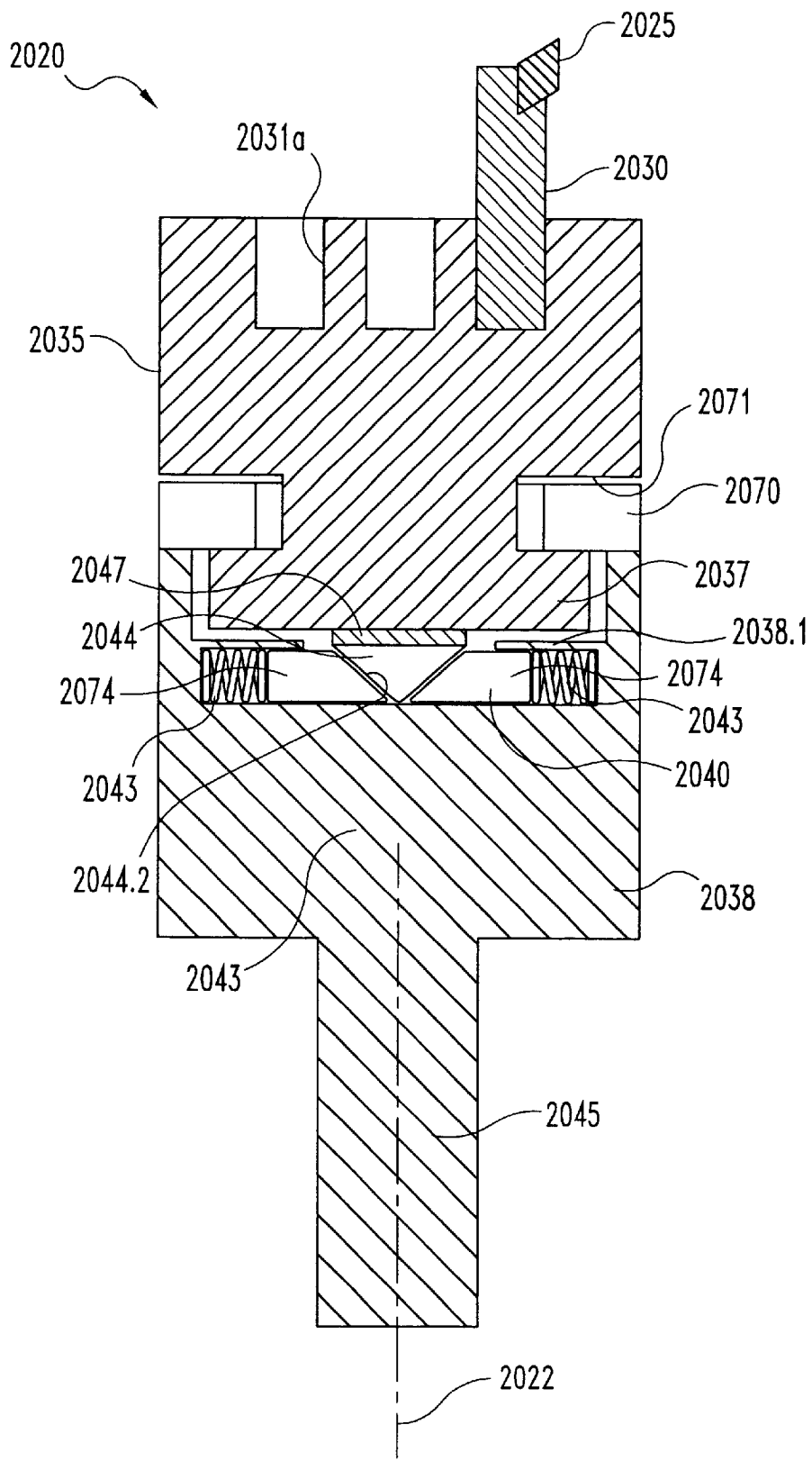
FIG. 39 is a schematic, cross-sectional view of an apparatus according to another embodiment of the present invention.

FIG. 39 is a schematic representation of another embodiment according to the present invention, shown in sectional view through the centerline of the apparatus. Apparatus 2020 is a boring tool assembly which includes a slidably adjustable cutting tool 2025. Cutting tool 2025 is fixedly supported by a tool support 2030, which extends from a slidably adjustable tool holder 2035. Preferably, apparatus 2025 further includes a coupling element 2045 which includes a coupling element body 2038, as well as various internal components which will be described. Tool holder 2035 is slidably retained on coupling member 2045, preferably by a retention member 2070. Retention member 2070 permits sliding of tool holder 2035 in a direction permitting cutting tool 2025 to bore a variety of hole diameters or other features. As one example, referring to FIG. 39, the direction is sideways.

Boring tool assembly 2020 includes an internal frictional adjustment apparatus 2040 which includes a movable member 2044 preferably including a surface treatment or surface coating 2047 for controlling sliding friction and one or more biasing members 2043 which preferably provide an elastic biasing force. For sake of clarity, FIG. 39 includes a single biasing member 2043, but it is appreciated that various embodiments of the present invention contemplate multiple biasing members.

Movable member 2044 is guided within body 2038 of coupling element 2045 in a second direction that is at least partly orthogonal to the direction of sliding. Further, biasing member 2043 applies a force between body 2038 and movable member 2044 that urges movable member 2044 at least partly in the second direction. As will now be discussed, movable member 2044 is substantially restrained from motion in the direction of sliding.

Frictional adjustment apparatus 2040 of boring tool 2020 preferably includes biasing members 2043 and movable member 2044 which are adapted and configured such that the force from biasing members 2043 urge movable member 2044 parallel to the direction of sliding and also in a second direction that is at least partly orthogonal to the direction of sliding. In one embodiment, springs 2043 are located within pockets 2038.1 such that the springs act in a direction with a directional component that is parallel to the direction of the sliding of tool holder 2035.

As shown in FIG. 39, springs 2043 act laterally. Each biasing member 2043 preferably acts upon an intermediate sliding member 2074. Each intermediate member 2074 preferably includes an angled surface in contact with a complementary-shaped surface 2044.2 of movable member 2044. As shown in the particular embodiment of FIG. 39, the angled surfaces of intermediate members 2074 are angled at approximately 45 degrees relative to the centerline 2022 of apparatus 2020. Therefore, the forces from biasing members 2043 act upon movable member 2044 in a direction parallel to the direction of sliding and also orthogonal to the direction of sliding. Therefore, any lateral motion imparted to movable member 2044 by sliding adjustment of tool holder 2035 is resisted by at least one of the biasing members 2043. Further, biasing members 2043 are effective in applying a normal force between movable member 2044 and tool holder 2035 that imparts a frictional force sufficient to restrain lateral motion of tool holder 2035 during machining.

Figure 40:
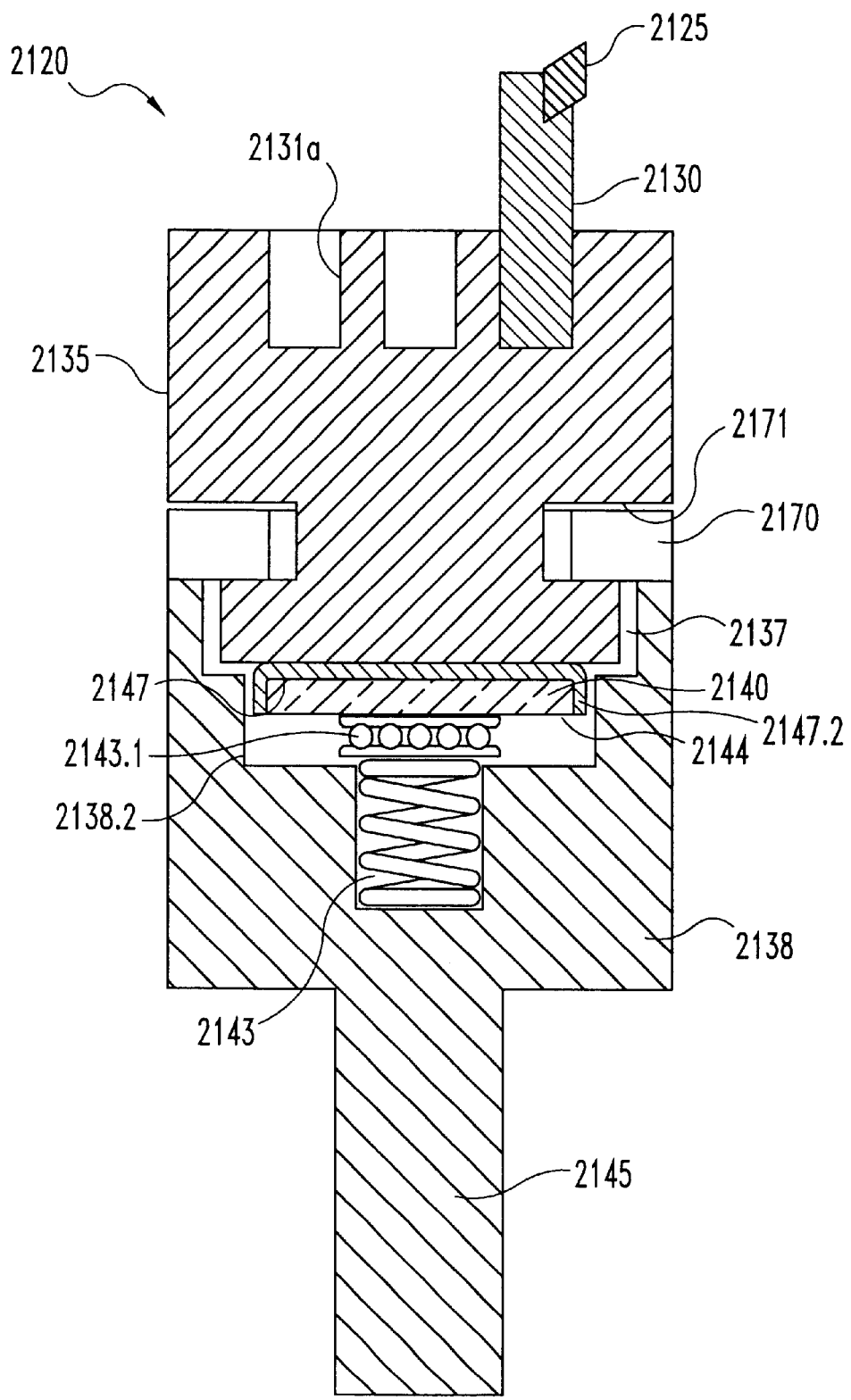
FIG. 40 is a schematic, cross-sectional view of an apparatus according to another embodiment of the present invention.

FIG. 40 is a schematic representation of another embodiment according to the present invention, shown in sectional view through the centerline of the apparatus. Apparatus 2120 is a boring tool assembly which includes a slidably adjustable cutting tool 2125. Cutting tool 2125 is fixedly supported by a tool support 2130, which extends from a slidably adjustable tool holder 2135. Preferably, apparatus 2125 further includes a coupling element 2145 which includes a coupling element body 2138, as well as various internal components which will be described. Tool holder 2135 is slidably retained on coupling member 2145, preferably by a retention member 2170. Retention member 2170 permits sliding of tool holder 2135 in a direction permitting cutting tool 2125 to bore a variety of hole diameters or other features. As one example, referring to FIG. 40, the direction is sideways.

Boring tool assembly 2120 includes an internal frictional adjustment apparatus 2140 which includes a movable member 2144 preferably including a surface treatment or surface coating 2147 for controlling sliding friction and one or more biasing members 2143 which preferably provide an elastic biasing force. For sake of clarity, FIG. 40 includes a single biasing member 2143, but it is appreciated that various embodiments of the present invention contemplate multiple biasing members.

Movable member 2144 is guided within body 2138 of coupling element 2145 in a second direction that is at least partly orthogonal to the direction of sliding. Further, biasing member 2143 applies a force between body 2138 and movable member 2144 that urges movable member 2144 at least partly in the second direction. Movable member 2144 is substantially restrained from motion in the direction of sliding. Movable member 2144 includes a coating 2147.2 on the sides of the movable member that maintain a close fit within bore 2138.2.

Boring tool apparatus 2120 is the same as apparatus 1620 except that there is an assembly of roller bearing 2143.1 interposed between spring 2143 and movable member 2144 that transmit the biasing force from member 2143 to member 2144. Roller bearings 2143.1 minimize any "restoring" lateral force imparted by biasing member 2143 upon movable member 2144.

Figure 41:
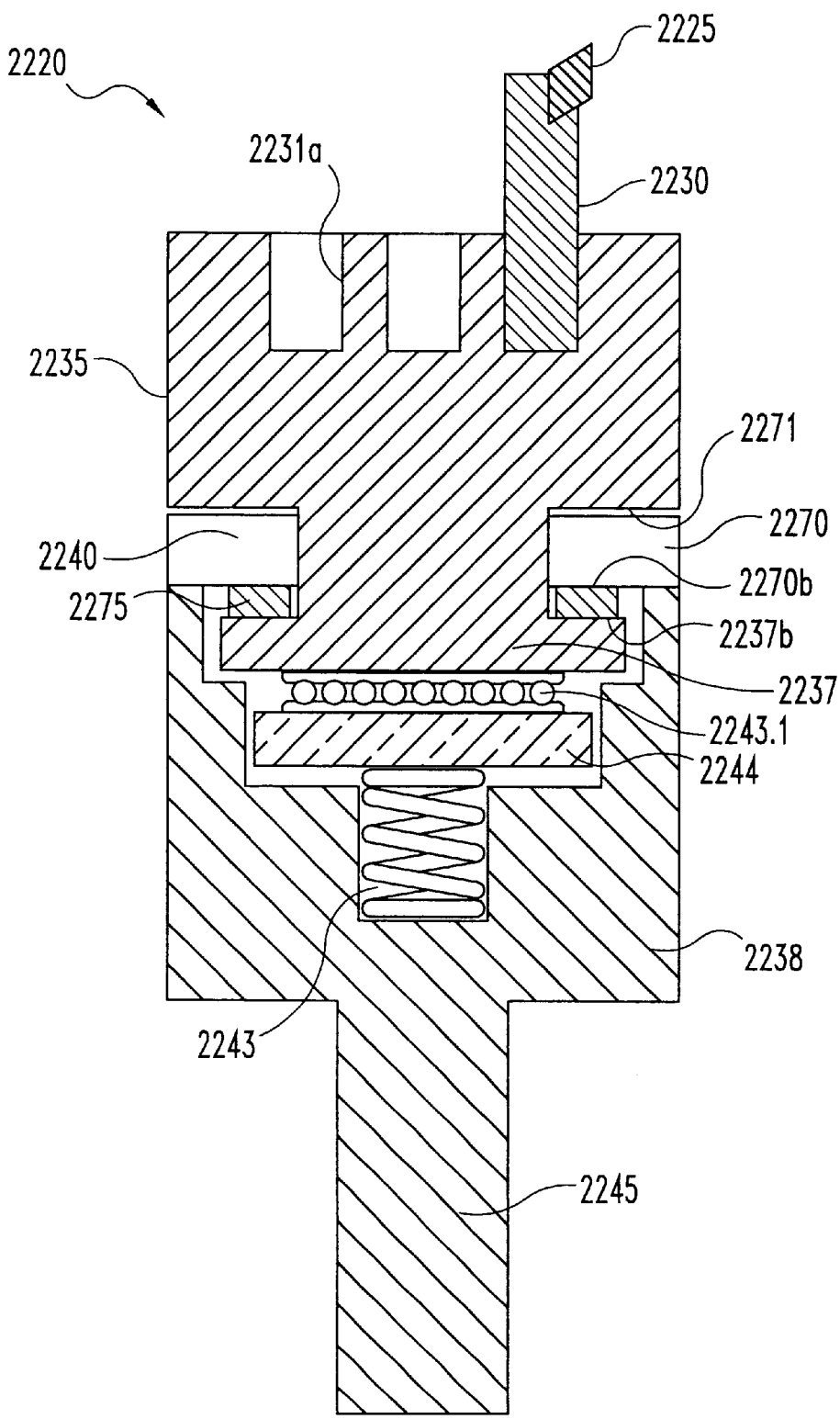
FIG. 41 is a schematic, cross-sectional view of an apparatus according to another embodiment of the present invention.

FIG. 41 is a schematic representation of another embodiment according to the present invention, shown in sectional view through the centerline of the apparatus. Apparatus 2220 is a boring tool assembly which includes a slidably adjustable cutting tool 2225. Cutting tool 2225 is fixedly supported by a tool support 2230, which extends from a slidably adjustable tool holder 2235. Preferably, apparatus 2225 further includes a coupling element 2245 which includes a coupling element body 2238, as well as various internal components which will be described. Tool holder 2235 is slidably retained on coupling member 2245, preferably by a retention member 2270. Retention member 2270 permits sliding of tool holder 2235 in a direction permitting cutting tool 2225 to bore a variety of hole diameters or other features. As one example, referring to FIG. 41, the direction is sideways.

Boring tool assembly 2220 includes an internal frictional adjustment apparatus 2240 which includes a movable member 2244, and one or more biasing members 2243 which preferably provide an elastic biasing force. For sake of clarity, FIG. 41 includes a single biasing member 2243, but it is appreciated that various embodiments of the present invention contemplate multiple biasing members and other types of biasing members.

Movable member 2244 is guided within body 2238 of coupling element 2245 in a second direction that is at least partly orthogonal to the direction of sliding. Further, biasing member 2243 applies a force between body 2238 and movable member 2244 that urges movable member 2244 at least partly in the second direction. As will now be discussed, movable member 2244 is substantially restrained from motion in the direction of sliding.

Boring tool apparatus 2220 includes an internal frictional adjustment apparatus 2240 in which the frictional force restraining the movement of tool holder 2235 during machining is applied between surface 2237b of joint 2237 and surface 2270b of retention member 2270. Preferably, either or both surfaces 2237b and 2270b include a surface coating or treatment 2275 which provides for a controlled frictional interface between slidable tool holder 2235 and retention member 2270 of coupling element 2245. The normal force which provides the aforementioned frictional force comes from a biasing member 2243 which acts on a movable member 2244. An assembly of roller bearings 2243.1 placed between movable member 2244 and the opposing surface of joint 2237 reduces any lateral forces between member 2244 and joint 2237. The present invention also contemplates those embodiments in which a force from the biasing member acts directly upon tool holder 2235.

Figure 42:
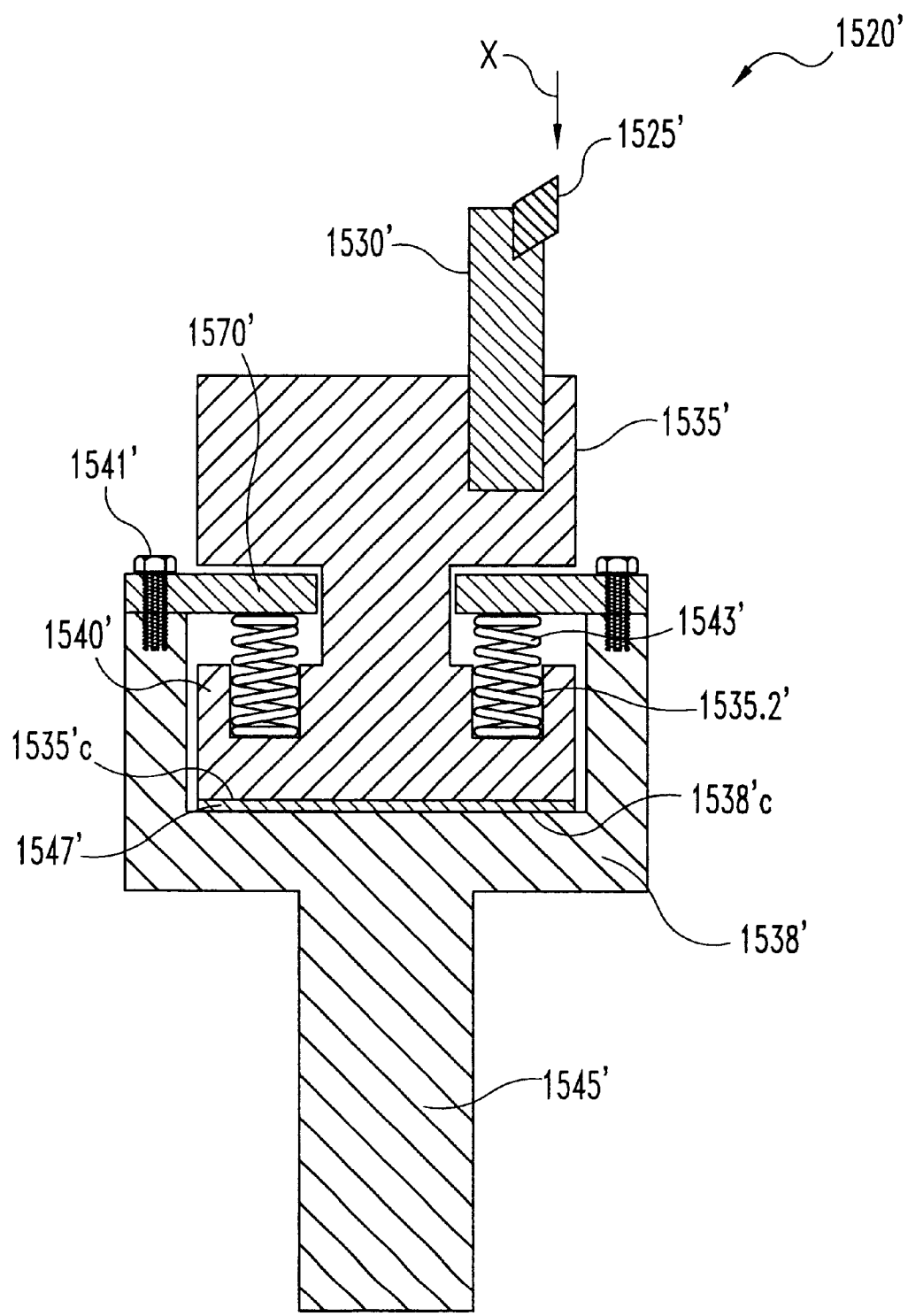
FIG. 42 is a schematic, cross-sectional view of an apparatus according to another embodiment of the present invention.

FIG. 42 is a schematic representation of another embodiment 1520', similar except as described and depicted to apparatus 1520, and shown in sectional view through the centerline of the apparatus. Apparatus 1520' is a boring tool assembly which includes a slidably adjustable cutting tool 1520'. Cutting tool 1525' is fixedly supported by a tool support 1530', which extends from a slidably adjustable tool holder 1535'. Preferably, apparatus 1525' further includes a coupling element 1545' which includes a coupling element body 1538', as well as various internal components which will be described. Although various embodiments shown herein depict various components of the coupling element or the tool support, the present invention also contemplates those alternate embodiments in which these same or equivalent components are included in the other one of the coupling element or tool holder. Tool holder 1535' is slidably retained on coupling member 1545', preferably by a retention member 1570'. Retention member 1570' permits sliding of tool holder 1535' in a direction permitting cutting tool 1525' to bore a variety of hole diameters or other features. As one example, referring to FIG. 42, the direction is sideways.

Boring tool assembly 1520' includes an internal frictional adjustment apparatus 1540' which includes a tool holder 1535', a surface treatment or surface coating 1547' on either tool holder 1535' and/or body 1538' for controlling sliding and static friction, and one or more biasing members 1543' which preferably provide an elastic biasing force.

Tool holder 1535' is located within body 1538' of coupling element 1545' in a second direction that is at least partly orthogonal to the direction of sliding. Further, biasing members 1543' apply a force between body 1538' and tool holder 1535' that urges tool holder 1535' at least partly in the second direction.

One difference between apparatus 1520 and 1520' relates to the direction of biasing force applied by biasing members 1543 and 1543'. Referring briefly to FIG. 30A, springs 1543 are adapted and configured to push apart coupling element 1545 and sliding tool holder 1535. Biasing elements 1543 urge cutting tool 1525 toward the object being machined. In contrast, tool holder 1535' of apparatus 1520' is adapted and configured so that springs 1543' urge tool holder 1535' toward coupling element 1545'. The arrangement and configuration of springs 1543' place a biasing force against the bottom of pockets 1535.2' that is in the same direction as the axial force X applied against cutting tool 1525' during machining of an object. Thus, apparatus 1520' is arranged and configured such that the normal force creating the frictional force is "self-energized" by the axial machining forces X.

Biasing elements 1543' apply a normal force between contact surfaces 1535c' and 1538c' that result in a measure of sliding friction therebetween that is sufficient to restrain lateral motion of tool holder 1535' during machining, but insufficient to prevent lateral sliding of tool holder 1535' relative to coupling element 1545' during adjustment. It is to be appreciated that any of the various embodiments described herein for producing this frictional force can be adapted and configured such that the resultant applied normal force is additive to the axial machining forces in a "self-energizing" manner.

In a variation of this embodiment, springs 1543' are located within pockets of tool holder 1535' on the opposite side of retention members 1570'. For those embodiments in which coil springs 1543' are compression springs, tool holder 1535' is urged away from coupling member 1545', with the frictional interface being between the inner surface of retention members 1570' and the upper, inner surface of tool member 1535'. Because of the pockets being located on the opposite side of retention members 1570', the weight of tool holder 1535' is reduced. Further, the length of coupling element 1545' can be reduced, further reducing its weight.

Figure 43:
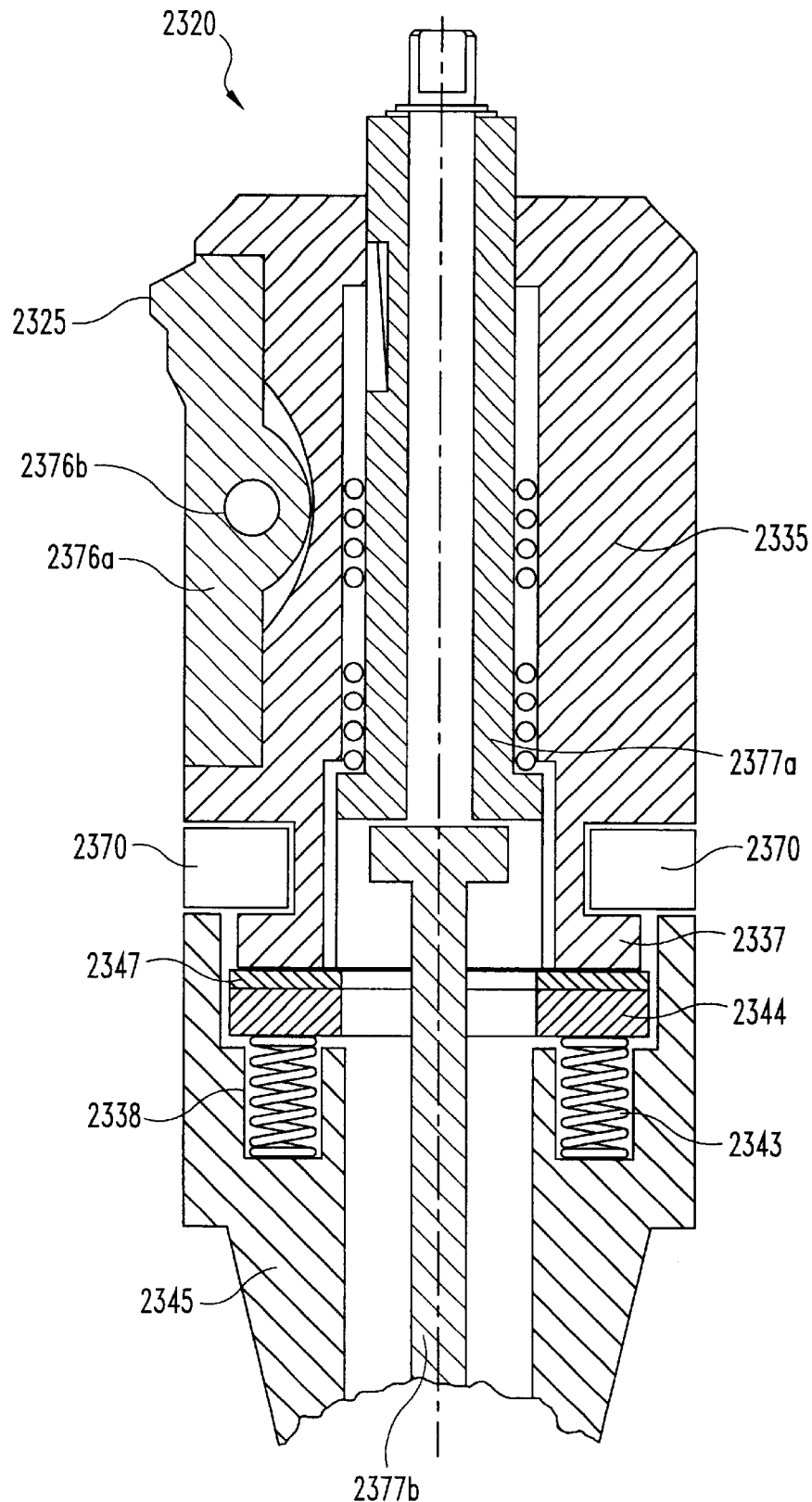
FIG. 43 is schematic, cross-sectional view of an apparatus according to another embodiment of the present invention.

FIG. 43 is a schematic representation of another embodiment according to the present invention, shown in sectional view through the centerline of the apparatus. Apparatus 2320 is a boring tool assembly which includes a slidably adjustable cutting tool 2325. Cutting tool 2325 is fixedly supported by a tool support 2330, which extends from a slidably adjustable tool holder 2335. Preferably, apparatus 2325 further includes a coupling element 2345 which includes a coupling element body 2338, as well as various internal components which will be described. Tool holder 2335 is slidably retained on coupling member 2345, preferably by a retention member 2370. Retention member 2370 permits sliding of tool holder 2335 in a direction permitting cutting tool 2325 to bore a variety of hole diameters or other features. As one example, referring to FIG. 43, the direction is sideways.

Boring tool assembly 2320 includes an internal frictional adjustment apparatus 2340 which includes a movable member 2344 preferably including a surface treatment or surface coating 2347 for controlling sliding friction and one or more biasing members 2343 which preferably provide an elastic biasing force. For sake of clarity, FIG. 43 includes a single biasing member 2343, but it is appreciated that various embodiments of the present invention contemplate multiple biasing members.

Apparatus 2320 includes a pivotal boring tool which can be actuated by one or more draw bars as disclosed in PCT WO 98/48964, DE 4022579, and U.S. patent application Ser. No. 2001/0028832, all incorporated herein by reference.

Apparatus 2320 includes a pivotal tool holder 2376a which is pivotal about a pin 2376b, and thereby pivotally coupled to tool holder 2335. In one embodiment, pivotal cutting tool holder 2376a can be pivoted outward by a mechanism (not shown) which is interposed between the top portion of the pivoting tool holder and the ramped portion of a first draw bar 2377a, as described in one of the references. Draw bar 2377a is axially actuated by a second draw bar 2377b which is guided within coupling element 2345. There is sufficient lateral clearance between draw bar 2377b and an internal bore of tool holder 2335, such that sliding adjustment of tool holder 2335 relative to coupling element 2345 is not interfered with.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method for machining an object, comprising:
   providing a computer numerically controlled boring machine, wherein the boring machine includes a translatable table and a translatable driving element, a static member, and a boring tool including a boring tool body and a cutting tool moveably coupled to the boring tool body;
   coupling the boring tool to the CNC boring machine;
   placing a surface of the boring tool in contact with the member;
   moving at least one of the boring tool or the member after said placing to apply a force between the boring tool and the member sufficient to translate the cutting tool relative to the boring tool body; and
   machining the object after said applying, wherein and said applying is by moving one of the table or the driving element relative to the other.

2. The method of claim 1 wherein said machining is by rotating the boring tool about an axis, and wherein said applying includes sliding the cutting tool relative to the boring tool body in a direction generally perpendicular to the axis.

3. The method of claim 1 wherein said providing includes the object and the object includes the static member.

4. The method of claim 1 which further comprises clamping the cutting tool to the boring tool, said machining the object being while maintaining said coupling and maintaining said clamping.

5. The method of claim 1 wherein said providing includes a static member with a surface, and said applying is by pressing a surface of the boring tool against the surface of the member.

6. The method of claim 5 wherein said providing includes the object and the object includes the member with a surface.

7. The method of claim 1 which further comprises clamping the cutting tool to the boring tool, wherein said clamping establishes a frictional force resisting translation of the cutting tool, and which further comprises applying a force sufficient to overcome the frictional force.

8. The method of claim 7 wherein said clamping is not by a set screw.

9. The method of claim 7 wherein said clamping is by a set screw.

10. The method of claim 7 wherein said clamping is by an electromagnetic solenoid.

11. The method of claim 7 wherein said clamping is by a hydraulic piston.

12. The method of claim 7 wherein said clamping is hydraulically actuated.

13. The method of claim 7 wherein said clamping is electrically actuated.

14. The method of claim 7 wherein said clamping is by a spring.

15. The method of claim 7 wherein said clamping is centrifugally actuated.

16. The method for machining an object, comprising:
providing a computer numerically controlled boring machine and a boring tool including an adjustable cutting tool laterally slidable within a range of positions on the boring tool;
coupling the boring tool to the CNC boring machine;
clamping the slidable cutting tool to the boring tool; and
laterally sliding the lateral position of the cutting tool while maintaining said coupling and maintaining said clamping;
wherein said providing includes a member with a surface, and said laterally sliding is by pressing a surface of the boring tool against the surface of the member.

17. The method of claim 16 which further comprises machining the object with the cutting tool after said laterally sliding while maintaining said coupling and maintaining said clamping.

18. The method of claim 16 wherein the boring machine includes a translatable table and a translatable driving element, and said laterally sliding is by moving one of the table or the driving element relative to the other.

19. The method of claim 16 which further comprises machining the object, wherein said machining is by rotating the boring tool about an axis, and said sliding is in a direction generally perpendicular to the axis.

20. The method of claim 16 wherein said providing includes the object and the object includes the member with a surface.

21. The method of claim 16 wherein said clamping establishes a frictional force resisting said lateral sliding of the cutting tool on the boring tool, and said lateral sliding is by applying a force sufficient to overcome the frictional force.

22. The method of claim 21 wherein said clamping is not by a set screw.

23. The method of claim 21 wherein said claiming is by a set screw.

24. The method of claim 21 wherein said clamping is by an electromagnetic solenoid.

25. The method of claim 21 wherein said clamping is by a hydraulic piston.

26. The method of claim 21 wherein said clamping is hydraulically actuated.

27. The method of claim 21 wherein said clamping is electrically actuated.

28. The method of claim 21 wherein said clamping is by a spring.

29. The method of claim 21 wherein said clamping is centrifugally actuated.

30. A method for machining an object, comprising:
providing a computer numerically controlled boring machine and a boring tool including an adjustable cutting tool laterally slidable within a range of positions on the boring tool;
coupling the boring tool to the CNC boring machine;
clamping the slidable cutting tool to the boring tool; and
laterally sliding the lateral position of the cutting tool while maintaining said coupling and maintaining said clamping;
wherein said clamping established a frictional force resisting lateral sliding of the cutting tool on the boring tool, and said laterally sliding is by applying a lateral force sufficient to overcome the frictional force.

31. The method of claim 30 which further comprises machining the object with the cutting tool while maintaining said coupling and maintaining said clamping.

32. The method of claim 30 wherein the boring machine includes a translatable table and a translatable driving element, and said laterally sliding is by moving one of the table or the driving element relative to the other.

33. The method of claim 30 which further comprises machining the object, wherein said machining is by rotating the boring tool about an axis, and said sliding is in a direction generally perpendicular to the axis.

34. The method of claim 30 wherein said providing includes a static member with a surface, and said sliding is by pressing a surface of the boring tool against the surface of the member.

35. The method of claim 30 wherein said providing includes the object and the object includes the member with a surface.

36. The method of claim 30 wherein said clamping is not by a set screw.

37. The method of claim 30 wherein said clamping is by a set screw.

38. The method of claim 30 wherein said clamping is by an electromagnetic solenoid.

39. The method of claim 30 wherein said clamping is by a hydraulic piston.

40. The method of claim 30 wherein said clamping is hydraulically actuated.

41. The method of claim 30 wherein said clamping is electrically actuated.

42. The method of claim 30 wherein said clamping is by a spring.

43. The method of claim 30 wherein said clamping is centrifugally actuated.

44. A method comprising:
providing an object, a CNC boring machine, a cutting tool, and a cutting tool holder slidable adjustable within a range of positions;
machining a feature in the object by the CNC boring machine with the cutting tool;
measuring a characteristic of the feature;
calculating a calculated amount to adjust the position of the cutting tool; and
automatically adjusting the position of the cutting tool with the aid of the CNC boring machine to translate the cutting tool holder by a distance corresponding to the calculated amount;
wherein said providing includes a surface of a member and a computer, and the computer commands a pressing of a surface of the cutting tool holder against the surface of the member to translate the cutting tool.

45. The method of claim 44 wherein said machining a feature is boring a hole and said measuring a characteristic is measuring the diameter of the hole.

46. The method of claim 44 wherein the boring machine includes a translatable table and a translatable driving element, and said automatically adjusting is by moving one of the table or the driving element relative to the other.

47. The method of claim 44 wherein said machining is by rotating the boring tool about an axis, and said pressing is in a direction generally perpendicular to the axis.

48. The method of claim 44 wherein the object includes the member with a surface.

49. The method of claim 44 which further comprises clamping the cutting tool to the boring tool; and wherein said clamping establishes a frictional force resisting translation of the cutting tool on the boring tool, and said automatically adjusting is by applying a force sufficient to overcome the frictional force.

50. The method of claim 49 wherein said clamping is not by a set screw.

51. The method of claim 49 wherein said clamping is by a set screw.

52. The method of claim 49 wherein said clamping is by an electromagnetic solenoid.

53. The method of claim 49 wherein said clamping is by a hydraulic piston.

54. The method of claim 49 wherein said clamping is hydraulically actuated.

55. The method of claim 49 wherein said clamping is electrically actuated.

56. The method of claim 49 wherein said clamping is by a spring.

57. The method of claim 49 wherein said clamping is centrifugally actuated.

* * * * *

UNITED STATES PATENT AND TRADEMARK OFFICE
CERTIFICATE OF CORRECTION

PATENT NO.     : 6,705,184 B2
DATED          : March 16, 2004
INVENTOR(S)    : Cardemon et al.

It is certified that error appears in the above-identified patent and that said Letters Patent is hereby corrected as shown below:

<u>Column 38,</u>
Line 49, please delete the word "slidable" and insert in lieu thereof -- slidably --

Signed and Sealed this

Eleventh Day of January, 2005

JON W. DUDAS
*Director of the United States Patent and Trademark Office*